United States Patent
Tian et al.

(10) Patent No.: US 10,128,917 B2
(45) Date of Patent: Nov. 13, 2018

(54) SYSTEMS AND METHODS FOR TONE PLANS FOR WIRELESS COMMUNICATION NETWORKS

(71) Applicant: QUALCOMM Incorporated, San Diego, CA (US)

(72) Inventors: Bin Tian, San Diego, CA (US); Lin Yang, San Diego, CA (US); Jialing Li Chen, San Diego, CA (US); Sameer Vermani, San Diego, CA (US); Rahul Tandra, San Diego, CA (US); Youhan Kim, San Jose, CA (US); Didier Johannes Richard van Nee, Tull en 't Waal (NL)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 14/853,872

(22) Filed: Sep. 14, 2015

(65) Prior Publication Data
US 2016/0080043 A1    Mar. 17, 2016

Related U.S. Application Data

(60) Provisional application No. 62/051,207, filed on Sep. 16, 2014, provisional application No. 62/053,642, (Continued)

(51) Int. Cl.
*H04L 5/00* (2006.01)
*H04B 7/022* (2017.01)
(Continued)

(52) U.S. Cl.
CPC ......... *H04B 7/022* (2013.01); *H04L 1/0071* (2013.01); *H04L 1/06* (2013.01); *H04L 5/0007* (2013.01);
(Continued)

(58) Field of Classification Search
CPC ...................................................... H04W 48/12
(Continued)

(56) References Cited

U.S. PATENT DOCUMENTS

| | | | | |
|---|---|---|---|---|
| 7,532,565 | B2 * | 5/2009 | Batra | H04L 27/2605 370/208 |
| 8,837,609 | B2 * | 9/2014 | Palanki | H04L 27/261 375/260 |

(Continued)

OTHER PUBLICATIONS

International Search Report and Written Opinion—PCT/US2015/050228 ISA/EPG—dated Dec. 8, 2015 (Cited in the Applicants IDS Dated Jan. 18, 2016).*

(Continued)

*Primary Examiner* — Berhanu Tadese
(74) *Attorney, Agent, or Firm* — Knobbe, Martens, Olson & Bear, LLP

(57) ABSTRACT

Methods and apparatuses for communicating over a wireless communication network are disclosed herein. One method includes forming a message that includes a plurality of data tones and one or more direct current (DC) protection tones. The method further includes setting a value for a data tone of the plurality of data tones to carry a data portion of the message. The method further includes setting a value for a DC protection tone of the one or more DC protection tones by repeating the value for the data tone as the value for the DC protection tone. The method further includes transmitting the message to one or more wireless communication devices utilizing the plurality of data tones and the one or more DC protection tones.

20 Claims, 63 Drawing Sheets

Related U.S. Application Data filed on Sep. 22, 2014, provisional application No. 62/058,002, filed on Sep. 30, 2014, provisional application No. 62/059,820, filed on Oct. 3, 2014, provisional application No. 62/063,324, filed on Oct. 13, 2014, provisional application No. 62/068,196, filed on Oct. 24, 2014, provisional application No. 62/069,785, filed on Oct. 28, 2014.

(51) Int. Cl.
  *H04L 1/06* (2006.01)
  *H04L 1/00* (2006.01)
  *H04L 27/26* (2006.01)
  *H04W 48/12* (2009.01)

(52) U.S. Cl.
  CPC .......... *H04L 5/0037* (2013.01); *H04L 5/0044* (2013.01); *H04L 5/0053* (2013.01); *H04L 27/2601* (2013.01); *H04W 48/12* (2013.01)

(58) Field of Classification Search
  USPC ........................................... 375/260
  See application file for complete search history.

(56) References Cited

U.S. PATENT DOCUMENTS

| | | | | |
|---|---|---|---|---|
| 2003/0016773 | A1* | 1/2003 | Atungsiri | H04L 27/2662 375/355 |
| 2005/0172202 | A1* | 8/2005 | Eroz | H03M 13/2957 714/755 |
| 2006/0008016 | A1* | 1/2006 | Balakrishnan | H04B 1/719 375/260 |
| 2007/0064821 | A1* | 3/2007 | Chen | H04L 27/265 375/260 |
| 2008/0069181 | A1* | 3/2008 | Lee | H04L 5/0062 375/130 |
| 2010/0054115 | A1* | 3/2010 | Roh | H04L 27/2634 370/208 |
| 2012/0236971 | A1* | 9/2012 | Taghavi Nasrabadi | H04L 5/0023 375/340 |
| 2013/0170485 | A1* | 7/2013 | Han | H04B 7/2628 370/342 |
| 2013/0179755 | A1* | 7/2013 | Yang | H03M 13/13 714/776 |
| 2013/0208821 | A1* | 8/2013 | Yang | H04L 1/0071 375/295 |
| 2013/0208822 | A1* | 8/2013 | Zhang | H04L 5/001 375/295 |
| 2013/0266083 | A1* | 10/2013 | Baik | H04L 5/0053 375/260 |
| 2013/0315163 | A1* | 11/2013 | Zhang | H04L 5/001 370/329 |
| 2014/0016571 | A1* | 1/2014 | Yucek | H04L 1/0071 370/329 |
| 2015/0009894 | A1* | 1/2015 | Vermani | H04L 1/0072 370/328 |
| 2015/0063255 | A1* | 3/2015 | Tandra | H04J 11/0023 370/329 |
| 2015/0063334 | A1* | 3/2015 | Vermani | H04L 69/22 370/338 |
| 2015/0139206 | A1* | 5/2015 | Azizi | H04L 5/003 370/338 |
| 2015/0223246 | A1* | 8/2015 | Yang | H04W 4/12 370/329 |
| 2015/0223247 | A1* | 8/2015 | Yang | H04L 5/0007 370/329 |
| 2015/0365195 | A1* | 12/2015 | Yang | H04L 27/2634 375/295 |
| 2015/0381330 | A1* | 12/2015 | Chen | H04L 5/0046 370/329 |
| 2016/0029397 | A1* | 1/2016 | Chen | H04L 1/0057 370/329 |
| 2016/0044675 | A1* | 2/2016 | Chen | H03M 13/1102 370/329 |
| 2016/0050666 | A1* | 2/2016 | Yang | H04W 72/02 370/329 |
| 2016/0050672 | A1* | 2/2016 | Chen | H04W 72/06 370/329 |
| 2016/0088600 | A1* | 3/2016 | Yang | H04W 72/044 370/329 |
| 2016/0099789 | A1* | 4/2016 | Zhang | H04J 11/003 370/329 |

OTHER PUBLICATIONS

International Search Report and Written Opinion—PCT/US2015/050228—ISA/EPO —dated Dec. 8, 2015.

\* cited by examiner

|  | 20MHz | 40MHz | 80MHz |
|---|---|---|---|
| FFT size | 256 | 512 | 1024 |
| DC+ Edge | 7+11 | 7+11 | 7+11 |
| # of tones for allocation | 238 | 494 | 1006 |
| # of TAUs | 9 | 19 | 38 |
| # of left over tones | 4 | 0 | 18 |
| % of waste | 1.6% | 0 | 1.8% |

FIG. 4

|  | 20MHz | 40MHz | 80MHz |
|---|---|---|---|
| FFT size | 256 | 512 | 1024 |
| DC+ Edge | 7+11 | 7+11 | 7+11 |
| # of tones for allocation | 238 | 494 | 1006 |
| # of TAUs | 7 | 15 | 31 |
| # of left over tones | 14 | 14 | 14 |
| % of waste | 5.9% | 2.8% | 1.4% |

FIG. 5

| $N_{data}$ | $N_{COL}$ Candidates | $N_{ROW}$ | $N_{ROT}$ Candidates ($N_{ss}<=4$) | $N_{ROT}$ Candidates ($N_{ss}>4$) | Stream Permutation ($N_{ss}<=4$) | Stream Permutation ($N_{ss}>4$) |
|---|---|---|---|---|---|---|
| 30 | 2, 3, 5, 6, 10, 15 | $N_{data}/N_{COL}$ | 1, 2, 3, 4, 5, 6, 7, 8, 9, 10, 11, 12, 13, 14, 15, 16, 17, 18 | 1, 2, 3, 4, 5, 6, 7, 8, 9, 10, 11, 12, 13, 14 | Bit reversal [0 2 1 3] | Choice 1: Bit reversal [0 4 2 6 1 5 3 7] Choice 2: Permutation chosen to maximize average subcarrier distance of adjacent streams, e.g., [0 5 2 7 3 6 1 4] |

FIG. 8

|  | 20MHz | 40MHz | 80MHz |
|---|---|---|---|
| FFT size | 256 | 512 | 1024 |
| DC+ Edge | 7+11 | 11+11 | 11+11(DC1)+11(DC2) for 20+20+20+20 boundaries |
| # of tones for allocation | 238 | 490 | 980 |
| # of TAUs | 7 | 14 | 28 |
| # of left over tones | 0 | 14 | 28 |
| % of waste | 0 | 2.73% | 4.88% (for 50 tones taking DC1 and DC2 into account) |

FIG. 12

| $N_{data}$ | $N_{COL}$ Candidates | $N_{ROW}$ | $N_{ROT}$ Candidates ($N_{ss}<=4$) | $N_{ROT}$ Candidates ($N_{ss}>4$) | Stream Permutation ($N_{ss}<=4$) | Stream Permutation ($N_{ss}>4$) |
|---|---|---|---|---|---|---|
| 32 | 2, 4, 8, 16 | $N_{data}/N_{COL}$ | 1, 2, 3, 4, 5, 6, 7, 8, 9, 10, 11, 12, 13, 14, 15, 16, 17, 18 | 1, 2, 3, 4, 5, 6, 7, 8, 9, 10, 11, 12, 13, 14 | Bit reversal [0 2 1 3] | Choice 1: Bit reversal [0 4 2 6 1 5 3 7] Choice 2: Permutation chosen to maximize average subcarrier distance of adjacent streams, e.g., [0 5 2 7 3 6 1 4] |

FIG. 14

|  | 20MHz | 40MHz | 80MHz |
|---|---|---|---|
| FFT size | 256 | 512 | 1024 |
| DC+ Edge | 7+11 | 11+11 | 11+11+11(DC1)+11(DC2) for 20+20+20+20 boundaries |
| # of tones for allocation | 238 | 490 | 980 |
| # of TAUs | 9 | 18 | 36 |
| # of left over tones | 4 | 22 | 44 |
| % of waste | 1.56% | 4.30% | 6.45% (for 66 tones taking DC1 and DC2 into account) |

FIG. 15

| BW | | Preserving boundaries | Option 2: TAU=32 (w/ 30 data tones) | Option 3: TAU=34 (w/ 32 data tones) | Option 4: TAU=26 (w/ 24 data tones) |
|---|---|---|---|---|---|
| 20MHz | | — | 30*7=210 | 32*7=224 | 24*9=216 |
| 40MHz | | — | 30*15=450 | 32*14=448 | 24*18=432 |
| | | 20+20MHz | 30*14=420 | | |
| 80MHz | | — | 30*31=930 | 32*28=896 | 24*36=864 |
| | | 40+40MHz | 30*30=900 | | |
| | | 20+20+40MHz, 20+40+20MHz | 30*29=870 | | |
| | | 20+20+20+20MHz | 30*28=840 | | |

FIG. 16

| | 20MHz | | | |
|---|---|---|---|---|
| | 11n/11ac 1x | Option I: 32-tone TAU Plan | Option 2 11ax 4x - 11ac80 DC4 | Option 3: TAU Plan with Pilot Puncture |
| # guards | 7 | 11 | 11 | 11 |
| # DC | 1 | 7 | 3 | 3 |
| # idle | 0 | 0 | 0 | 0 |
| # pilots | 4 | 16 | 8 | 8 |
| # data | 52 | 30*7+12=222 | 234 | 30*7+(12+4+8)= 30*7+2*12=234 |
| Efficiency Gain Over 11n/ac | 0 | 5% | 10% | 10% |

FIG. 17

| | | 40MHz | | | |
|---|---|---|---|---|---|
| | 11n/11ac 1x | Option I: 32-tone TAU Plan | Option 2 | | Option 3: TAU Plan with Pilot Puncture |
| | | | 11ax 4x - 11ac160 DC4 | 11ax 4x 512 FFT New Design | |
| # guards | 11 | 11 | 11 | 11 | 11 |
| # DC | 3 | 7 | 11 | 5 | 5 |
| # idle | 0 | 0 | 6 | 0 | 0 |
| # pilots | 6 | 32 | 16 | 16 | 16 |
| # data | 108 | 30*15+12=462 | 468 | 480 | 30*15+(12+2+16) =30*16=480 |
| Efficiency Gain Over 11n/ac | 0 | 6% | 7% | 10% | 10% |

FIG. 18

| | | 80MHz | | | |
|---|---|---|---|---|---|
| | 11n/11ac 1x | Option I: 32-tone TAU Plan | Option 2 | | Option 3: TAU Plan with Pilot Puncture |
| | | | 11ax 4x - 11ac160 DC4 Dup 2 | 11ax 4x 1024FFT New Design | |
| # guards | 11 | 11 | 11 | 11 | 11 |
| # DC | 3 | 7 | 11 | 5 | 7 |
| # idle | 0 | 0 | 34 | 0 | 0 |
| # pilots | 8 | 64 | 32 | 12 | 16 |
| # data | 234 | 30*31+12= 942 | 936 | 996 | 30*31+(12+48) =30*33=990 |
| Efficiency Gain Over 11n/ac | 0 | 0.6% | 0% | 6% | 5% |

FIG. 19

|  | 20MHz | 40MHz | 80MHz |
|---|---|---|---|
| FFT size | 256 | 512 | 1024 |
| DC+ Edge | 7+11 | 7+11 | 7+11 |
| # of tones for allocation | 238 | 494 | 1006 |
| # of TAUs | 7 | 15 | 31 |
| # of left over tones | 14 | 14 | 14 |
| % of waste | 5.9% | 2.8% | 1.4% |

FIG. 21

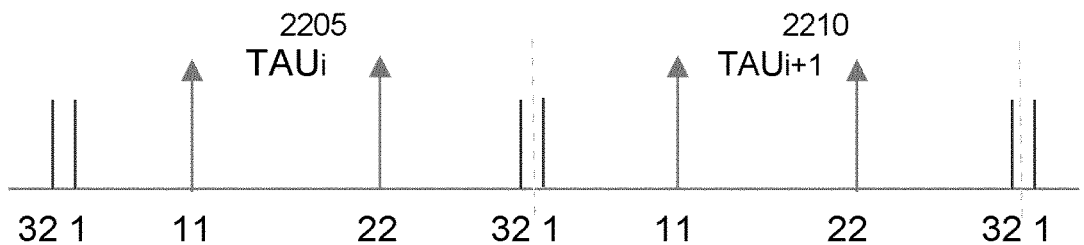
FIG 22A Option p1
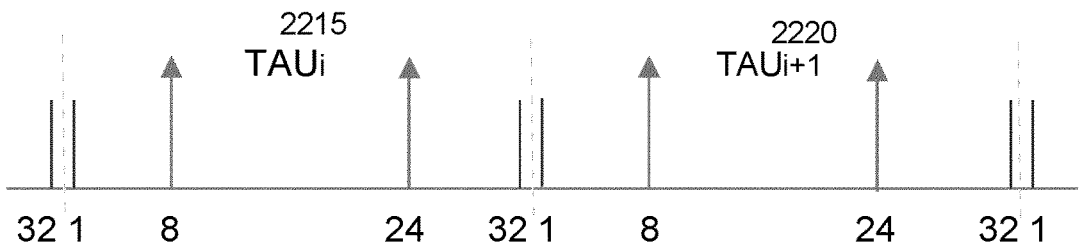
FIG 22B Option p2
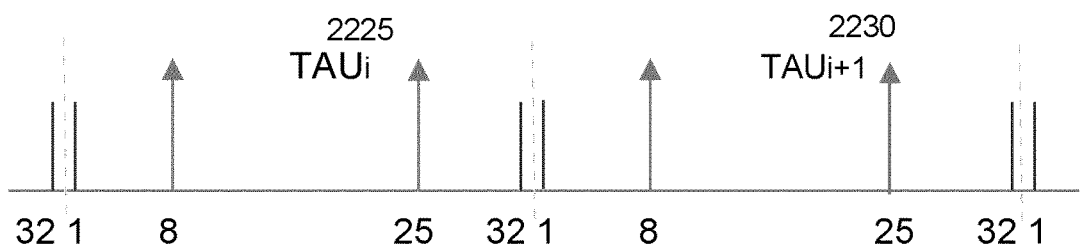
FIG 22C Option p3

|  | 20MHz | 40MHz | 80MHz |
|---|---|---|---|
| FFT size | 256 | 512 | 1024 |
| DC+ Edge | 3+11 | 3+11 | 3+11 |
| # of tones for allocation | 242 | 498 | 1010 |
| # of TAUs | 7 | 15 | 31 |
| # of left over tones | 18 | 18 | 18 |
| % of waste | 7% | 3.5% | 1.8% |

FIG. 23

| $N_{data}$ | $N_{COL}$ Candidates | $N_{ROW}$ | $N_{ROT}$ Candidates ($N_{ss}<=4$) | $N_{ROT}$ Candidates ($N_{ss}>4$) | Stream Permutation ($N_{ss}<=4$) | Stream Permutation ($N_{ss}>4$) |
|---|---|---|---|---|---|---|
| 16 | 2, 4, 8 | $N_{data}/N_{COL}$ | 1, 2, 3, 4, 5, 6, 7, 8, 9, 10, 11, 12 | 1, 2, 3, 4, 5 6, 7, 8, 9, 10, 11, 12 | Bit reversal [0 2 1 3] | Choice 1: Bit reversal [0 4 2 6 1 5 3 7] Choice 2: Permutation chosen to maximize average subcarrier distance of adjacent streams, e.g., [0 5 2 7 3 6 1 4] |

FIG. 24

3 DC Plan

7 DC Plan

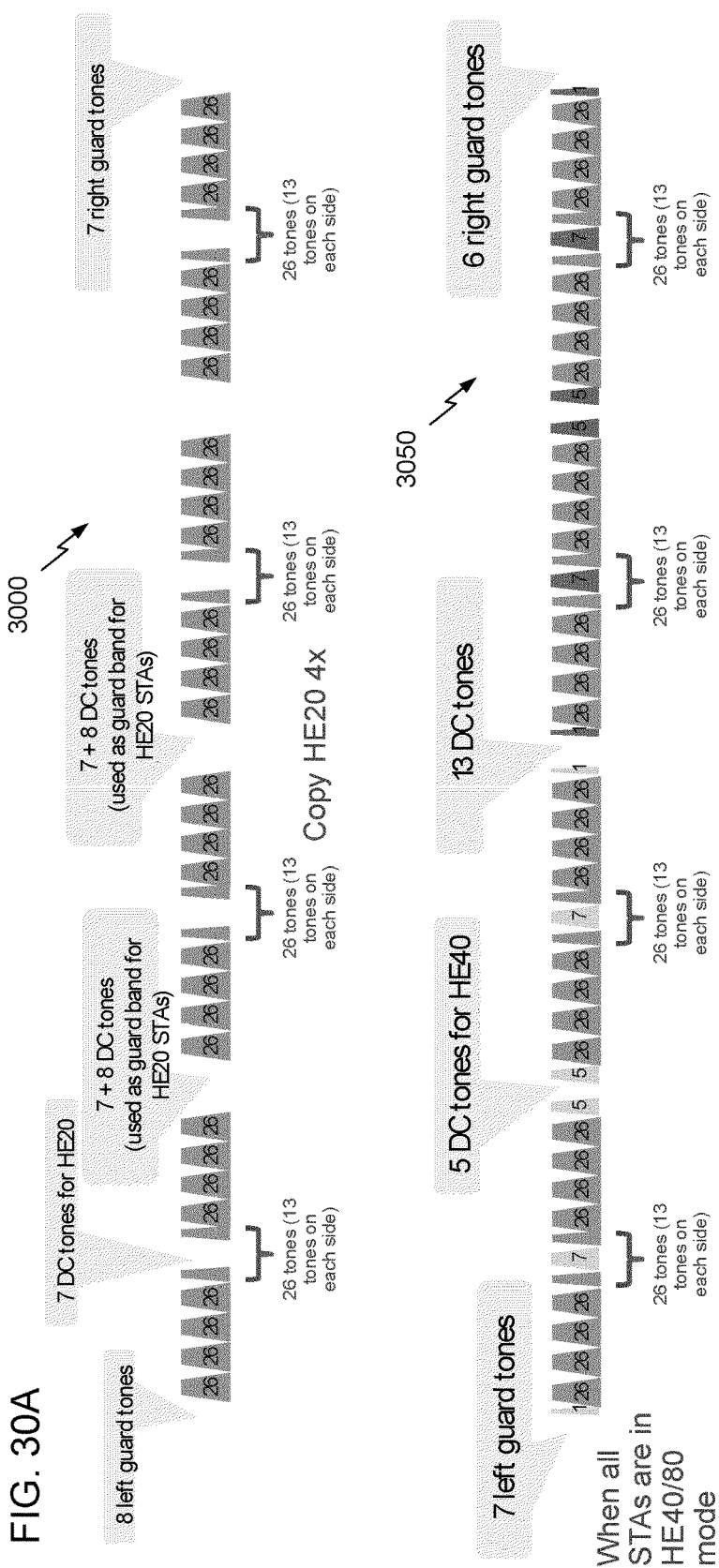

| | 20 MHz | 40 MHz | 80 MHz |
|---|---|---|---|
| FFT size | 256 | 512 | 1024 |
| DC+Edge | 3+11 | 3+11 | 3+11 |
| Usable tones | 242 | 498 | 1010 |
| RU sizes (data+pilots) | 30, 60, 120, 242* | 30, 60, 120, 242*, 498* | 30, 60, 120, 242*, 498*, 1010* |
| # allocations of minimum RU | 8 | 16 | 32 |
| Unused tones with mix of 30, 60, 120 and 242 | 0 | 14 (97.3% efficient) | 42 (95.9% efficient) |
| Unused tones with 2x498 | - | - | 14 (98.6% efficient) |

FIG. 36

| $N_{data}$ | $N_{COL}$ Candidates | $N_{ROW}$ | $N_{ROT}$ Candidates ($N_{ss}$<=4) | $N_{ROT}$ Candidates ($N_{ss}$>4) | Stream Permutation ($N_{ss}$<=4) | Stream Permutation ($N_{ss}$>4) |
|---|---|---|---|---|---|---|
| 1000 | 2,4,5,8,10,20,25,40,50,100,125,200,250,500 | $N_{data}/N_{COL}$ | 240, 241, 242, 243, 244, 245, 246, 247, 248, 249, 250, 251, 252, 253, 254, 255, 256, 257, 258, 259, 260, 261, 262 | 115, 116, 117, 118, 119, 120, 121, 122, 123, 124, 125, 126, 127, 128, 129, 130, 131, 132, 133, 134, 135, 136 | Bit reversal [0 2 1 3] | Choice 1: Bit reversal [0 4 2 6 1 5 3 7] Choice 2: Permutation chosen to maximize average subcarrier distance of adjacent streams, e.g., [0 5 2 7 3 6 1 4] |
| 1002 | 2,3,6,167,334,501 | | | | | |
| 1004 | 2,4,251,502 | | | | | |
| 1006 | 2,503 | | | | | |
| 1008 | 2,3,4,6,7,8,9,12,14,16,18, 21,24,28,36,42,48,56,63,72,84,112,126,144,168,252,336,504 | | | | | |

FIG. 40

| $N_{data}$ | $D_{TM}$ Candidates |
|---|---|
| 1000 | 2,4,5,8,10,20,25,40,50,100,125,200,250,500 |
| 1002 | 2,3,6,167,334,501 |
| 1004 | 2,4,251,502 |
| 1006 | 2,503 |
| 1008 | 2,3,4,6,7,8,9,12,14,16,18,21,24,28,36,42,48,56,63,72,84,112,126,144,168,252,336,504 |

FIG. 41

SYSTEMS AND METHODS FOR TONE PLANS FOR WIRELESS COMMUNICATION NETWORKS

CROSS REFERENCE TO PRIORITY APPLICATION

This application claims priority under 35 U.S.C. § 119(e) to U.S. Provisional Pat. App. 62/051,207 entitled "SYSTEMS AND METHODS FOR TONE PLANS FOR WIRELESS COMMUNICATION NETWORKS" filed on Sep. 16, 2014, U.S. Provisional Pat. App. 62/053,642 entitled "SYSTEMS AND METHODS FOR TONE PLANS FOR WIRELESS COMMUNICATION NETWORKS" filed on Sep. 22, 2014, U.S. Provisional Pat. App. 62/058,002 entitled "SYSTEMS AND METHODS FOR TONE PLANS FOR WIRELESS COMMUNICATION NETWORKS" filed on Sep. 30, 2014, U.S. Provisional Pat. App. 62/059,820 entitled "SYSTEMS AND METHODS FOR TONE PLANS FOR WIRELESS COMMUNICATION NETWORKS" filed on Oct. 3, 2014, U.S. Provisional Pat. App. 62/063,324 entitled "SYSTEMS AND METHODS FOR TONE PLANS FOR WIRELESS COMMUNICATION NETWORKS" filed on Oct. 13, 2014, U.S. Provisional Pat. App. 62/068,196 entitled "SYSTEMS AND METHODS FOR TONE PLANS FOR WIRELESS COMMUNICATION NETWORKS" filed on Oct. 24, 2014, and U.S. Provisional Pat. App. 62/069,785 entitled "SYSTEMS AND METHODS FOR TONE PLANS FOR WIRELESS COMMUNICATION NETWORKS" filed on Oct. 28, 2014, the disclosures of which are hereby incorporated by reference in their entirety.

FIELD

Certain aspects of the present disclosure generally relate to wireless communications, and more particularly, to methods and apparatuses for providing messages according to various tone plans.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

The devices in a wireless network can transmit/receive information between each other. Device transmissions can interfere with each other, and certain transmissions can selectively block other transmissions. Where many devices share a communication network, congestion and inefficient link usage can result. As such, systems, methods, and non-transitory computer-readable media are needed for improving communication efficiency in wireless networks.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present disclosure provides a method of communicating over a wireless communication network. The method includes forming a message that includes a plurality of data tones and one or more direct current (DC) protection tones. The method further includes setting a value for a data tone of the plurality of data tones to carry a data portion of the message. The method further includes setting a value for a DC protection tone of the one or more DC protection tones by repeating the value for the data tone as the value for the DC protection tone. The method further includes transmitting the message to one or more wireless communication devices utilizing the plurality of data tones and the one or more DC protection tones.

Another aspect of the present disclosure provides an apparatus for communicating over a wireless communication network. The apparatus includes a processor configured to form a message that includes a plurality of data tones and one or more direct current (DC) protection tones, set a value for a data tone of the plurality of data tones to carry a data portion of the message, and set a value for a DC protection tone of the one or more DC protection tones by repeating the value for the data tone as the value for the DC protection tone. The apparatus further includes a transmitter configured to transmit the message to one or more wireless communication devices utilizing the plurality of data tones and the one or more DC protection tones.

Another aspect of the present disclosure provides an apparatus for communicating over a wireless communication network. The apparatus includes means for forming a message that includes a plurality of data tones and one or more direct current (DC) protection tones. The apparatus further comprises means for setting a value for a data tone of the plurality of data tones to carry a data portion of the message. The apparatus further comprises means for setting a value for a DC protection tone of the one or more DC protection tones by repeating the value for the data tone as the value for the DC protection tone. The apparatus further comprises means for transmitting the message to one or more wireless communication devices utilizing the plurality of data tones and the one or more DC protection tones.

Yet another aspect of the present disclosure provides a non-transitory computer-readable medium comprising code that, when executed, performs a method communicating over a wireless communication network. The method includes forming a message that includes a plurality of data tones and one or more direct current (DC) protection tones. The method further includes setting a value for a data tone of the plurality of data tones to carry a data portion of the message. The method further includes setting a value for a DC protection tone of the one or more DC protection tones by repeating the value for the data tone as the value for the DC protection tone. The method further includes transmitting the message to one or more wireless communication devices utilizing the plurality of data tones and the one or more DC protection tones.

One aspect of the present disclosure provides a method of communicating over a wireless communication network. The method includes determining a value for each of a plurality of data tones, the plurality of determined values corresponding to a portion of a message. The method further includes assigning one or more values to one or more of a plurality of DC protection tones, the one or more assigned values corresponding to one or more of the plurality of determined values for one or more of the plurality of data tones. The method further includes transmitting the message to one or more wireless communication devices, utilizing the plurality of data tones and DC protection tones.

Another aspect of the present disclosure provides an apparatus for communicating over a wireless communication network. The apparatus includes a processor configured to determine a value for each of a plurality of data tones, the plurality of determined values corresponding to a portion of a message. The processor is further configured to assign one or more values to one or more of a plurality of DC protection tones, the one or more assigned values corresponding to one or more of the plurality of determined values for one or more of the plurality of data tones. The apparatus further includes a transmitter configured to transmit the message to one or more wireless communication devices, utilizing the plurality of data tones and DC protection tones.

Another aspect of the present disclosure provides an apparatus for communicating over a wireless communication network. The apparatus includes means for determining a value for each of a plurality of data tones, the plurality of determined values corresponding to a portion of a message. The apparatus further includes means for assigning one or more values to one or more of a plurality of DC protection tones, the one or more assigned values corresponding to one or more of the plurality of determined values for one or more of the plurality of data tones. The apparatus further includes means for transmitting the message to one or more wireless communication devices, utilizing the plurality of data tones and DC protection tones.

Yet another aspect of the present disclosure provides a non-transitory computer-readable medium comprising code that, when executed, performs a method communicating over a wireless communication network. The method includes determining a value for each of a plurality of data tones, the plurality of determined values corresponding to a portion of a message. The method further includes assigning one or more values to one or more of a plurality of DC protection tones, the one or more assigned values corresponding to one or more of the plurality of determined values for one or more of the plurality of data tones. The method further includes transmitting the message to one or more wireless communication devices, utilizing the plurality of data tones and DC protection tones.

One aspect of the present disclosure provides a method of communicating over a wireless communication network using a tone allocation unit. The method includes determining a total bandwidth for a transmission of a message, the total bandwidth comprising a plurality of tones, logically dividing the plurality of tones in the total bandwidth into a plurality of tone groups, each tone group having a number of tones equal to the tone allocation unit, determining an indication, the indication assigning one or more of the plurality of tone groups to a wireless communication device of a plurality of wireless communication devices, and transmitting the indication to the plurality of wireless communication devices.

In some aspects, the tone allocation unit may include 32 tones, wherein each tone group includes 2 pilot tones and 30 data tones. With each tone group, a pilot tone may be included in an 11th and a 22nd tone index of the tone group, in an 8th and a 24th tone index of the tone group, or in an 8th and a 25th tone index of the tone group. Logically dividing the plurality of tones in the total bandwidth into a plurality of tone groups may include one of logically dividing 238 tones into 7 tone groups, logically dividing 494 tones into 15 tone groups, and logically dividing 1006 tones into 31 tone groups. In some aspects, the tone allocation unit may include 26 tones, wherein each tone group includes 2 pilot tones and 24 data tones. Logically dividing the plurality of tones in the total bandwidth into a plurality of tone groups may include one of logically dividing 238 tones into 9 tone groups, logically dividing 494 tones into 19 tone groups, and logically dividing 1006 tones into 38 tone groups. The method may also include transmitting the message to at least the wireless communication device, which may include interleaving encoded data, generating a series of interleaved bits for transmission based on the interleaved encoded data, the interleaver comprising one or more stream interleavers corresponding to one or more spatial streams, the one or more stream interleavers including using a base subcarrier rotation of one of 1 through 18 and interleaved rotation indexes of [0 2 1 3] for up to four spatial streams, and using a base subcarrier rotation of one of 1 through 14 and interleaved rotation indexes of [0 4 2 6 1 5 3 7], or [0 5 2 7 3 6 1 4] or another permutation chosen to maximize an average subcarrier distance of adjacent streams for more than four spatial streams. In some aspects, the low-density parity check mapping distance may be one of 2, 3, 5, 6, 10, and 15. In some aspect, tones in the plurality of tones that are not in any tone group may be located adjacent to guard tones or to direct current tones in a message.

In some aspects, such as a whole bandwidth transmission, one or two tones from one or more tone groups may be further grouped into one or more additional tone groups. In some transmissions, the total bandwidth may be 20 MHz, and the message may include 11 guard tones, 3 direct current tones, 8 pilot tones, and 234 data tones. These 234 data tones may include seven tone groups of 30 data tones, and two additional tone groups of 12 data tones. In some transmissions, the total bandwidth may be 40 MHz, and the message may include 11 guard tones, 5 direct current tones, 16 pilot tones, and 480 data tones. These 480 tones may include sixteen tone groups of 30 data tones. In some transmissions, the total bandwidth may be 80 MHz, and the message may include 11 guard tones, 7 direct current tones, 16 pilot tones, and 990 data tones. These 990 tones may include 33 tone groups of 30 data tones.

The method may further include allocating a number of tones in the plurality of tones that are not in any tone group for one or more of synchronization, common control, signaling, scheduling, and power control. The tones in the plurality of tones that are not in any tone group may be used as direct current or protection edge tones in the message. Logically dividing the plurality of tones in the total bandwidth into a plurality of tone groups further may include forming a last tone group using a number of tones in the plurality of tones that are left over after logically dividing the plurality of tones in the total bandwidth into a plurality of tone groups. The plurality of tones may include a number of useable tones which may be used as data or pilot tones, and the message may further includes guard tones and direct current tones. The indication may include a trigger message for an uplink message. The indication may include a packet header of a downlink message. The total bandwidth may be one of 20 MHz, 40 MHz, and 80 MHz. In some aspects, the total bandwidth may be 80 MHz, and a transmission of the message may include 21 or more guard tones. The tone allocation may comprise one of 26 and 242 tones.

In some aspects, the tone allocation unit may be 34 tones. In some aspects, each tone group may include 2 pilot tones and 32 data tones. Logically dividing the plurality of tones in the total bandwidth into a plurality of tone groups may include one of logically dividing 238 tones into 7 tone groups, logically dividing 490 tones into 14 tone groups, and logically dividing 980 tones into 28 tone groups. In some aspects, the tone allocation unit may include 26 tones. Logically dividing the plurality of tones in the total bandwidth into a plurality of tone groups may include one of logically dividing 238 tones into 9 tone groups, logically dividing 490 tones into 18 tone groups, and logically dividing 980 tones into 36 tone groups. Transmitting the message to at least the wireless communication device may include transmitting a 40 or 80 MHz message such that each 20 MHz portion of the 40 or 80 MHz message includes 11 guard tones. The low-density parity check mapping distance may be one of 2, 4, 8, and 16.

One aspect of the present disclosure provides a message which includes 11 guard tones, 3 direct current tones, and wherein each tone group includes 30 data tones and 2 pilot tones, and wherein an additional tone group includes 2 pilot tones and 16 data tones. For example, the additional tone group may have 9 tones on each side of the direct current tones, and each side may have a pilot tone on a $5^{th}$ tone within the tones on that side of the direct current tones. In some aspects, the total bandwidth may be 20 MHz, and the message may include 7 tone groups. In some aspects, the total bandwidth may be 40 MHz, and the message may include 15 tone groups. In some aspects, the total bandwidth may be 80 MHz, and the message may include 31 tone groups.

The message may include 5 direct current tones. For example, a data tone at a tone index 3 may be repeated at a tone index −2, and a data tone at a tone index −3 may be repeated at a tone index 2. In some aspects, a data tone at a tone index 4 may be repeated at a tone index −1, and a data tone at a tone index 3 may be repeated at a tone index −2. The message may include 3 direct current tones. In some aspects, a data tone at a tone index 2 may be repeated at a tone index −1, and a data tone at a tone index −2 may be repeated at a tone index 1.

One aspect of the present disclosure provides an apparatus for wireless communication, including a processing system configured to determine a total bandwidth for a transmission of a message, the total bandwidth comprising a plurality of tones, logically divide the plurality of tones in the total bandwidth into a plurality of tone groups, each tone group having a number of tones equal to the tone allocation unit, determine an indication, the indication assigning one or more of the plurality of tone groups to a wireless communication device of a plurality of wireless communication devices, and a transmitter configured to transmit the indication to the plurality of wireless communication devices.

In one aspect, an apparatus for wireless communication is provided. The apparatus includes means for determining a total bandwidth for a transmission of a message, the total bandwidth comprising a plurality of tones, means for logically dividing the plurality of tones in the total bandwidth into a plurality of tone groups, each tone group having a number of tones equal to the tone allocation unit, means for determining an indication, the indication assigning one or more of the plurality of tone groups to a wireless communication device of a plurality of wireless communication devices, and means for transmitting the indication to the plurality of wireless communication devices.

One aspect of the present disclosure provides a non-transitory computer-readable medium comprising code that, when executed, causes an apparatus to determine a total bandwidth for a transmission of a message, the total bandwidth comprising a plurality of tones, logically divide the plurality of tones in the total bandwidth into a plurality of tone groups, each tone group having a number of tones equal to the tone allocation unit, determine an indication, the indication assigning one or more of the plurality of tone groups to a wireless communication device of a plurality of wireless communication devices, and transmit the indication to the plurality of wireless communication devices.

In one aspect, a method of communicating over a wireless communication network using resource units of differing sizes is disclosed. The method includes determining a total bandwidth for a transmission of a message to one or more wireless devices, the total bandwidth comprising a plurality of tones, selecting a resource unit size for each of the one or more wireless communication devices, the resource unit size selected from one of 30 tones, 60 tones, 120 tones, 242 tones, 498 tones, and 1010 tones, determining an indication, the indication indicating the resource unit size selected for each of the one or more wireless communication devices, and transmitting the indication to the plurality of wireless communication devices.

In some aspects, the total bandwidth of the transmission may be 20 MHz and the plurality of tones comprises 256 tones, the total bandwidth of the transmission may be 40 MHz and the plurality of tones comprises 512 tones, or the total bandwidth of the transmission may be 80 MHz and the plurality of tones comprises 1024 tones. Each 1010-tone resource unit may include 1002 data tones and 8 pilot tones, 1000 data tones and 10 pilot tones, 998 data tones and 12 pilot tones, 996 data tones and 14 pilot tones, or 994 data tones and 16 pilot tones. Each 498-tone resource unit may include 482 data tones and 16 pilot tones, 486 data tones and 12 pilot tones, 488 data tones and 10 pilot tones, or 490 data tones and 8 pilot tones. In some aspects, the plurality of tones may include 11 guard tones and at least 3 direct current tones. A resource unit with 30 tones may include 2 pilot tones and 28 data tones, and the two pilot tones may be located on an 8th and 23rd tone index in the resource unit, or may be located on a 10th and 21st tone index in the resource unit. In some aspects, the total bandwidth may be 80 MHz, and the plurality of tones may include 21 or more guard tones.

BRIEF DESCRIPTION OF THE DRAWINGS

FIG. 4 is an illustration of using a tone allocation unit which includes 26 tones, for each of a 20 MHz, a 40 MHz, and an 80 MHz transmission.

FIG. 5 is an illustration of using a tone allocation unit which includes 32 tones, for each of a 20 MHz, a 40 MHz, and an 80 MHz transmission.

FIG. 8 illustrates interleaver parameters which may be used with a tone allocation unit of 32 tones.

FIG. 12 is an illustration of using a tone allocation unit which includes 34 tones, for each of a 20 MHz, a 40 MHz, and an 80 MHz transmission.

FIG. 14 illustrates interleaver parameters which may be used with a tone allocation unit of 34 tones with 2 pilot tones for each tone allocation unit.

FIG. 15 is an illustration of using a tone allocation unit which includes 26 tones, for each of a 20 MHz, a 40 MHz, and an 80 MHz transmission.

FIG. 16 illustrates a comparison between the number of data tones found in transmissions of various bandwidths when using different tone allocation units and when preserving different boundaries.

FIG. 17 is a comparison of the efficiency of various options for a whole bandwidth allocation in a 20 MHz transmission.

FIG. 18 is a comparison of the efficiency of various options for a whole bandwidth allocation in a 40 MHz transmission.

FIG. 19 is a comparison of the efficiency of various options for a whole bandwidth allocation in an 80 MHz transmission.

FIG. 21 is an illustration of the amount of waste in each of 20 MHz, 40 MHz, and 80 MHz transmissions when using a 32 tone allocation unit.

FIG. 22A illustrates an option where in a given 32-tone tone allocation unit, pilot tones are positioned at the $11^{th}$ and $22^{nd}$ tones within each tone allocation unit FIG. 22B illustrates an option where in a given 32-tone tone allocation unit, pilot tones are positioned at the $8^{th}$ and $24^{th}$ tones within each tone allocation unit.

FIG. 22C illustrates an option where in a given 32-tone tone allocation unit, pilot tones are positioned at the $8^{th}$ and $25^{th}$ tones within each tone allocation unit.

FIG. 23 is an illustration of the amount of waste in each of 20 MHz, 40 MHz, and 80 MHz transmissions when using a 32-tone tone allocation unit with three direct current tones.

FIG. 24 illustrates interleaver parameters which may be used with a small tone allocation unit of 18 tones.

FIG. 30A is an illustration of an 80 MHz transmission which includes four 20 MHz portions.

FIG. 30B is an illustration of an 80 MHz transmission that uses certain tones in the 20 MHz-compatible transmission as additional useable tones.

FIG. 36 is an illustration of various resource unit sizes that may be used in each of 20 MHz, 40 MHz, and 80 MHz transmissions.

FIG. 40 illustrates interleaver parameters which may be used with a resource unit of 1010 tones.

FIG. 41 illustrates LDPC tone mapping distances that may be used for certain possible values of Ndata in a 1024-tone 80 MHz transmission.

DETAILED DESCRIPTION

Figure 1:
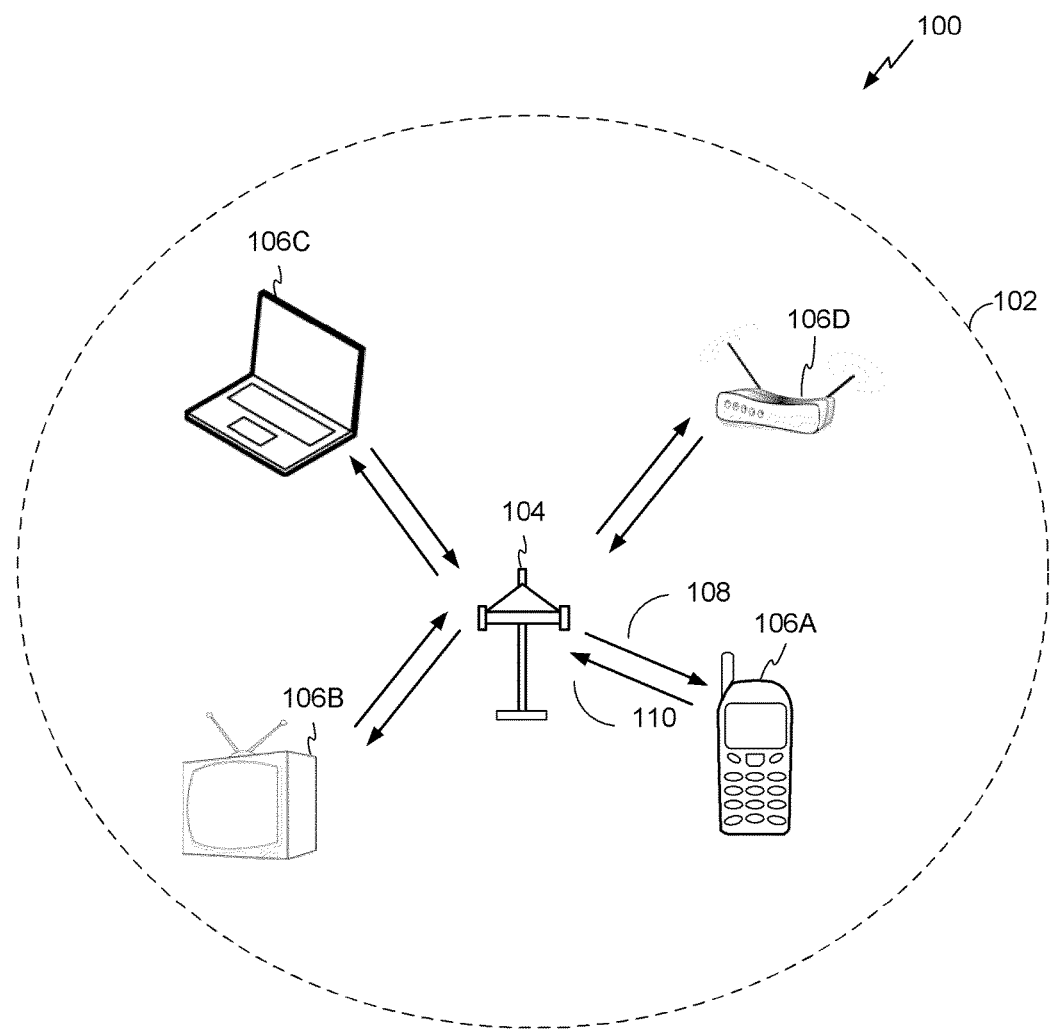
FIG. 1 illustrates an example of a wireless communication system in which aspects of the present disclosure can be employed.

Various aspects of the novel systems, apparatuses, and methods are described more fully hereinafter with reference to the accompanying drawings. The teachings of this disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Implementing Devices

Wireless network technologies can include various types of wireless local area networks (WLANs). A WLAN can be used to interconnect nearby devices together, employing widely used networking protocols. The various aspects described herein can apply to any communication standard, such as Wi-Fi or, more generally, any member of the IEEE 802.11 family of wireless protocols.

In some aspects, wireless signals can be transmitted according to a high-efficiency 802.11 protocol using orthogonal frequency-division multiplexing (OFDM), direct-sequence spread spectrum (DSSS) communications, a combination of OFDM and DSSS communications, or other schemes.

In some implementations, a WLAN includes various devices which are the components that access the wireless network. For example, there can be two types of devices: access points ("APs") and clients (also referred to as stations, or "STAs"). In general, an AP serves as a hub or base station for the WLAN and an STA serves as a user of the WLAN. For example, an STA can be a laptop computer, a personal digital assistant (PDA), a mobile phone, etc. In an example, an STA connects to an AP via a Wi-Fi (e.g., IEEE 802.11 protocol such as 802.11ax) compliant wireless link to obtain general connectivity to the Internet or to other wide area networks. In some implementations an STA can also be used as an AP.

The techniques described herein can be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system can utilize sufficiently different directions to concurrently transmit data belonging to multiple user terminals. A TDMA system can allow multiple user terminals to share the same frequency channel by dividing the transmission signal into different time slots, each time slot being assigned to different user terminal. A TDMA system can implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers can also be called tones, bins, etc. With OFDM, each sub-carrier can be independently modulated with data. An OFDM system can implement IEEE 802.11 or some other standards known in the art. An SC-FDMA system can utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system can implement 3GPP-LTE (3rd Generation Partnership Project Long Term Evolution) or other standards.

The teachings herein can be incorporated into (e.g., implemented within or performed by) a variety of wired or wireless apparatuses (e.g., nodes). In some aspects, a wireless node implemented in accordance with the teachings herein can comprise an access point or an access terminal.

An access point ("AP") can comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") can also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure can be employed. The wireless communication system 100 can operate pursuant to a wireless standard, for example the 802.11ax standard. The wireless communication system 100 can include an AP 104, which communicates with STAs 106.

A variety of processes and methods can be used for transmissions in the wireless communication system 100 between the AP 104 and the STAs 106. For example, signals can be transmitted and received between the AP 104 and the STAs 106 in accordance with OFDM/OFDMA techniques. If this is the case, the wireless communication system 100 can be referred to as an OFDM/OFDMA system. Alternatively, signals can be transmitted and received between the AP 104 and the STAs 106 in accordance with CDMA techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 can provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather can function as a peer-to-peer network between the STAs 106. Accordingly, the functions of the AP 104 described herein can alternatively be performed by one or more of the STAs 106.

Figure 2:
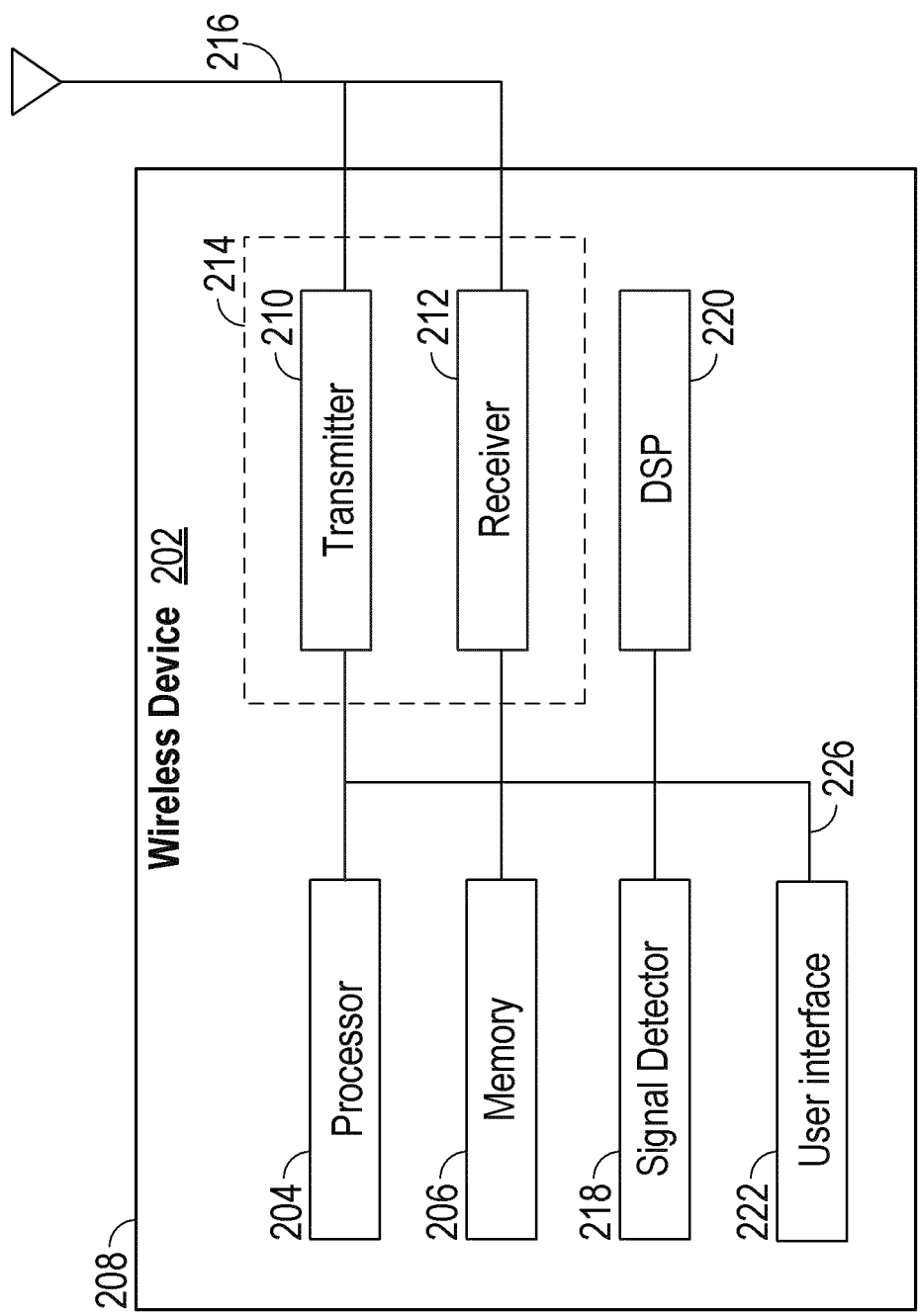
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can comprise the AP 104 or one of the STAs 106.

The wireless device 202 can include a processor 204 which controls operation of the wireless device 202. The processor 204 can also be referred to as a central processing unit (CPU). Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas, which can be utilized during MIMO communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can comprise a physical layer data unit (PPDU). In some aspects, the PPDU is referred to as a packet.

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art will appreciate the components of the wireless device 202 can be coupled together or accept or provide inputs to each other using some other mechanism.

Although a number of separate components are illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can comprise an AP 104 or an STA 106, and can be used to transmit and/or receive communications. The communications exchanged between devices in a wireless network can include data units which can comprise packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

Certain aspects of the present disclosure support allowing APs 104 to allocate STAs 106 transmissions in optimized ways to improve efficiency. Both high efficiency wireless (HEW) stations, stations utilizing an 802.11 high efficiency protocol (such as 802.11ax), and stations using older or legacy 802.11 protocols (such as 802.11b), can compete or coordinate with each other in accessing a wireless medium. In some embodiments, the high-efficiency 802.11 protocol described herein can allow for HEW and legacy stations to interoperate according to various OFDMA tone plans (which can also be referred to as tone maps). In some embodiments, HEW stations can access the wireless medium in a more efficient manner, such as by using multiple access techniques in OFDMA. Accordingly, in the case of apartment buildings or densely-populated public spaces, APs and/or STAs that use the high-efficiency 802.11 protocol can experience reduced latency and increased network throughput even as the number of active wireless devices increases, thereby improving user experience.

In some embodiments, APs 104 can transmit on a wireless medium according to various DL tone plans for HEW STAs. For example, with respect to FIG. 1, the STAs 106A-106D can be HEW STAs. In some embodiments, the HEW STAs can communicate using a symbol duration four times that of a legacy STA. Accordingly, each symbol which is transmitted may be four times as long in duration. When using a longer symbol duration, each of the individual tones may only require one-quarter as much bandwidth to be transmitted. For example, in various embodiments, a 1× symbol duration can be 3.2 ms and a 4× symbol duration can be 12.8 ms. The AP 104 can transmit messages to the HEW STAs 106A-106D according to one or more tone plans, based on a communication bandwidth. In some aspects, the AP 104 may be configured to transmit to multiple HEW STAs simultaneously, using OFDMA.

Efficient Tone Plan Design for Multicarrier Allocation

Figure 3:
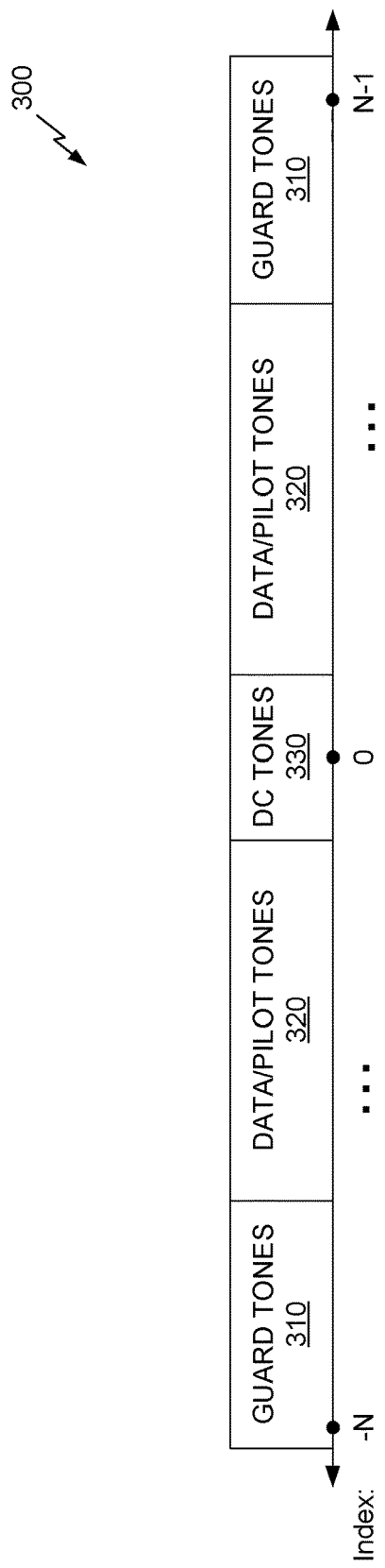
FIG. 3 shows an exemplary 2N-tone plan, according to one embodiment.

FIG. 3 shows an exemplary 2N-tone plan 300, according to one embodiment. In an embodiment, the tone plan 300 corresponds to OFDM tones, in the frequency domain, generated using a 2N-point FFT. The tone plan 300 includes 2N OFDM tones indexed −N to N−1. The tone plan 300 includes two sets of guard tones 310, two sets of data/pilot tones 320, and a set of direct current (DC) tones 330. In various embodiments, the guard tones 310 and DC tones 330 can be null. In various embodiments, the tone plan 300 includes another suitable number of pilot tones and/or includes pilot tones at other suitable tone locations.

In some aspects, OFDMA tone plans may be provided for transmission using a 4× symbol duration, as compared to various IEEE 802.11 protocols. For example, 4× symbol duration may use a number of symbols which are each 12.8 ms in duration (whereas symbols in certain other IEEE 802.11 protocols may be 3.2 ms in duration).

In some aspects, the data/pilot tones 320 of a transmission 300 may be divided among any number of different users. For example, the data/pilot tones 320 may be divided among between one and eight users. In order to divide the data/pilot tones 320, an AP 104 or another device may signal to the various devices, indicating which devices may transmit or receive on which tones (of the data/pilot tones 320) in a particular transmission. Accordingly, systems and methods for dividing the data/pilot tones 320 may be desired, and this division may be based upon a tone plan.

A tone plan may be chosen based on a number of different characteristics. For example, it may be beneficial to have a simple tone plan, which can be consistent across most or all bandwidths. For example, an OFDMA transmission may be transmitted over 20, 40, or 80 MHz, and it may be desirable to use a tone plan that can be used for any of these bandwidths. Further, a tone plan may be simple in that it uses a smaller number of building block sizes. For example, a tone plan may contain a unit which may be referred to as a tone allocation unit (TAU). This unit may be used to assign a particular amount of bandwidth to a particular user. For example, one user may be assigned bandwidth as a number of TAUs, and the data/pilot tones 320 of a transmission may be broken up into a number of TAUs. In some aspects, it may be beneficial to have a single size of TAU. For example, if there were two or more sizes of TAU, it may require more signaling to inform a device of the tones that are allocated to that device. In contrast, if all tones are broken up into TAUs of consistent size, signaling to a device may simply require telling a device a number of TAUs assigned to that device. Accordingly, using a single TAU size may reduce signaling and simplify tone allocation to various devices.

A tone plan may also be chosen based on efficiency. For example, transmissions of different bandwidths (e.g., 20, 40, or 80 MHz) may have different numbers of tones. Thus, it may be beneficial to choose a TAU size that leaves fewer tones leftover after the creation of the TAUs. For example, if a TAU was 100 tones, and if a certain transmission included 199 tones, this may leave 99 tones leftover after creating one TAU. Thus, 99 tones may be considered "leftover" tones, and this may be quite inefficient. Accordingly, reducing the number of leftover tones may be beneficial. It may also be beneficial if a tone plan is used which allows for the same tone plan to be used in both UL and DL OFDMA transmissions. Further, it may be beneficial if a tone plan is configured to preserve 20 and 40 MHz boundaries, when needed. For example, it may be desirable to have a tone plan which allows each 20 or 40 MHz portion to be decoded separately from each other, rather than having allocations which are on the boundary between two different 20 or 40 MHz portions of the bandwidth. For example, it may be beneficial for interference patterns to be aligned with 20 or 40 MHz channels. Further, it may be beneficial to have channel binding, such that when a 20 MHz transmission and a 40 MHz transmission are transmitted, to create a 20 MHz "hole" in the transmission when transmitted over 80 MHz. This may allow, for example, a legacy packet to be transmitted in this unused portion of the bandwidth. Finally, it may also be advantageous to use a tone plan which provides for fixed pilot tone locations in various different transmissions, such as in different bandwidths.

Generally, a number of different proposals have been made. For example, certain proposals have been made which include multiple different building blocks, such as two or more different tone units. For example, there may be a basic tone unit (BTU), and a small tone unit (STU), which is smaller than the basic tone unit. Further, the size of the BTU itself may vary based upon the bandwidth of the transmission. In another proposal, resource blocks are used, rather than tone units. However, in some aspects, it may be beneficial to use a single tone allocation unit TAU for all bandwidths of transmissions in OFDMA.

FIG. 4 is an illustration of using a TAU which includes 26 tones, for each of a 20 MHz, a 40 MHz, and an 80 MHz transmission. Generally, 26 tones in an IEEE 802.11ax transmission may be transmitted over a bandwidth of 2.03 MHz. For example, a 20 MHz transmission may include 7 DC tones, and 11 guard tones from an FFT size of 256. This may leave 238 other tones, which may be used as data and pilot tones. Accordingly, these tones may be split up into 9 TAUs, each TAU having 26 tones. This may leave 4 leftover tones, for a 1.6% waste (that is, where leftover tones are considered wasted). Similarly, a 40 MHz transmission may include 7 DC tones and 11 guard tones, from an FFT size of 512. This may leave 494 tones for allocation, which may be allocated into 19 TAUs of 26 tones each, with no leftover tones. An 80 MHz transmission may use a FFT size of 1024, include 7 DC tones and 11 guard tones, which may leave 1006 tones for allocation. These tones may be allocated into 38 TAUs, with 18 leftover tones, for a 1.8% waste.

As indicated above, a number of tones may be leftover in certain transmissions. These tones can be used for a number of different uses. For example, these tones may be used as additional DC or guard tones. It may be noted here that 20 MHz and 40 MHz transmissions each include an odd number of TAUs. Because of the odd number of TAUs, one of the TAUs has to cross the DC tones (that is, include tones on each side of the DC tones). In an 80 MHz transmission, an even number of TAUs are present, so no TAU will need to cross the DC tones.

In some aspects, there may be certain TAU allocation rules. For example, a certain number of TAUs may be used for signaling/control/scheduling/acknowledgements (ACK), and other functions. For example, 1 TAU may be used for this purpose in a 20 MHz transmission, 3 TAUs in a 40 MHz transmission, and 6 TAUs in an 80 MHz transmission. This may leave 8, 16, and 32 TAUs in these transmissions, respectively. It may be beneficial to leave these numbers of TAUs, as they may allow for even allocations among 8 different users, in all three of 20, 40, and 80 MHz transmissions. Other TAU allocation rules may also be used. For example, in an 80 MHz transmission, a minimum allocation to a single device may be 4 TAUs. In some aspects, where an 80 MHz transmission includes 38 TAUs and the minimum allocation is 4 TAUs, the last 2 TAUs may always be assigned together with the last 4 TAU portion. In some aspects, tone mapping may also be done in a distributed fashion, when using 26 tone TAUs.

Figure 31:
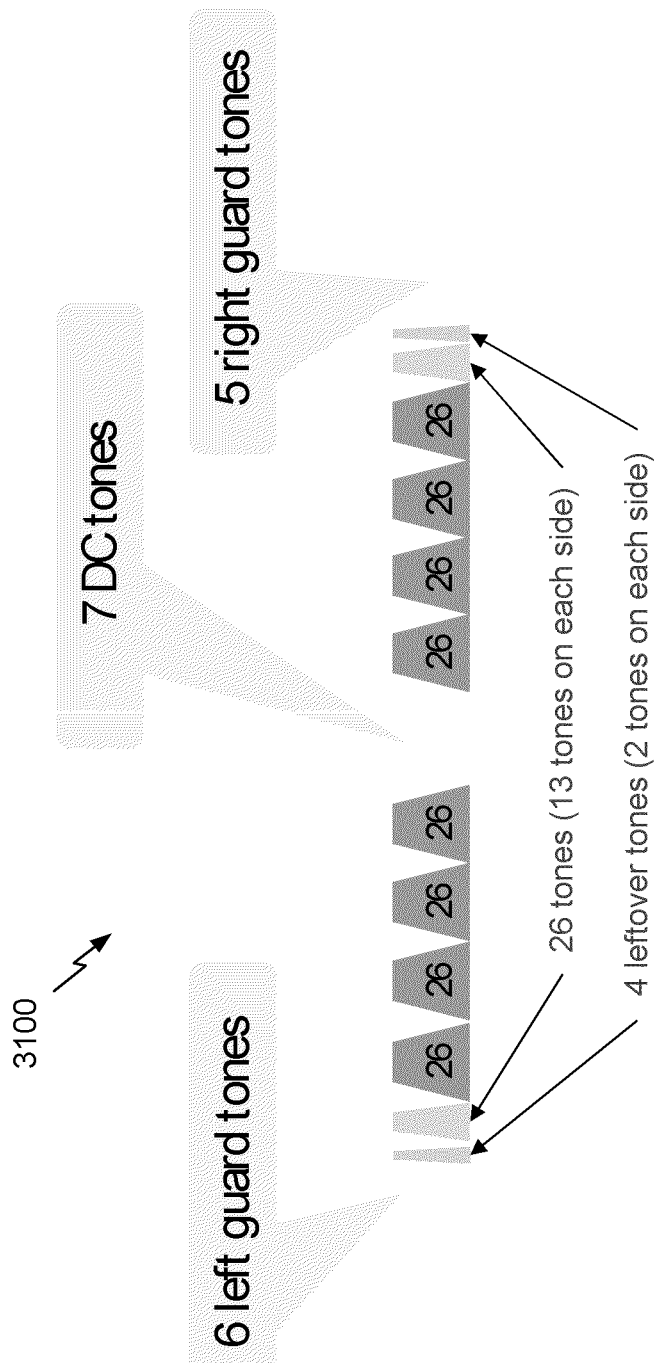
FIG. 31 is an illustration of a 20 MHz transmission according to some aspects of the present disclosure.

FIG. 31 is an illustration of a 20 MHz transmission according to some aspects of the present disclosure. For example, this transmission may use the allocation shown in FIG. 4 and described above. Generally, the transmission includes 7 DC tones, 6 left guard tones, and 5 right guard tones. The transmission includes 4 tone allocation units on the left side of the DC tones, each tone allocation unit having 26 tones. The transmission also includes 4 tone allocation units on the right side of the DC tones, each tone allocation unit having 26 tones. The transmission further includes one additional tone allocation unit, which includes 13 tones on each side of the DC tones. As illustrated, these tones may be placed near the edge/guard tones of the transmission. Alternatively, these tones may be placed elsewhere in the transmission, such as near the DC tones. Finally, the transmission includes 4 leftover tones, with two on each side of the DC tones. In this illustration, these leftover tones may be placed near the guard tones. Accordingly, the transmission includes 9 tone allocation units, each with 26 tones.

Figure 32:
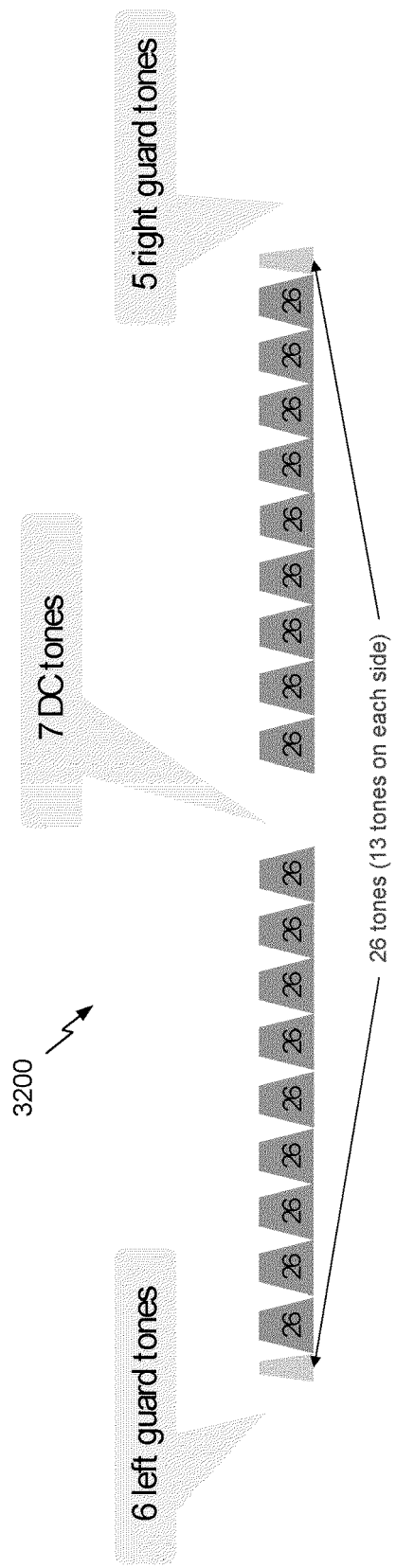
FIG. 32 is an illustration of a 40 MHz transmission according to some aspects of the present disclosure.

FIG. 32 is an illustration of a 40 MHz transmission according to some aspects of the present disclosure. For example, this transmission may use the allocation shown in FIG. 4 and described above. Generally, the transmission includes 7 DC tones, 6 left guard tones, and 5 right guard tones. The transmission includes 9 tone allocation units on the left side of the DC tones, each tone allocation unit having 26 tones. The transmission also includes 9 tone allocation units on the right side of the DC tones, each tone allocation unit having 26 tones. The transmission further includes one additional tone allocation unit, which includes 13 tones on each side of the DC tones. As illustrated, these tones may be placed near the edge/guard tones of the transmission. Alternatively, these tones may be placed elsewhere in the transmission, such as near the DC tones. Accordingly, the transmission includes 19 tone allocation units, each with 26 tones.

Figure 33:
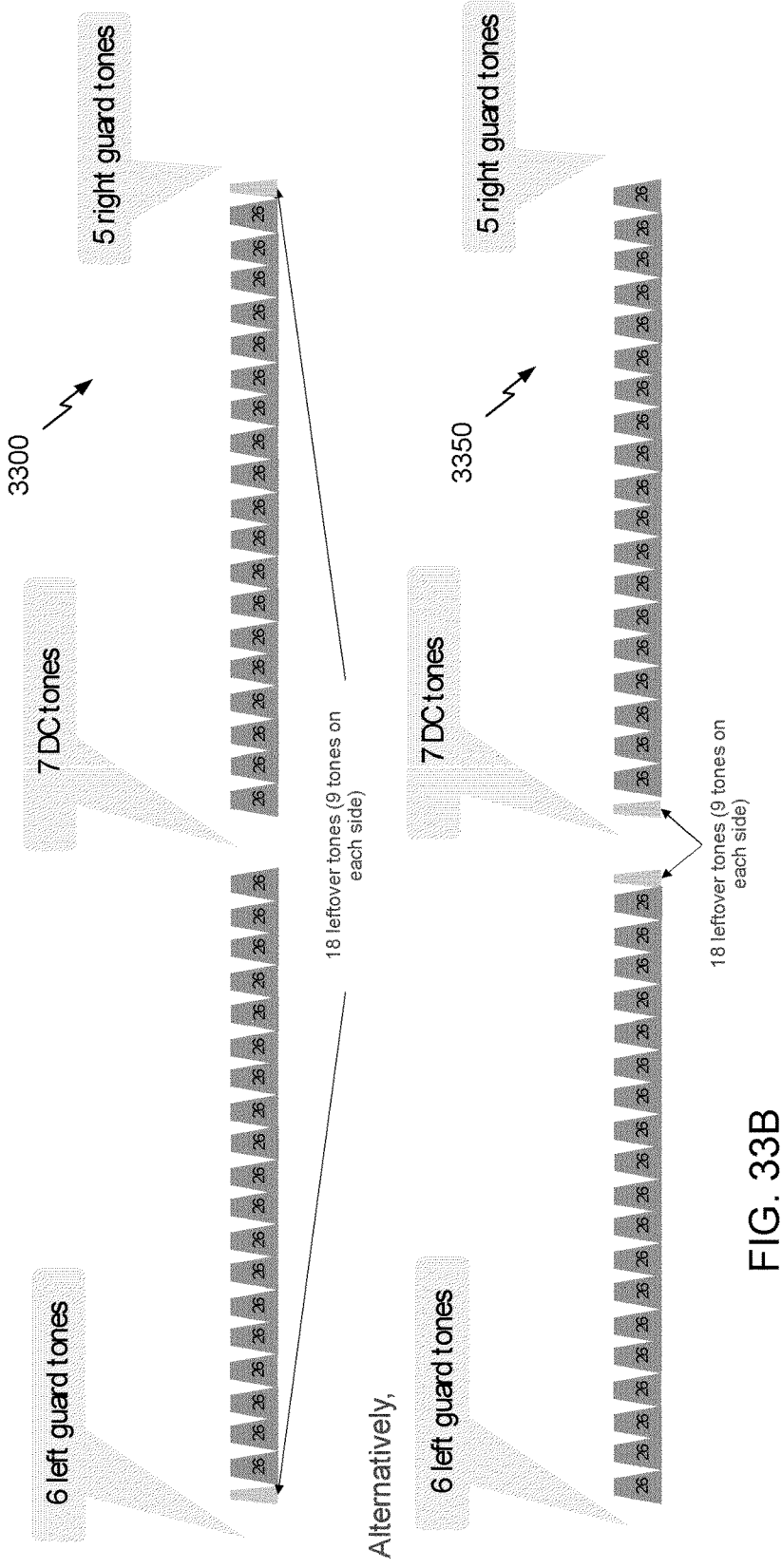
FIGS. 33A and 33B are illustrations of an 80 MHz transmission according to some aspects of the present disclosure.

FIG. 33A is an illustration of an 80 MHz transmission according to some aspects of the present disclosure. For example, this transmission may use the allocation shown in FIG. 4 and described above. Generally, the transmission includes 7 DC tones, 6 left guard tones, and 5 right guard tones. The transmission includes 19 tone allocation units on the left side of the DC tones, each tone allocation unit having 26 tones. The transmission also includes 19 tone allocation units on the right side of the DC tones, each tone allocation unit having 26 tones. Finally, the transmission includes 18 leftover tones, with nine on each side of the DC tones. In this illustration, these leftover tones may be placed near the guard tones. Alternatively, as illustrated in FIG. 33B, these tones may be placed elsewhere in the transmission, such as near the DC tones. Accordingly, the transmission includes 38 tone allocation units, each with 26 tones.

FIG. 5 is an illustration of using a TAU which includes 32 tones, for each of a 20 MHz, a 40 MHz, and an 80 MHz transmission. Generally, 32 tones in an IEEE 802.11ax transmission may be transmitted over a bandwidth of 2.5 MHz. For example, a 20 MHz transmission may include 7 DC tones, and 11 guard tones from an FFT size of 256. This may leave 238 other tones, which may be used as data and pilot tones. Accordingly, these tones may be split up into 7 TAUs, each TAU having 32 tones. This may leave 14 leftover tones, for a 5.9% waste (that is, where leftover tones are considered wasted). Similarly, a 40 MHz transmission may include 7 DC tones and 11 guard tones, from an FFT size of 512. This may leave 494 tones for allocation, which may be allocated into 15 TAUs of 32 tones each, with 14 leftover tones for 2.8% waste. An 80 MHz transmission may use a FFT size of 1024, include 7 DC tones and 11 guard tones, which may leave 1006 tones for allocation. These tones may be allocated into 31 TAUs, with 14 leftover tones, for a 1.4% waste.

As may be observed, each of these allocations includes exactly 14 leftover tones, consistent between each of 20 MHz, 40 MHz, and 80 MHz. These 14 tones may be used for synchronization/common control/signaling/scheduling/power control channel. When these 14 tones are used for these purposes, there may be, effectively, no waste at all. These tones may also be used for additional DC tones, or for protective edge tones. These 14 tones may also be used in a special 14 tone TAU, which may allow there to be 8, 16, and 32 TAUs. Including these numbers of TAUs may be beneficial, as noted above, as it may allow easier division of the TAUs between eight users.

In some aspects, the TAU grid here is consistent for 20, 40, and 80 MHz allocations. Accordingly, leftover tones may be added at the two edges, or around the DC tones (with 7 tones on each side). One TAU can be located across DC with 16 tones on each side of the DC tones.

In some aspects, it may be noted that the number of TAUs here are an odd number. Accordingly, efficient signaling methods for an odd number of TAUs may be desired. Generally, each of the 32 tone TAUs may have 2 pilot tones, and thus, a 30 symbol interleaver may be used with 32 tone TAUs. It may also be useful to determine how to map TAUs for a distributed OFDMA transmission.

In some aspects, if a STA is assigned multiple TAUs, encoding may be performed across all the assigned TAUs. For subband OFDMA communications, interleaving may be done in two layers. First, all the bits of a device may be distributed evenly across all TAUs assigned to the device. For example, bits 1, 2, 3, . . . N may be assigned to TAUs 1, 2, 3, . . . N, and so on. Following this, each individual TAU may be interleaved within the TAU. Accordingly, only one size of interleaver may be needed, that is, the size of a TAU. In a distributed OFDMA system, interleaving may or may not be needed. In some aspects, a TAU may be chosen, at least in part, based on how many pilot tones may be needed for the TAU. For example, a TAU of 26 or 32 may be beneficial if only two pilot tones per TAU may be needed. If, however, more pilot tones are needed, other TAUs may be used. Generally, when considering the size of a TAU, it is a trade-off between signaling costs, pilot costs, and leftover tones. For example, when smaller TAUs are used, the number of pilot tones needed (compared to the number of data tones) may increase as a proportion of the total number of tones in a TAU. Further, when smaller TAUs are used, signaling may require more data to transmit, since there will be a higher total number of TAUs which must be allocated to various devices in an OFDMA transmission. However, as larger TAUs are used, there are potentially more leftover tones, which may reduce overall throughput for a given bandwidth and be inefficient.

Figure 6:
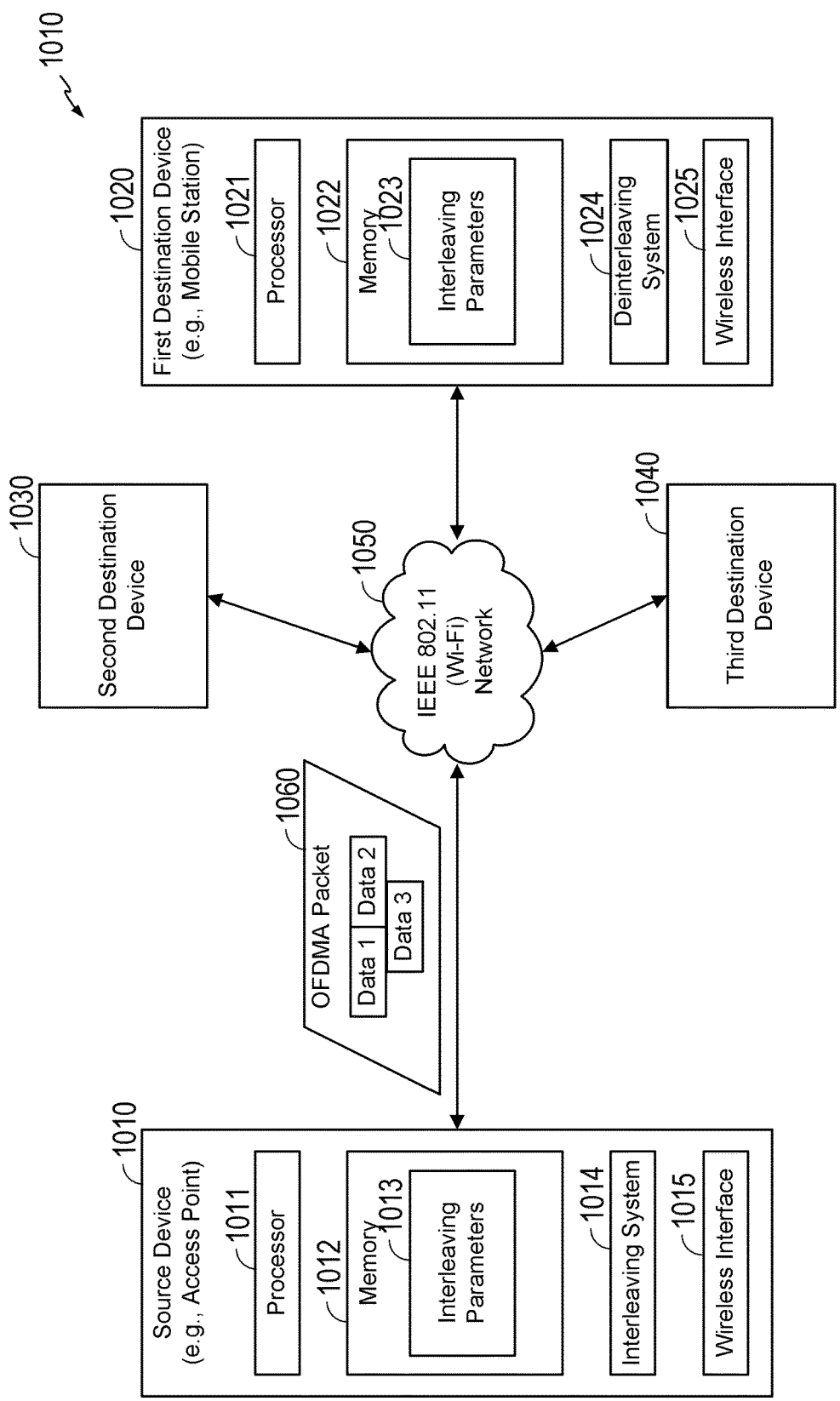
FIG. 6 shows a system that is operable to generate interleaving parameters for orthogonal frequency-division multiple access (OFDMA) tone plans, according to an embodiment.

FIG. 6 shows a system 1000 that is operable to generate interleaving parameters for orthogonal frequency-division multiple access (OFDMA) tone plans, according to an embodiment. The system 1000 includes a first device (e.g., a source device) 1010 configured to wirelessly communicate with a plurality of other devices (e.g., destination devices)

1020, 1030, and 1040 via a wireless network 1050. In alternate embodiments, a different number of source devices destination devices can be present in the system 1000. In various embodiments, the source device 1010 can include the AP 104 (FIG. 1) and the other devices 1020, 1030, and 1040 can include STAs 106 (FIG. 1). The system 1000 can include the system 100 (FIG. 1). In various embodiments, any of the devices 1010, 1020, 1030, and 1040 can include the wireless device 202 (FIG. 2).

In a particular embodiment, the wireless network 1050 is an Institute of Electrical and Electronics Engineers (IEEE) 802.11 wireless network (e.g., a Wi-Fi network). For example, the wireless network 1050 can operate in accordance with an IEEE 802.11 standard. In a particular embodiment, the wireless network 1050 supports multiple access communication. For example, the wireless network 1050 can support communication of a single packet 1060 to each of the destination devices 1020, 1030, and 1040, where the single packet 1060 includes individual data portions directed to each of the destination devices. In one example, the packet 1060 can be an OFDMA packet, as further described herein.

The source device 1010 can be an access point (AP) or other device configured to generate and transmit multiple access packet(s) to multiple destination devices. In a particular embodiment, the source device 1010 includes a processor 1011 (e.g., a central processing unit (CPU), a digital signal processor (DSP), a network processing unit (NPU), etc.), a memory 1012 (e.g., a random access memory (RAM), a read-only memory (ROM), etc.), and a wireless interface 1015 configured to send and receive data via the wireless network 1050. The memory 1012 can store binary convolutional code (BCC) interleaving parameters 1013 used by an interleaving system 1014 to interleave data according to the techniques described with respect to an interleaving system 1014 of FIG. 7.

As used herein, a "tone" can represent a frequency or set of frequencies (e.g., a frequency range) within which data can be communicated. A tone can alternately be referred to as a subcarrier. A "tone" can thus be a frequency domain unit, and a packet can span multiple tones. In contrast to tones, a "symbol" can be a time domain unit, and a packet can span (e.g., include) multiple symbols, each symbol having a particular duration. A wireless packet can thus be visualized as a two-dimensional structure that spans a frequency range (e.g., tones) and a time period (e.g., symbols).

As an example, a wireless device can receive a packet via a 20 megahertz (MHz) wireless channel (e.g., a channel having 20 MHz bandwidth). The wireless device can perform a 256-point fast Fourier transform (FFT) to determine 256 tones in the packet. A subset of the tones can be considered "useable" and the remaining tones can be considered "unusable" (e.g., can be guard tones, direct current (DC) tones, etc.). To illustrate, 238 of the 256 tones can be useable, which may include a number of data tones and pilot tones.

In a particular embodiment, the interleaving parameters 1013 can be used by the interleaving system 1014 during generation of the multiple access packet 1060 to determine which data tones of the packet 1060 are assigned to individual destination devices. For example, the packet 1060 can include distinct sets of tones allocated to each individual destination device 1020, 1030, and 1040. To illustrate, the packet 1060 can utilize interleaved tone allocation.

The destination devices 1020, 1030, and 1040 can each include a processor (e.g., a processor 1021), a memory (e.g., a memory 1022), and a wireless interface (e.g., a wireless interface 1025). The destination devices 1020, 1030, and 1040 can also each include a deinterleaving system 1024 configured to deinterleave packets (e.g., single access packets or multiple access packets), as described with reference to a MIMO detector 1118 of FIG. 7. In one example, the memory 1022 can store interleaving parameters 1023 identical to the interleaving parameters 1013.

During operation, the source device 1010 can generate and transmit the packet 1060 to each of the destination devices 1020, 1030, and 1040 via the wireless network 1050. The packet 1060 can include distinct sets of data tones that are allocated to each individual destination device according to an interleaved pattern.

The system 1000 of FIG. 6 can thus provide OFDMA data tone interleaving parameters for use by source devices and destination devices to communicate over an IEEE 802.11 wireless network. For example, the interleaving parameters 1013, 1023 (or portions thereof) can be stored in a memory of the source and destination devices, as shown, can be standardized by a wireless standard (e.g., an IEEE 802.11 standard), etc. It should be noted that various data tone plans described herein can be applicable for both downlink (DL) as well as uplink (UL) OFDMA communication.

For example, the source device 1010 (e.g., an access point) can receive signal(s) via the wireless network 1050. The signal(s) can correspond to an uplink packet. In the packet, distinct sets of tones can be allocated to, and carry uplink data transmitted by, each of the destination devices (e.g., mobile stations) 1020, 1030, and 1040.

Figure 7:
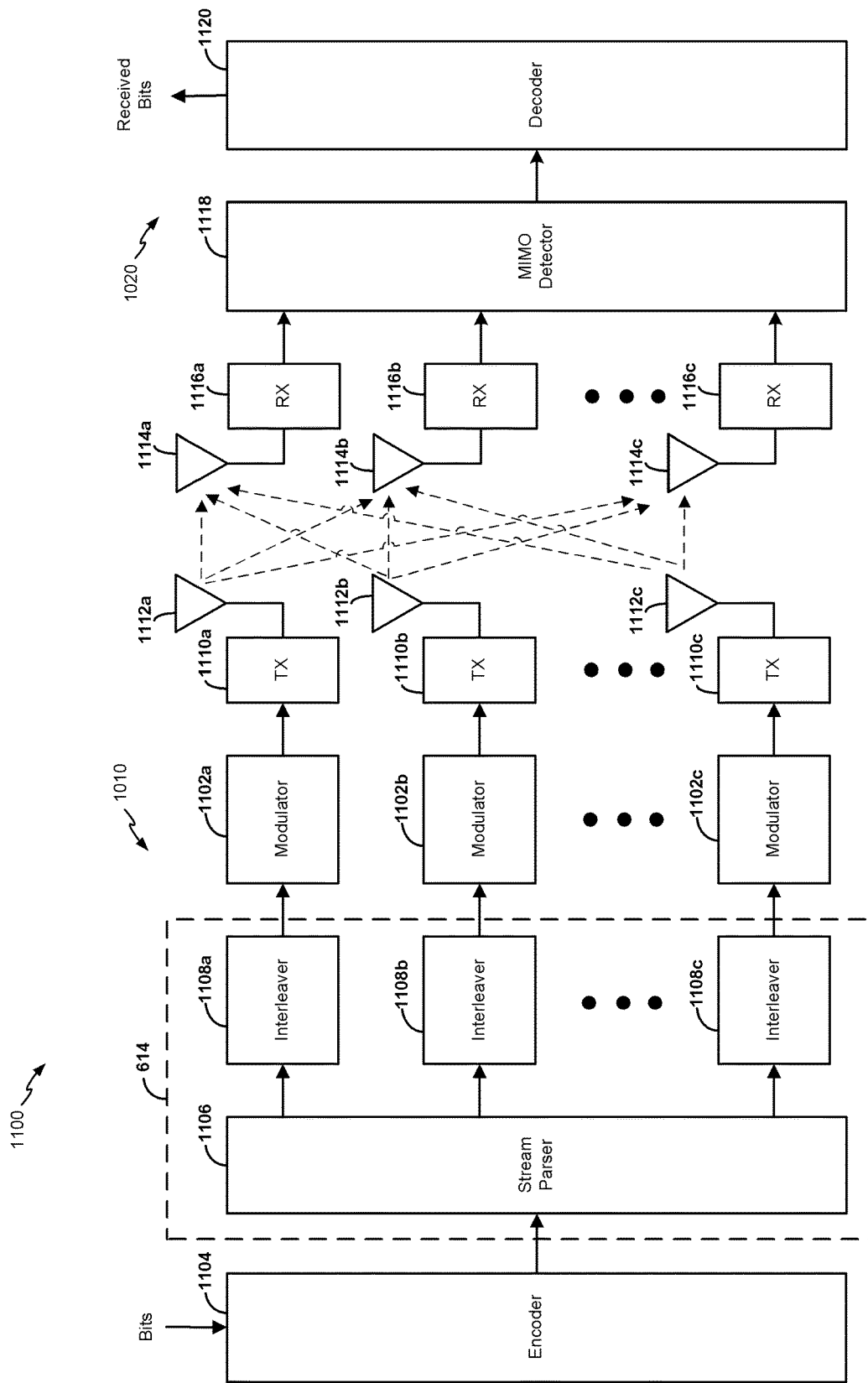
FIG. 7 shows an exemplary multiple-input-multiple-output (MIMO) system that can be implemented in wireless devices, such as the wireless device of FIG. 6, to transmit and receive wireless communications.

FIG. 7 shows an exemplary multiple-input-multiple-output (MIMO) system 1100 that can be implemented in wireless devices, such as the wireless device of FIG. 6, to transmit and receive wireless communications. The system 1100 includes the first device 1010 of FIG. 6 and the destination device 1020 of FIG. 6.

The first device 1010 includes an encoder 1104, the interleaving system 1014, a plurality of modulators 1102a-1102c, a plurality of transmission (TX) circuits 1110a-1110c, and a plurality of antennas 1112a-1112c. The destination device 1020 includes a plurality of antennas 1114a-1114c, a plurality of receive (RX) circuits 1116a-1116c, a MIMO detector 1118, and a decoder 1120.

A bit sequence can be provided to the encoder 1104. The encoder 1104 can be configured to encode the bit sequence. For example, the encoder 1104 can be configured to apply a forward error correcting (FEC) code to the bit sequence. The FEC code can be a block code, a convolutional code (e.g., a binary convolutional code), etc. The encoded bit sequence can be provided to the interleaving system 1014.

The interleaving system 1014 can include a stream parser 1106 and a plurality of spatial stream interleavers 1108a-1108c. The stream parser 1106 can be configured to parse the encoded bit stream from the encoder 1104 to the plurality of spatial stream interleavers 1108a-1108c.

Each interleaver 1108a-1108c can be configured to perform frequency interleaving. For example, the stream parser 1106 can output blocks of coded bits per symbol for each spatial stream. Each block can be interleaved by a corresponding interleaver 1108a-1108c that writes to rows and reads out columns. The number of columns (Ncol), or the interleaver depth, can be based on the number of data tones (Ndata). The number of rows (Nrow) can be a function of the number of columns (Ncol) and the number of data tones (Ndata). For example, the number of rows (Nrow) can be equal to the number of data tones (Ndata) divided by the number of columns (Ncol) (e.g., Nrow=Ndata/Ncol).

FIG. 8 illustrates interleaver parameters which may be used with a TAU of 32 tones. For example, a TAU with 32 tones may include 2 pilot tones and 30 data tones. In a particular embodiment, the interleaver depth (e.g., the number of columns (Ncol)) can be a factor of the number of data tones (Ndata). Accordingly, with a 30 data tone TAU size, a 30 data tone block can have an interleaver depth of 2, 3, 5, 6, 10, or 15.

A frequency rotation can be applied to the spatial streams if there is more than one spatial stream. The frequency rotation can be based on a base subcarrier rotation (NROT) and a rotation index. The base subcarrier rotation (NROT) and the rotation index can be based on the number of data tones (Ndata) and the number of spatial streams (Nss).

For example, if the data tone block has 4 or less spatial streams (Nss), the base subcarrier rotation (NROT) can be any of 1-18. The rotation index (e.g., the $6^{th}$ column) can be a bit reversal of [0 2 1 3] in this scenario. Alternatively, if the data tone block has more than 4 spatial streams (Nss), the base subcarrier rotation (NROT) can be any of 1-14. The rotation index (e.g., the 7th column) can be a bit reversal of [0 4 2 6 1 5 3 7] in some embodiments, or the rotation index can be chosen to maximize (or increase) an average subcarrier distance of adjacent streams in other embodiments (e.g., [0 5 2 7 3 6 1 4]). Although a rotation index of [0 5 2 7 3 6 1 4] is used herein as one example of an index maximizing average subcarrier distance, any other rotation indexes that maximizes (or increases) average subcarrier distance can be used. For example, any permutation which maximizes the average subcarrier distance of adjacent streams may be used, and [0 5 2 7 3 6 1 4] is only one example.

Generally, LDPC tone mapping distance (DTM) is defined in the IEEE 802.11ac specification. The mapping distance (DTM) can be at least as large as the number of coded bits per OFDM symbol (NCBPS) divided by the LDPC codeword length (LCW) (e.g., NCBPS/LCW≤DTM) so that each LDPC codeword covers the full range of tones. Additionally, the mapping distance (DTM) can be an integer divisor of the number of subcarriers (Ndata). The mapping distance (DTM) can be constant over rates within each bandwidth to enable a tone de-mapper implemented at a Fast Fourier Transform (FFT) module of the receive circuits 1116a-1116c with fixed tone processing. In some aspects, when using a 30 data tone block, the LDPC tone mapping distance may be chosen from the following candidates: 2, 3, 5, 6, 10, and 15. Further, a 30 data tone block may have zero modulation and coding scheme (MCS) exclusions.

Figure 9:
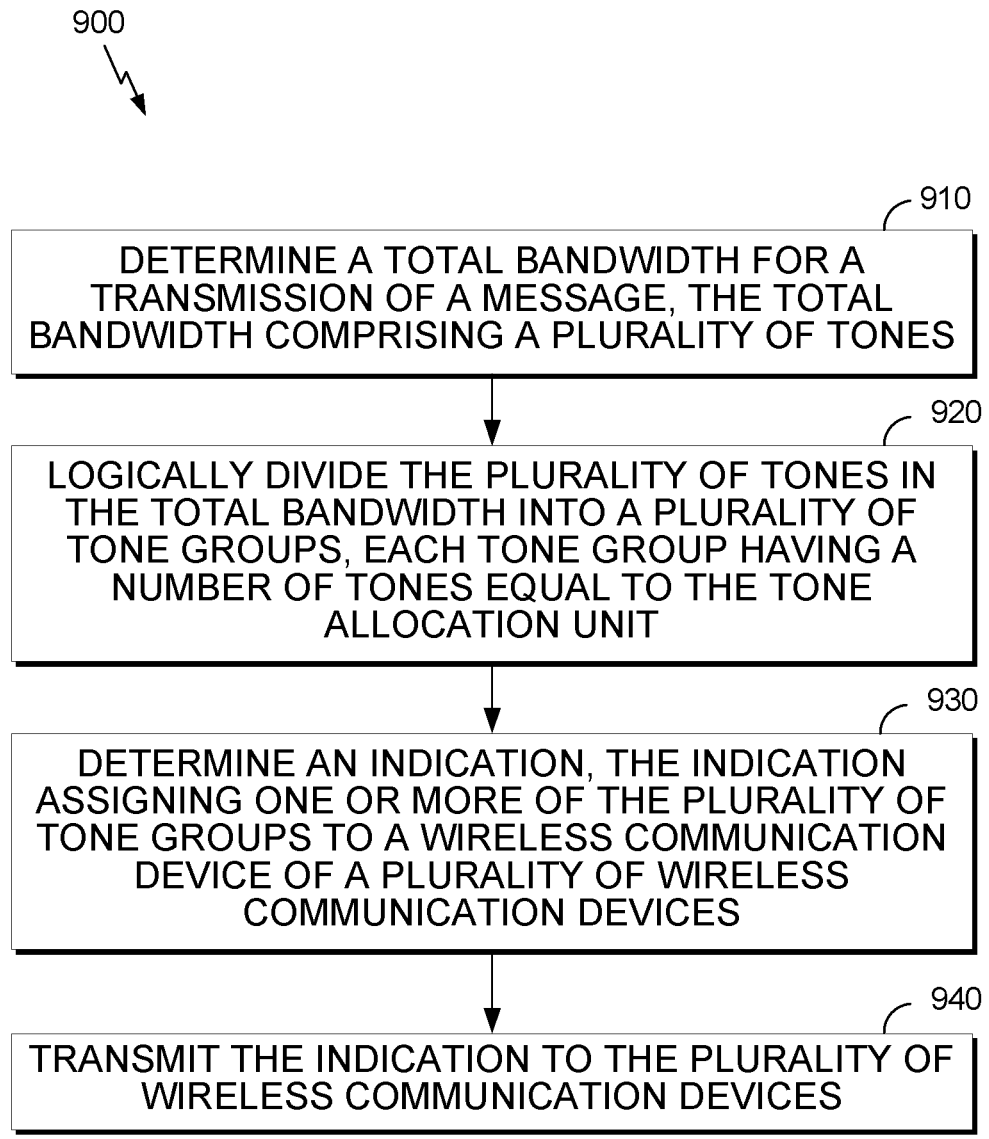
FIG. 9 shows a flowchart for an exemplary method of communicating over a wireless communication network using a tone allocation unit.

FIG. 9 shows a flowchart 900 for an exemplary method of communicating over a wireless communication network using a tone allocation unit. This method may be done by an AP 104. This method may be used to divide a bandwidth between a number of different devices, in order to allow those devices to transmit or receive an uplink or a downlink OFDMA transmission.

At block 910, the AP 104 determines a total bandwidth for a transmission of a message, the total bandwidth comprising a plurality of tones. For example, this bandwidth may be one of 20 MHz, 40 MHz, or 80 MHz. In some aspects, the plurality of tones includes a number of useable tones which may be used as data or pilot tones, and wherein the message further includes guard tones and direct current tones. For example, the plurality of tones may be used to refer only to the useable tones, and may not refer to the guard tones or DC tones which may be found in any message. Accordingly, those tones may not be divided into groups using the TAU size. In some aspects, the means for determining may include a processor.

At block 920, the AP 104 logically divides the plurality of tones in the total bandwidth into a plurality of tone groups, each tone group having a number of tones equal to the tone allocation unit. In some aspects, the tone allocation unit may be one of 26 or 32 tones, and may include 2 pilot tones and 24 or 30, respectively, data tones. When a 32 tone TAU is used, logically dividing the plurality of tones in the total bandwidth into a plurality of tone groups may include one of logically dividing 238 tones into 7 tone groups, logically dividing 494 tones into 15 tone groups, and logically dividing 1006 tones into 31 tone groups. When a 26 tone TAU is used, logically dividing the plurality of tones in the total bandwidth into a plurality of tone groups may include one of logically dividing 238 tones into 9 tone groups, logically dividing 494 tones into 19 tone groups, and logically dividing 1006 tones into 38 tone groups. In some aspects, a number of tones in the plurality of tones that are not in any tone group may be allocated for one or more of synchronization, common control, signaling, scheduling, and power control. The means for allocating may include a processor. These tones may be referred to as leftover tones. These leftover tones may also be used as direct current or protection edge tones in the message. Leftover tones may also be grouped together to form a last tone group, which is smaller (contains fewer tones) than the other tones groups. In some aspects, the means for logically dividing may include a processor.

At block 930, the AP 104 determines an indication, the indication assigning one or more of the plurality of tone groups to a wireless communication device of a plurality of wireless communication devices. In some aspects, the means for determining may include a processor.

At block 940, the AP 104 transmits the indication to the plurality of wireless communication devices. In some aspects, this indication may be a trigger message which may trigger an UL OFDMA transmission. For example, this message may be transmitted to a number of wireless devices, informing those devices of their allocated tones, and of other information, such as a timing of the UL OFDMA transmission. Accordingly, those devices may be configured to transmit the UL OFDMA transmission based, at least in part, on information found in the indication. In some aspects, this indication may be a packet header of a downlink message. For example, a DL OFDMA message may include a packet header, and the indication may be included as part of that packet header. In some aspects, the means for transmitting may include a transmitter.

In some aspects, the AP 104 further transmits the message to at least the wireless communication device. For example, when the message is a DL OFDMA transmission, the AP 104 may transmit the message to one or more wireless communication devices. In some aspects, transmitting the message may include interleaving the message, which includes interleaving encoded data and generating a series of interleaved bits for transmission based on the interleaved encoded data, the interleaver including one or more stream interleavers corresponding to one or more spatial streams, the one or more stream interleavers including using a base subcarrier rotation of one of 1 through 18 and interleaved rotation indexes of [0 2 1 3] for up to four spatial streams, and using a base subcarrier rotation of one of 1 through 14 and interleaved rotation indexes of [0 4 2 6 1 5 3 7], or [0 5 2 7 3 6 1 4] or another permutation chosen to maximize an average subcarrier distance of adjacent streams for more than four spatial streams. In some aspects, the means for interleaving may include a processor. The means for generating may include a processor.

Figure 10:
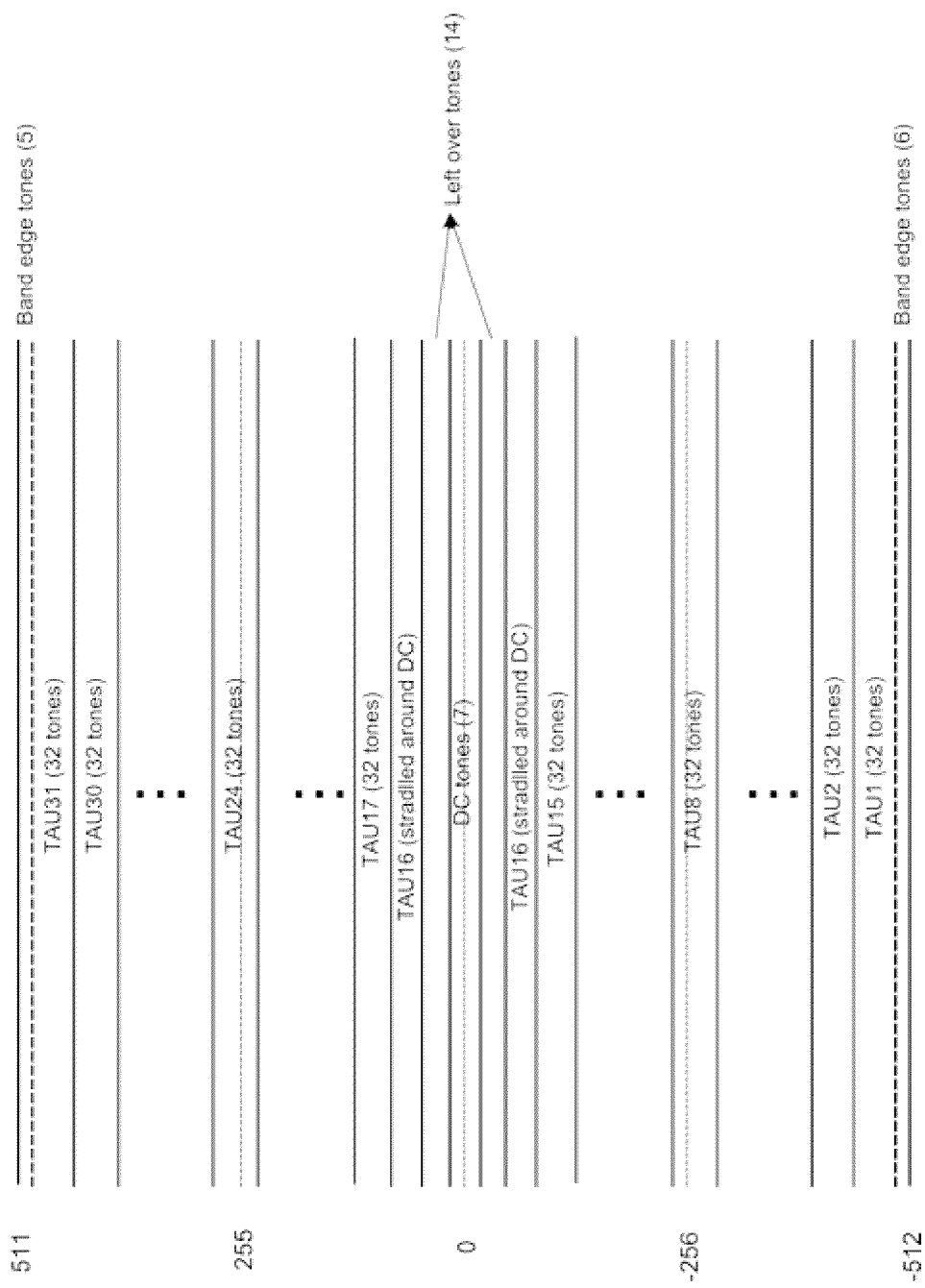
FIG. 10 is an illustration of an exemplary example of a location of leftover tones in a transmission according to certain aspects of this disclosure.
Figure 11:
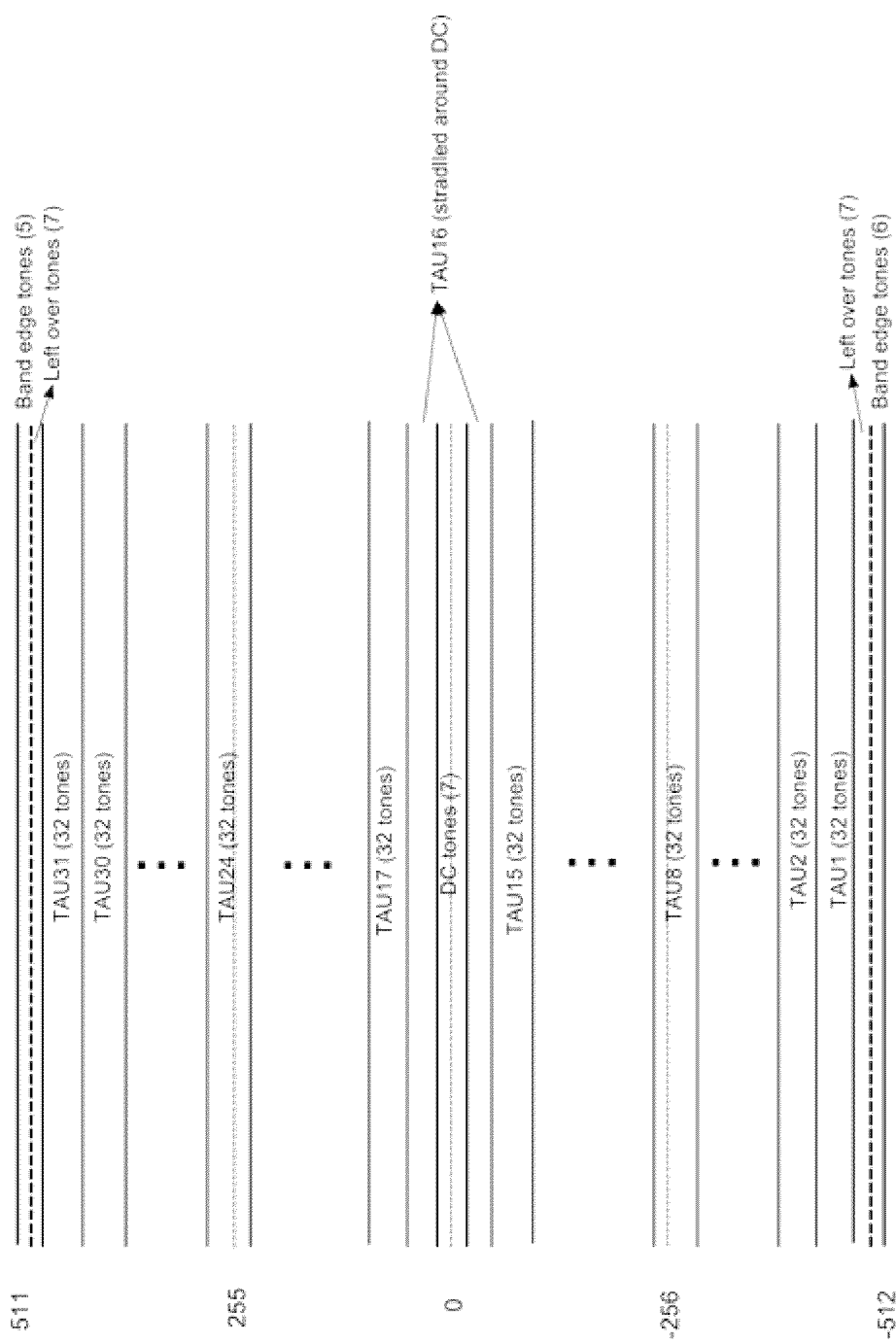
FIG. 11 is an illustration of an exemplary example of a location of leftover tones in a transmission according to certain aspects of this disclosure.

In some aspects, the TAUs may be arranged such that leftover tones may be located on each side of the DC tones. FIG. 10 is an illustration of an exemplary location of leftover tones. In this illustration, there are 14 leftover tones, as TAUs of 32 tones were used. These tones have been placed around the DC tones, with 7 leftover tones on each side of the DC tones. In some aspects, the TAUs may be arranged such that leftover tones may be located at the edge of a transmission. FIG. 11 is another illustration of an exemplary location of leftover tones. In this illustration, there are 14 leftover tones, as TAUs of 32 tones were used. These tones have been placed at the edge of the transmission, with 7 leftover tones on each side of the DC tones, adjacent to the guard tones and the band edges of the transmission. Accordingly, tones in the plurality of tones that are not in any tone group may be located adjacent to guard tones or to direct current tones in a message.

In some aspects, it may be beneficial if boundaries between 20 and 40 MHz portions of a transmission are maintained. For example, guard tones may be placed around each 20 MHz portion of a transmission, such that each individual 20 MHz portion of the transmission may be decoded separately. Further, each TAU in such a scenario may be located in a single 20 MHz portion of a transmission, such that no TAUs straddle a boundary between two different 20 MHz portions. Accordingly, each 20 MHz portion of the transmission may be decoded separately, such that a receiving device may only need to decode a subset of the 20 MHz portions of the transmission, rather than the entire bandwidth of the transmission.

It may be desirable to use TAU sizes which are optimized for better performance with boundaries between each 20 MHz portion of a transmission. For example, various TAU sizes may have more or fewer leftover tones when there are boundaries between each 20 MHz portion of a transmission. Thus, a TAU size may be chosen while keeping in mind a number of leftover tones when 20 MHz boundaries are used.

FIG. 12 is an illustration of using a tone allocation unit which includes 34 tones, for each of a 20 MHz, a 40 MHz, and an 80 MHz transmission. A 34 tone TAU, as illustrated, may be used in conjunction with guard tones between each 20 MHz portion of the transmission. In a 20 MHz transmission, there may be 7 DC tones and 11 guard tones out of the 256 total tones. Accordingly, there may be 238 tones for allocation. When using a 34 tone TAU, there may be 7 TAUs with no leftover tones. Because this is a 20 MHz transmission only, there is no need for additional guard tones to ensure that each 20 MHz portion of the transmission can be decoded separately.

In a 40 MHz transmission, there may be 512 tones. Typically, such a transmission may include 7 DC tones and 11 guard tones. However, according to the IEEE 802.11ac standard, 11 guard tones are needed between various transmissions in order to ensure that those transmissions can be decoded separately. Accordingly, this 40 MHz transmission may have 11 DC tones, which also serve as guard tones between the lower 20 MHz (from tones −1 to −256) and the upper 20 MHz (from tones 0 to 255) of the transmission. Thus, this 40 MHz transmission may include 11 edge tones, and 11 DC/guard tones between the two 20 MHz portions of the transmission, leaving 490 tones which may be used as data and pilot tones. These 490 tones may allow for 14 TAUs, with 14 leftover tones. Having 14 leftover tones may represent a waste of 2.73%.

Figure 13:
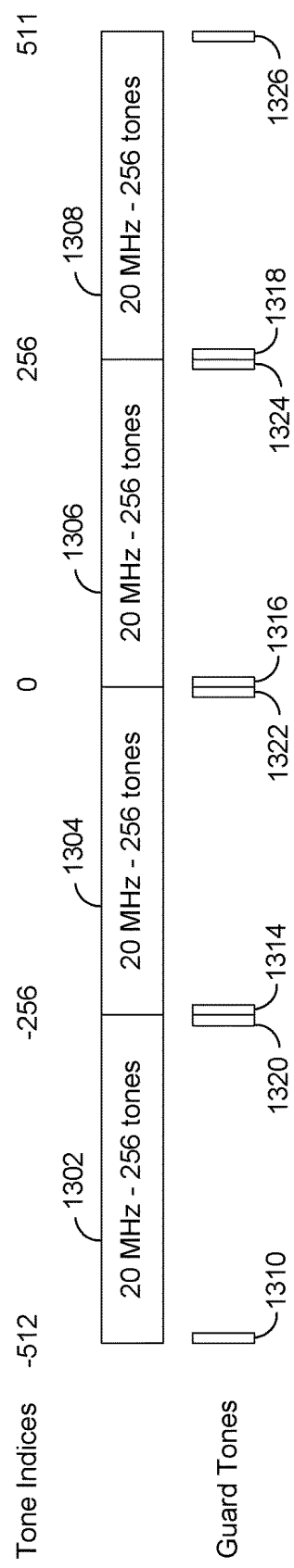
FIG. 13 is an illustration of the location of guard tones which may be used to allow the four 20 MHz portions of the 80 MHz transmission to be decoded separately.

In an 80 MHz transmission, there may be 1024 tones, and four 20 MHz portions. FIG. 13 is an illustration of the location of guard tones which may be used to allow the four 20 MHz portions of the 80 MHz transmission to be decoded separately. For example, each of the four 20 MHz portions may have 6 guard tones on the left of the portion (at the lowest six tone indices in the portion), such as guard tones 1310. Further, each of the four 20 MHz portions may have 5 guard tones on the right of the portion (in the five highest tone indices in the portion), such as guard tones 1320. Thus, guard tones may be found in this 80 MHz transmission at indices [−512,−507], [−261,−251], [−5, 5], [251,261], and [507,511]. Accordingly, each 20 MHz portion of the 80 MHz transmission may include 11 guard or edge tones. Thus, the 80 MHz transmission may include 44 guard tones. Of these tones, 11 of these tones (with indices [−5, 5]) may also act as DC tones between the two 40 MHz halves of the 80 MHz transmission. Similarly, the 11 tones between the first and second 20 MHz portions 1302, 1304 may be thought of as DC tones between the two halves of the first 40 MHz portion. For example, the 11 guard tones 1320, 1312 may be referred to as DC1. Similarly, the 11 guard tones between portion 1306 and portion 1308 may be referred to as DC2.

Thus, the 80 MHz transmission may include 44 DC and edge tones, and therefore have 980 tones which may be used for allocations. These tones may be divided into 28 TAUs, with 28 leftover tones. Accordingly, this transmission may have a waste of 4.88%, which includes the 22 additional tones which were used to create boundaries between the 20 MHz portions of the transmission (DC1 and DC2).

The transmissions illustrated in FIG. 12 each includes clear 20 and 40 MHz boundaries, and include 7 TAUs for each 20 MHz portion. The 40 and 80 MHz allocations each also include 7 leftover tones in each 20 MHz portion. As before, the leftover tones may be used for synchronization, for common control, for signaling, for scheduling, and for a power control (PC) channel. These tones may also be added to the edge tones or to the DC tones. One advantage of the 34 TAU may be that that number of TAUs scales evenly by bandwidth, as each doubling of the bandwidth doubles the number of available tones. In some aspects, a 34 tone TAU may be used with either 4 pilot tones per TAU, using a 30 symbol interleaver, or with 2 pilot tones per TAU, using a 32 symbol interleaver. The use of a 30 symbol interleaver is described above, with reference to FIG. 8.

In some aspects, the leftover tones in a 40 MHz and an 80 MHz transmission may be grouped together in order to form tone groups out of these tones. These tone groups may be a different size than the other TAUs. For example, a tone group size of 14 may be used, such that a 40 MHz transmission may include 1 such tone group, and an 80 MHz transmission may include 2 such tone groups. These tone groups may include tones in two or more 20 MHz portions of a transmission. For example, each 20 MHz portion of the transmission may contain 7 leftover tones. Accordingly, it may take at least two such portions to construct a 14 tone group. When using a 14 tone group with a 34 tone TAU, a 40 MHz transmission may include 15 tone groups, and an 80 MHz transmission may include 30 tone groups.

FIG. 14 illustrates interleaver parameters which may be used with a tone allocation unit of 34 tones with 2 pilot tones per TAU. In a particular embodiment, the interleaver depth (e.g., the number of columns (Ncol)) can be a factor of the number of data tones (Ndata). Accordingly, with a 32 data tone TAU size, a 32 data tone block can have an interleaver depth of 2, 4, 8, or 16.

A frequency rotation can be applied to the spatial streams if there is more than one spatial stream. The frequency rotation can be based on a base subcarrier rotation (NROT) and a rotation index. The base subcarrier rotation (NROT)

and the rotation index can be based on the number of data tones (Ndata) and the number of spatial streams (Nss).

For example, if the data tone block has 4 or less spatial streams (Nss), the base subcarrier rotation (NROT) can be any of 1-18. The rotation index (e.g., the $6^{th}$ column) can be a bit reversal of [0 2 1 3] in this scenario. Alternatively, if the data tone block has more than 4 spatial streams (Nss), the base subcarrier rotation (NROT) can be any of 1-14. The rotation index (e.g., the 7th column) can be a bit reversal of [0 4 2 6 1 5 3 7] in some embodiments, or the rotation index can be chosen to maximize (or increase) an average subcarrier distance of adjacent streams in other embodiments (e.g., [0 5 2 7 3 6 1 4]). Although a rotation index of [0 5 2 7 3 6 1 4] is used herein as one example of an index maximizing average subcarrier distance, any other rotation indexes that maximizes (or increases) average subcarrier distance can be used. For example, any permutation which maximizes the average subcarrier distance of adjacent streams may be used, and [0 5 2 7 3 6 1 4] is only one example.

Generally, LDPC tone mapping distance (DTM) is defined in the IEEE 802.11ac specification. The mapping distance (DTM) can be at least as large as the number of coded bits per OFDM symbol (NCBPS) divided by the LDPC codeword length (LCW) (e.g., NCBPS/LCW≤DTM) so that each LDPC codeword covers the full range of tones. Additionally, the mapping distance (DTM) can be an integer divisor of the number of subcarriers (Ndata). The mapping distance (DTM) can be constant over rates within each bandwidth to enable a tone de-mapper implemented at a Fast Fourier Transform (FFT) module of the receive circuits 1116a-1116c with fixed tone processing. In some aspects, when using a 32 data tone block, the LDPC tone mapping distance may be chosen from the following candidates: 2, 4, 8, and 16. Further, a 32 data tone block may have six modulation and coding scheme (MCS) exclusions, for MCS9 with each of 1, 2, 4, 5, 7, and 8 spatial streams. Accordingly, in some aspects, when a 32 data tone black is used, MCS9, as a whole, may be unused, due to the number of excluded MCS combinations.

FIG. 15 is an illustration of using a tone allocation unit which includes 26 tones, for each of a 20 MHz, a 40 MHz, and an 80 MHz transmission. A 26 tone TAU, as illustrated, may be used in conjunction with guard tones between each 20 MHz portion of the transmission. In a 20 MHz transmission, there may be 7 DC tones and 11 guard tones out of the 256 total tones. Accordingly, there may be 238 tones for allocation. When using a 26 tone TAU, there may be 9 TAUs with 4 leftover tones, for a waste of 1.56%. Because this is a 20 MHz transmission, there is no need for additional guard tones to ensure that each 20 MHz portion of the transmission can be decoded separately.

In a 40 MHz transmission, there may be 512 tones. Typically, such a transmission may include 7 DC tones and 11 guard tones. However, according to the IEEE 802.11ac standard, 11 guard tones may be needed between various transmissions in order to ensure that those transmissions can be decoded separately. Accordingly, this 40 MHz transmission may have 11 DC tones, which also serve as guard tones between the lower 20 MHz (from tones −1 to −256) and the upper 20 MHz (from tones 0 to 255) of the transmission. Thus, this 40 MHz transmission may include 11 edge tones, and 11 DC/guard tones between the two 20 MHz portions of the transmission, leaving 490 tones which may be used as data and pilot tones. These 490 tones may allow for 18 TAUs where each TAU has 26 tones, with 22 leftover tones. Having 22 leftover tones may represent a waste of 4.30%.

In an 80 MHz transmission, there may be 1024 tones, and four 20 MHz portions. As before, the 80 MHz transmission may include 44 DC and edge tones, and may therefore have 980 tones which may be used for data and pilot tones. These tones may be divided into 36 TAUs, with 44 leftover tones. Accordingly, this transmission may have a waste of 6.45%, which includes the 22 additional tones which were used to create boundaries between the 20 MHz portions of the transmission (DC1 and DC2). It may be noted that there are 44 leftover tones, which is actually larger than the TAU size of 26. However, these leftover tones may be scattered across the various 20 MHz portions. For example, each 20 MHz portion may have 11 leftover tones. Thus, the leftover tones may not be suitable for forming another TAU, as that TAU would, by necessity, have to span two or more 20 MHz portions.

The transmissions illustrated in FIG. 15 each includes clear 20 and 40 MHz boundaries, and include 9 TAUs for each 20 MHz portion. The 40 and 80 MHz allocations each also include 11 leftover tones in each 20 MHz portion. As before, the leftover tones may be used for synchronization, for common control, for signaling, for scheduling, and for a power control (PC) channel. These tones may also be added to the edge tones or to the DC tones. One advantage of the 26 tone TAU may be that that number of TAUs scales evenly by bandwidth, as each doubling of the bandwidth doubles the number of available tones. In some aspects, a 26 tone TAU may be used with 2 pilot tones per TAU, using a 24 symbol interleaver. The parameters of such an interleaver may be well-known to those of skill in the art, as 24 tone interleavers have been used before in various implementations of IEEE 802.11 standards and proposals.

In some aspects, the leftover tones in a 40 MHz and an 80 MHz transmission may be grouped together in order to form tone groups out of these tones. These tone groups may be a different size than the other TAUs. For example, these tone groups may include 14 tones. Thus, in a 40 MHz transmission, one smaller tone group may be formed from the 22 leftover tones. In an 80 MHz transmission, three smaller tone groups may be formed from the 44 leftover tones. These tone groups may include tones in two or more 20 MHz portions of a transmission. For example, each 20 MHz portion of the transmission may contain 11 leftover tones. Accordingly, it may take at least two such portions to construct a 14 tone group. When using a 14 tone group with a 26 tone TAU, a 40 MHz transmission may include 19 tone groups including the smaller tone group, and an 80 MHz transmission may include 39 tone groups including the three smaller tone groups.

FIG. 16 illustrates a comparison between the number of data tones found in transmissions of various bandwidths when using different tone allocation units and when preserving different boundaries. As illustrated, option 2 may include using a TAU size of 32, with 30 data tones, option 3 may include using a TAU size of 34 with 32 data tones, and option 4 may include using a TAU size of 26 with 24 data tones. For example, option 2 may correspond to the option presented in FIG. 5. However, this allocation may be modified, as needed, in order to preserve one or more of the boundaries in 40 MHz and 80 MHz transmissions. In order to preserve these boundaries, option 2 may include fewer TAUs, as those TAUs may otherwise occur on a boundary between two 20 MHz portions of a transmission.

For a 20 MHz transmission, option 2 may include 30 data tones in each of 7 TAUs, option 3 may include 32 data tones in each of 7 TAUs, and option 4 may include 24 data tones in each of 9 TAUs. Accordingly, the various options may provide 210, 224, and 216 data tones, respectively. Thus, in some aspects, option 3 may allow for the highest throughput in a 20 MHz transmission, as it may have more data tones.

For a 40 MHz transmission where the boundaries are not preserved, that various options may include 450, 448, and 432 data tones. However, if the 20 MHz boundaries are preserved and 11 tones are used as boundary tones between the two 20 MHz portions of the 40 MHz transmission, option 2 may only be able to include 14 TAUs, and may thus include only 420 data tones.

For an 80 MHz transmission, option 3 may include 896 data tones and option 4 may include 864 data tones. When no boundaries are kept, option 2 may include 930 data tones. In order to allow for 11 guard tones between the two 40 MHz portions, option 2 may have 1 less TAU, and thus contain 900 data tones. In order to keep both DC1 and DC2, but still have only 7 DC tones, option 2 may have 29 TAUs, and 870 data tones. In order to include four 20 MHz portions, each of which may be decoded separately, option 2 may include only 840 data tones.

Note that in options 3 and 4, the 20 and 40 MHz boundaries are always respected. However, in option 2, the number of TAUs is reduced each time a 20 MHz or 40 MHz boundary is preserved. Thus, since a 40 MHz transmission includes one boundary, this reduces the number of TAUs in option 2 from 15 to 14. An 80 MHz transmission may include one boundary (the 40 MHz boundary), two boundaries (the two 20 MHz boundaries), or three boundaries (the 20 MHz boundaries and the 40 MHz boundary). Accordingly, option 2 for an 80 MHz transmission may be reduced from 31 to 30, 29, or 28, depending on how many of these boundaries are preserved.

FIG. 16 may be used to compare the bandwidth efficiency of these three options. When certain 20 and 40 MHz boundaries are preserved, option 2 has no advantage over option 3, but may still have more data tones than option 4, depending on which boundaries are preserved. It may also be noted that option 2 and option 4 do not exclude any MCS combinations, while option 3 excludes six MCS combinations (MCS9 with each of 1, 2, 4, 5, 7, and 8 spatial streams). In some aspects, option 3 may include more data tones than option 4 because option 3 includes fewer pilot tones per data tone (2 pilot tones for 32 data tones, compared to 2 pilot tones for 24 data tones), and may also have fewer leftover tones.

Thus, in some aspects, the above tone allocation unit sizes and plans may provide that a tone allocation unit may include 34 tones. For example, each tone group may include 2 pilot tones and 32 data tones. In some aspects, logically dividing the plurality of tones in the total bandwidth of a transmission into a plurality of tone groups may include one of logically dividing 238 tones into 7 tone groups, logically dividing 490 tones into 14 tone groups, and logically dividing 980 tones into 28 tone groups. In some aspects, logically dividing the plurality of tones in the total bandwidth into a plurality of tone groups may include one of logically dividing 238 tones into 9 tone groups, logically dividing 490 tones into 18 tone groups, and logically dividing 980 tones into 36 tone groups. In some aspects, transmitting the message to at least the wireless communication device includes transmitting a 40 or 80 MHz message such that each 20 MHz portion of the 40 or 80 MHz message includes 11 guard tones. This may allow each 20 MHz portion of the transmission to be decoded separately, as discussed above. In some aspects, a low-density parity check mapping distance is one of 2, 4, 8, and 16. For example, these LDPC values may be used when a tone group that includes 32 data tones is used.

Thus, according to some aspects of the above, a tone plan may have one basic tone allocation unit (TAU), with a fixed size of 32 tones for all bandwidths in an IEEE 802.11 standard. This may offer a number of advantages. First, this may allow for just one basic block size, which may simplify allocations to devices, and simplify the number of needed tone plans. This 32 tone allocation may also be exactly 2.5 MHz in size, which may be beneficial for, for example, keeping 20 MHz boundaries between various portions of a transmission clear. Using the same TAU regardless of bandwidth may also allow for fixes TAU and pilot locations in all bandwidths. This may also allow for an odd number of TAUs for all bandwidths. Further, higher bandwidth grids may consist of just additional TAUs on both sides of a lower bandwidth grid. This may also allow for simple feedback from various devices for subband transmission. For example, a STA may report the TAU index which has the best channel, and thus, the AP may use that information when assigned TAUs to that STA. The use of one basic tone allocation may also leave consistent leftover tones across all bandwidths. These leftover tones may be placed at a fixed location. Accordingly, there may either be used as a small tone unit (STU), or may be used for common control signaling.

However, in some aspects, an entire bandwidth of a transmission may be allocated to one device (a whole bandwidth allocation). For example, this may occur when a transmission is used for an MU-MIMO transmission, or when a single user is allocated the entire bandwidth. Generally, when a single user is allocated an entire bandwidth, it may be possible to use fewer pilot tones (for the same number of data tones, or for the same number of data tones plus pilot tones) than would be needed if the bandwidth was split among multiple devices. Thus, such a transmission may use fewer pilot tones, and therefore be more efficient in the sense of including a higher number of data tones in the same bandwidth. A number of different options may be used in such a transmission, which may offer different advantages and disadvantages.

First, a whole bandwidth allocation may still use the same 32-tone TAU based plan. This option may be simple, as it may reuse the same 32 tone processing as described previously. However, this 32 tone processing includes 2 pilot tones for each 30 data tones. While this number of pilot tones may be necessary when a device is assigned a small number of TAUs (such as one), it may be possible to use fewer pilot tones in a whole bandwidth allocation. Accordingly, this option may lack efficiency compared to other alternatives.

Second, a whole bandwidth allocation may use a different tone plan than described above. For example, the whole bandwidth allocation may use tone plans based on IEEE 802.11ac tone plans. This may solve efficiency issues, but may require the use of new signaling (such as including a one or two bit field to indicate that a transmission is using such a tone plan). For example, a 20 MHz transmission may use a tone plan that is based on an IEEE 802.11ac VHT80 (Very High Throughput 80 MHz) transmission. Since this 20 MHz packet may include 4× symbol duration relative to 802.11ac, the packet may have the same number of tones as an 80 MHz transmission in 802.11ac. Thus, the 80 MHz transmission from 802.11ac may be used as a 20 MHz transmission here. One possible issue with this, however, is that such a transmission includes only 3 DC tones. This may be an insufficient number of DC tones for a 4× symbol duration transmission. In a 40 MHz transmission, a new tone plan may be used, or a two VHT80 transmissions (VHT80+ 80 or VHT160) may be used. For example, in 802.11ac, a 160 MHz transmission may be transmitted by using the 80 MHz VHT80 tone plan, duplicated twice. For an 80 MHz transmission, this may use a new tone plan, or may use a duplicated 40 MHz tone plan (that is, four VHT80 transmissions from IEEE 802.11ac). Generally, however, duplicating these transmissions may result in having more pilot tones than may otherwise be necessary, as the number of pilot tones may not grow linearly as the number of data tones grows. That is, in larger transmissions, proportionally fewer pilot tones may be needed. For example, it may be possible to double the number of data tones, while only needing two additional pilot tones, rather than requiring that pilot tones also double.

A third option for efficient whole bandwidth transmission may be to use a 32 tone TAU plan, with punctured pilot tones. For example, extra pilot tones may be "punctured," and may be used as data tones rather than pilot tones. Further, a transmission which is transmitted by a single device may also need fewer DC tones. Accordingly, certain DC tones may also be "punctured," and may be used as data tones rather than DC tones. These punctured pilot tone plans may thus contain the same TAUs generally as an ordinary TAU-based tone plan above, but certain tones which would otherwise be pilot tones or DC tones may be used as additional data tones. Thus, this tone plan may have fewer pilot and/or DC tones, and more data tones than an unaltered TAU-based tone plan, which may be advantageous in whole bandwidth transmissions.

For example, in an 80 MHz transmission, for every 8 pilot tones under the TAU plan (in 4 32-tone TAUs), 2 may be used as pilot tones, and 6 may be repurposed as additional data tones. In an 80 MHz transmission with 32 tone TAUs, there may be 31 TAUs and 14 leftover tones, which may be used as a 12 data tone block with 2 pilot tones (a STU). Thus, the 80 MHz transmission may include 64 pilot tones (2 in each TAU, plus 2 in the 14 leftover tones). After pilot puncture, there may be only 16 pilot tones, plus 48 additional data tones. Generally, all of the pilot-punctured data tones may be grouped together into data tone blocks. For example, in 80 MHz, the pilot-punctured data tones (48) may be grouped with the 12 data tones from the leftover tones/STAU, in order to make two 30 data tone blocks. Accordingly, using pilot puncture may allow for a more efficient transmission and may not require additional interleaver parameters (since it may still use the same 30 and 12 tone data blocks).

FIG. 17 is a comparison of the efficiency of various options for a whole bandwidth allocation in a 20 MHz transmission. The first column includes a transmission according to an IEEE 802.11n/11ac with 1× symbol duration. This transmission may include 7 guard tones, 1 DC tone, 4 pilot tones, and 52 data tones. This is out of 64 total tones, since at 1× symbol duration, 20 MHz includes only 64 tones rather than 256 tones at 4× symbol duration.

Option 1 uses a 32 tone TAU plan, without modification. This includes 11 guard tones, 7 DC tones, and 16 pilot tones, with 222 data tones (in 7 TAUs of 30 data tones, and one 12 data tone STU). This may offer a 5% efficiency gain compared to the 802.11n/ac tone plan. This is based upon a comparison of the number of data tones in the plan compared to the number of total tones, for each of the two options.

Option 2 uses an IEEE 802.11ac tone plan for an 80 MHz transmission. Since a 4× symbol duration transmission at 20 MHz includes the same number of tones as an 80 MHz 1× symbol duration transmission, such a tone plan may be usable here. This tone plan includes 11 guard tones, 3 DC tones, 8 pilot tones, and 234 data tones, for a 10% efficiency gain over IEEE 802.11n/ac.

Finally, Option 3 uses a TAU plan with pilot puncture, to use surplus pilot tones as data tones. This option includes 11 guard tones, 3 DC tones, and 8 pilot tones. It may be observed that pilot puncture may be used here to allow surplus DC tones to become data tones as well. Generally, a whole bandwidth allocation may not need as many DC tones as other possible OFDMA allocations. Accordingly, there may be only 3 DC tones in this allocation. As illustrated here, this may allow for 234 data tones, which may be grouped as 7 30 data tone TAUs, and two 12 data tone STUs. This tone plan may be just as efficient as the IEEE 802.11ac-based tone plan. Additionally, option 3 may not require any new interleaver parameters, as this option includes only 30 data tone units and 12 data tone units. The interleaver parameters for both of these data tone units may be known, and used elsewhere in these methods as well. Accordingly, no new interleaver parameters may be needed.

FIG. 18 is a comparison of the efficiency of various options for a whole bandwidth allocation in a 40 MHz transmission. The first column includes a transmission according to an IEEE 802.11n/11ac with 1× symbol duration. This transmission may include 11 guard tones, 3 DC tones, 6 pilot tones, and 108 data tones. This is out of 128 total tones, since at 1× symbol duration, 40 MHz includes only 128 tones rather than 512 tones at 4× symbol duration.

Option 1 uses a 32 tone TAU plan, without modification. This includes 11 guard tones, 7 DC tones, and 32 pilot tones, with 462 data tones (in 15 TAUs of 30 data tones, and one 12 data tone STU). This may offer a 6% efficiency gain compared to the 802.11n/ac tone plan. This is based upon a comparison of the number of data tones in the plan compared to the number of total tones, for each of the two options.

Option 2 uses an IEEE 802.11ac tone plan for a 160 MHz transmission, which involves duplicating two 80 MHz tone plans. As before, this tone plan, although originally used for 160 MHz, may be used for 40 MHz here due to the larger number of tones in a given bandwidth when using longer symbol durations. This tone plan includes 11 guard tones, 11 DC tones, 6 idle tones, 16 pilot tones, and 468 data tones, for a 7% efficiency gain over IEEE 802.11n/ac.

An alternative option 2 may use a new tone design for 512 tones. This design may include 11 guard tones, 5 DC tones, 16 pilot tones, and thus, have 480 data tones. This tone plan may offer a 10% efficiency gain over IEEE 802.11n/ac.

Finally, Option 3 uses a 32 tone TAU plan, but with pilot puncture to allow surplus DC and pilot tones to be used as data tones in order to increase the efficiency of the transmission. This tone plan includes 11 guard tones, 5 DC tones, and 16 pilot tones. It may be observed that pilot puncture may be used here to allow surplus DC tones to become data tones as well. Generally, a whole bandwidth allocation may not need as many DC tones as other possible OFDMA allocations. Accordingly, there may be only 5 DC tones in this allocation. This may allow for 480 data tones, which may be grouped as 16 groups of 30 tones (including the 15 TAUs, and the tones from pilot puncture and the STU). For example, 2 DC tones (of the original 7) may be used as data tones, and 16 tones that would have been pilot tones in Option 1 may be used as data tones. These 18 tones may be grouped together with the 12 data tones in the STU, to form a 30 tone allocation. Accordingly, this tone plan may offer a 10% efficiency gain over IEEE 802.11n/ac. Thus, the pilot-punctured TAU plan may achieve the same efficiency as a newly designed 40 MHz tone plan. The pilot-punctured TAU plan may also only need one interleaver size, of 30 tones.

FIG. 19 is a comparison of the efficiency of various options for a whole bandwidth allocation in an 80 MHz transmission. The first column includes a transmission according to an IEEE 802.11n/11ac with 1× symbol duration. This transmission may include 11 guard tones, 3 DC tones, 8 pilot tones, and 234 data tones. This is out of 256 total tones, since at 1× symbol duration, 80 MHz includes only 256 tones rather than 1024 tones at 4× symbol duration.

Option 1 uses a 32 tone TAU plan, without modification. This includes 11 guard tones, 7 DC tones, and 64 pilot tones, with 942 data tones (in 31 TAUs of 30 data tones, and one 12 data tone STU). This may offer a 0.6% efficiency gain compared to the 802.11n/ac tone plan. This is based upon a comparison of the number of data tones in the plan compared to the number of total tones, for each of the two options.

Option 2 uses an IEEE 802.11ac tone plan for a 160 MHz transmission, duplicated twice. Since each 160 MHz transmission itself involves duplicating two 80 MHz tone plans, this option may, essentially, use four 80 MHz tone plans from IEEE 802.11ac. As before, this tone plan, although originally used for high bandwidths, may be used for 80 MHz here due to the larger number of tones in a given bandwidth when using longer symbol durations. This tone plan includes 11 guard tones, 11 DC tones, 34 idle tones, 32 pilot tones, and 936 data tones, for no efficiency gain over IEEE 802.11n/ac.

An alternative option 2 may use a new tone design for 1024 tones. This design may include 11 guard tones, 5 DC tones, 12 pilot tones, and thus, have 996 data tones. This tone plan may offer a 6% efficiency gain over IEEE 802.11n/ac.

Finally, Option 3 uses a 32 tone TAU plan, but with pilot puncture to allow surplus DC and pilot tones to be used as data tones in order to increase the efficiency of the transmission. This tone plan includes 11 guard tones, 7 DC tones, and 16 pilot tones. It may be observed that pilot puncture may be used here to allow surplus DC tones to become data tones as well. Generally, a whole bandwidth allocation may not need as many DC tones as other possible OFDMA allocations. Accordingly, there may be only 7 DC tones in this allocation. This may allow for 990 data tones, which may be grouped as 33 groups of 30 tones (including the 31 TAUs, and the tones from pilot puncture and the STU). For example, 48 tones that would have been pilot tones in Option 1 may be used as data tones. These 48 tones may be grouped together with the 12 data tones in the STU (see option 1, which includes a 12 tone STU), to form two 30 tone allocations. Accordingly, this tone plan may offer a 5% efficiency gain over IEEE 802.11n/ac. Thus, the pilot-punctured TAU plan may achieve the same efficiency as a newly designed 40 MHz tone plan. The pilot-punctured TAU plan may also only need one interleaver size, of 30 tones.

FIG. 21 is an illustration of the amount of waste in each of 20 MHz, 40 MHz, and 80 MHz transmissions when using a 32 tone TAU. For example, a 20 MHz transmission may use an FFT size of 256 tones, with 7 DC tones, 11 edge tones, 238 tones for allocation, 7 TAUs, and 14 leftover tones. These leftover tones may represent 5.9% waste. A 40 MHz transmission may use an FFT size of 512 tones, with 7 DC tones, 11 edge tones, 494 tones for allocation, 15 TAUs, and 14 leftover tones. These leftover tones may represent 2.8% waste. An 80 MHz transmission may use an FFT size of 1024 tones, with 7 DC tones, 11 edge tones, 1006 tones for allocation, 31 TAUs, and 14 leftover tones. These leftover tones may represent 1.4% waste.

FIGS. 22A, 22B, and 22C are illustrations which show possible positions within a tone allocation unit where pilot tones may be placed. For example, a 32 tone TAU may have two pilot tones, and 30 data tones. In some aspects, it may be beneficial for these pilot tones to be spread out, either within a single TAU, or spread out in the situation where a single user is assigned multiple TAUs. For example, ideally, it may be best if the pilot tones for a given user are evenly spread out across the bandwidth, with the same number of data tones between each pilot tone. Accordingly, three options are presented for the location of pilot tones within a TAU, below. Each option may be used in every TAU, such that each TAU includes pilot tones at the same tone indices within those TAUs.

FIG. 22A illustrates an option where in a given 32-tone tone allocation unit, pilot tones are positioned at the $11^{th}$ and $22^{nd}$ tones. This allocation may spread out the pilot tones within a single TAU most evenly. For example, the tones in a given TAU may be numbered, such as from 1 to 32. This numbering may be based on the tone indices of each tone, such that adjacent tone numbers are also adjacent in bandwidth. Accordingly, the pilot tones in a TAU may be placed at tone indices 11 and 22, in this tone numbering scheme. Thus, a TAU may contain ten consecutive data tones (numbered 1 to 10), then a pilot tone (numbered 11), then ten more data tones (numbered 12 to 21), then a second pilot tone (numbered 22), and finally ten more data tones (numbered 23 to 32). Accordingly, it may be observed that, in a single TAU, this pilot tone allocation may allow for an even spacing of the pilot tones within the data tones. However, one disadvantage of this allocation of pilot tones is that if a device is assigned multiple consecutive TAUs, the pilot tone spacing between two TAUs may be twice as much as desired. For example, when a device is assigned two TAUs, this may include 64 tones, as illustrated in FIG. 22A. In TAUi 2205 (which stretches from tone 1 to tone 32), there may be pilot tones at indices 11 and 22. Similarly, in TAUi+1 2210, there may also be pilot tones at indices 11 and 22. However, between the pilot tone at index 22 in TAUi 2205 and the pilot tone at index 11 in TAUi+1 2210, there are twenty data tones, rather than ten (there are ten data tones, indices 23 to 32, in TAUi 2205, and also ten data tones, indices 1 to 10, in TAUi+1 2210). Accordingly, this pilot tone spacing may not be optimal in this scenario.

FIG. 22B illustrates an option where in a given 32-tone tone allocation unit, pilot tones are positioned at the $8^{th}$ and $24^{th}$ tones. This allocation may spread out the pilot tones within a multiple TAUs more evenly. For example, the tones in a given TAU may be numbered, such as from 1 to 32. This numbering may be based on the tone indices of each tone, such that adjacent tone numbers are also adjacent in bandwidth. When a device is assigned two TAUs (such as TAUi 2215 and TAUi+1 2220), this may include 64 tones, as illustrated in FIG. 22B. In TAUi 2215, there may be pilot tones at indices 8 and 24. Similarly, in TAUi+1 2220, there may also be pilot tones at indices 8 and 24. Thus, the total allocation to the user may include 7 data tones (1 to 7 in TAUi 2215), 1 pilot tone (8 in TAUi 2215), 15 data tones (9 to 23 in TAUi 2215), 1 pilot tone (24 in TAUi 2215), 15 data tones (25 to 32 in TAUi 2215 and 1 to 7 in TAUi+1 2220), 1 pilot tone (8 in TAUi+1 2220), 15 data tones (9 to 23 in TAUi+1 2220), 1 pilot tone (24 in TAUi+1 2220), and finally 8 data tones (25 to 32 in TAUi+1 2220). Thus, it may be observed that, except at the edges, this allows for an even spacing of 15 data tones followed by a pilot tone. This may allow for better frequency diversity for pilot tones.

FIG. 22C illustrates an option where in a given 32-tone tone allocation unit, pilot tones are positioned at the $8^{th}$ and $25^{th}$ tones. This allocation may spread out the pilot tones within a multiple TAUs relatively evenly while also providing symmetric pilot tone placement within a TAU. For example, the tones in a given TAU may be numbered, such as from 1 to 32. This numbering may be based on the tone indices of each tone, such that adjacent tone numbers are also adjacent in bandwidth. When a device is assigned two TAUs (such as TAUi 2225 and TAUi+1 2230), this may include 64 tones, as illustrated in FIG. 22C. In TAUi 2225, there may be pilot tones at indices 8 and 25. Similarly, in TAUi+1 2230, there may also be pilot tones at indices 8 and 25. Thus, the total allocation to the user may include 7 data tones (1 to 7 in TAUi 2225), 1 pilot tone (8 in TAUi 2225), 16 data tones (9 to 24 in TAUi 2225), 1 pilot tone (25 in TAUi 2225), 14 data tones (26 to 32 in TAUi 2225 and 1 to 7 in TAUi+1 2230), 1 pilot tone (8 in TAUi+1 2230), 16 data tones (9 to 24 in TAUi+1 2230), 1 pilot tone (25 in TAUi+1 2230), and finally 7 data tones (26 to 32 in TAUi+1 2230). Thus, it may be observed that, except at the edges, this allows for a relatively even spacing with either 14 or 16 data tones between pilot tones. This may allow for better frequency diversity for pilot tones, while also allowing for symmetric spacing of pilot tones with a given TAU.

In general, tone plans with 32 tone TAUs include 14 leftover tones. These leftover tones may include 7 tones on each side of the DC tones of a transmission. These leftover tones may be grouped into a small tone unit (STU), which includes 12 data tones and 2 pilot tones. The pilot tones within each side of the STU may be placed on the $4^{th}$ tone of that side. That is, there may be seven tones on each side of the DC tones, and those tones may be numbered from 1 to 7. The pilot tone may be placed in the center of these tones, at index number 4.

In a TAU plan with pilot puncture when there is a whole bandwidth allocation, certain tones that would otherwise be used as pilot tones may be used instead as data tones. In a 20 or 40 MHz transmission, half of the would-be pilot tones may be used as data tones. For example, the first pilot tone in every two would-be pilot tones may be used as a pilot tone on the left half of the bandwidth (negative tone indices), while the other tones may be used as data tones. Similarly, on the right half of the bandwidth (positive tone indices), 2nd would-be pilot tone of every two would-be pilot tones may be used as a pilot tone, while the other would-be pilot tones may be used as data tones instead. In an 80 MHz transmission, only one quarter of the would-be pilot tones may actually be used as pilot tones in a whole bandwidth transmission, while three-quarters may be used as data tones instead. For example, the first pilot tone in every four would-be pilot tones may be used as a pilot tone on the left half of the bandwidth (negative tone indices), while the other tones may be used as data tones. Similarly, on the right half of the bandwidth (positive tone indices), $4^{th}$ would-be pilot tone of every 4 would-be pilot tones may be used as a pilot tone, while the other would-be pilot tones may be used as data tones instead. Accordingly, this may be used for pilot puncture, according to some aspects of the present disclosure.

Figure 20A:
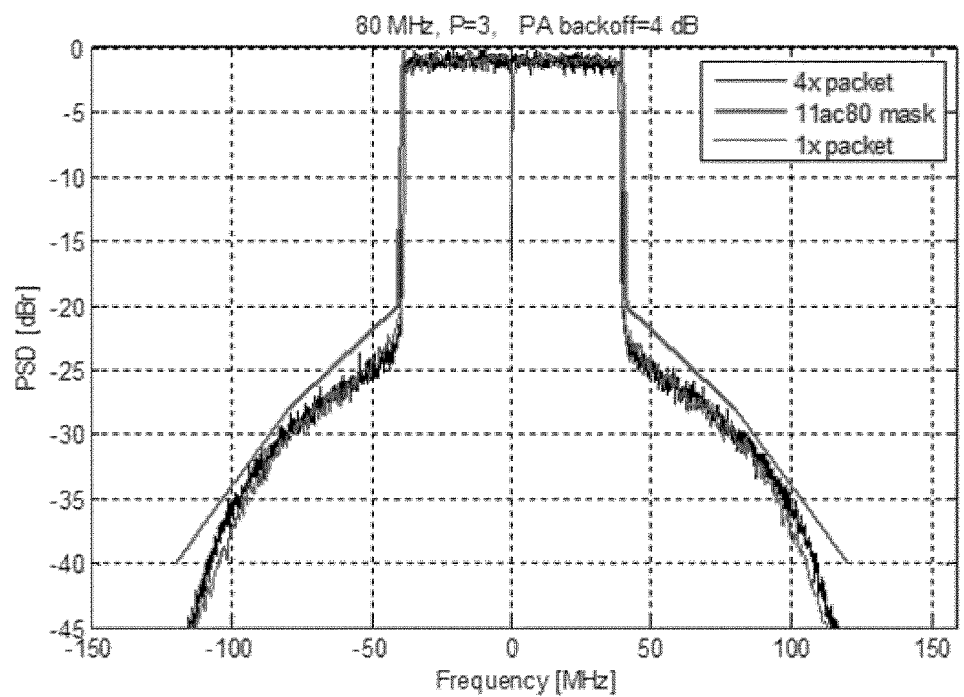
FIGS. 20A and 20B are illustrations of a spectral mask, and the waveforms for packets with a 1× symbol duration and a 4× symbol duration for an 80 MHz transmission.
Figure 20B:
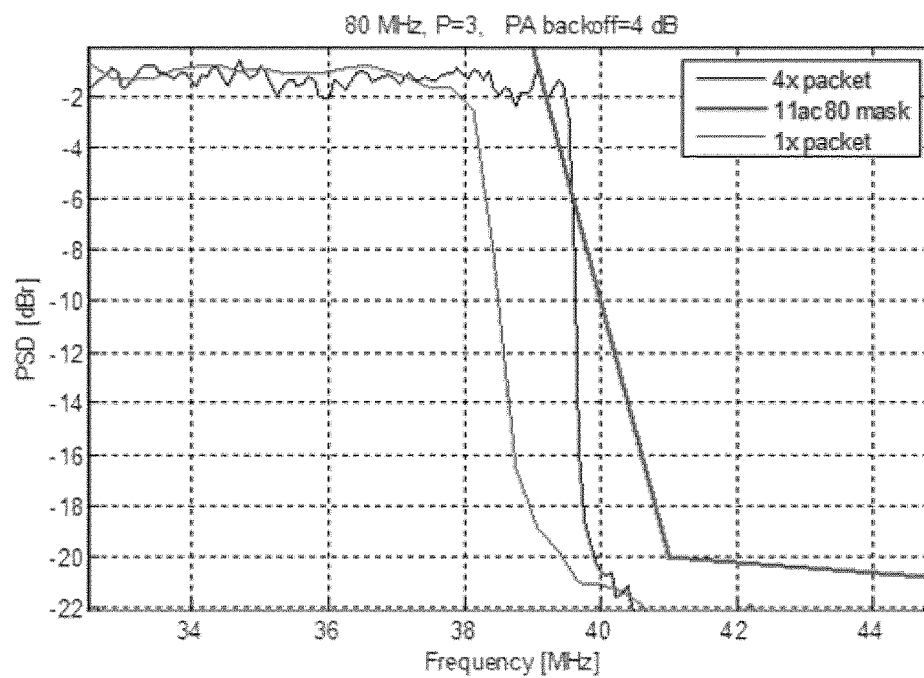

FIGS. 20A and 20B are illustrations of a spectral mask, and the waveforms for packets with a 1× symbol duration and a 4× symbol duration for an 80 MHz transmission. In these figures, the 4× symbol duration transmission has 7 DC tones, and the 1× symbol duration transmission has 3 DC tones. Both the 1× and the 4× symbol durations include 11 guard tones at the band edge. The spectral mask illustrated here is that of an IEEE 802.11ac 80 MHz packet, and may be used to judge the feasibility of using 11 guard tones with 4× symbol duration. Generally, it may be observed that 1× and 4× transmissions are quite similar in OOBE, and both waveforms can meet the mask with a margin, even for 4 dB power amplifier backoff (assuming P=3). FIG. 20B is a zoomed-in version of the same graph as FIG. 20A, and specifically illustrates that the 4× waveform slightly violates the spectral mask at the corner. It may be observed that the wider in-band spectrum mainly affects the blocker performance.

In some aspects, it may be desired to use fewer than seven DC tones. Using fewer DC tones may generally allow for more data tones to be included in a transmission, and may therefore improve data throughput. For example, certain transmissions may use only 3 DC tones, rather than 7 DC tones.

FIG. 23 is an illustration of the amount of waste in each of 20 MHz, 40 MHz, and 80 MHz transmissions when using a 32-tone tone allocation unit with three DC tones. In some aspects, it may be observed that these tone plans are similar to tone plans using a 32-tone tone allocation unit with 7 DC tones, but have four additional leftover tones.

For example, a 20 MHz transmission may use an FFT size of 256 tones, with 3 DC tones, 11 edge tones, 242 tones for allocation, 7 TAUs, and 18 leftover tones. These leftover tones may represent 7% waste. A 40 MHz transmission may use an FFT size of 512 tones, with 3 DC tones, 11 edge tones, 498 tones for allocation, 15 TAUs, and 18 leftover tones. These leftover tones may represent 3.5% waste. An 80 MHz transmission may use an FFT size of 1024 tones, with 3 DC tones, 11 edge tones, 1010 tones for allocation, 31 TAUs, and 18 leftover tones. These leftover tones may represent 1.8% waste.

In these allocations, it may be observed that there are 18 leftover tones across each of the 20, 40, and 80 MHz allocations. These leftover tones may be centered around the DC tones, as illustrated in FIG. 10, but with two additional leftover tones on each side (that is, 9 leftover tones on each side of the DC tones, rather than 7 leftover tones on each side of the DC tones). In some aspects, these tones may be used for common control, such as signaling, scheduling, power control, broadcast messages, and other purposes. These tones may also be used to form a small-size tone allocation unit. This small TAU (STAU) may include 18 tones. The STAU may have two pilot tones and 16 data tones. The pilot tones for the STAU may each be on the center of their respective side of the DC tones. That is, the DC tones may include tones with indices from −1 to 1 (3 DC tones). Accordingly, the STAU may include tones with indices from −10 to −2, and from 2 to 10. The pilot tones within the STAU may be placed in the center of each side of the STAU, such as placing the pilot tones at tone index −6 (with four tones, −10 to −7, on the left, and four tones, −5 to −2, on the right of the pilot tone) and at tone index 6 (with four tones, 2 to 5, on the left, and four tones, 7 to 10, on the right of the pilot tone). For example, the STAU may have 9 tones on each side of the direct current tones (either beside the DC tones, or beside the guard tones, or another location within the tones). The STAU, on each side, may have 4 data tones, and a pilot tones, and then four more data tones. Accordingly, the pilot tones in the STAU may be the $5^{th}$ tone on each side of the direct current tones, such that each pilot tone is in the center of the tones of the STAU on its side of the DC tones.

When using a STAU, a 20 MHz transmission may have 7 TAUs and one STAU, a 40 MHz transmission may have 15 TAUs and one STAU, and an 80 MHz transmission may have 31 TAUs and one STAU. In total, the 20, 40, and 80 MHz transmissions may thus include 8, 16, and 32 TAUs+STAUs, respectively, which may be divisible among 8 users. Accordingly, when allocating the leftover tones into a STAU, there may be no waste for any of 20, 40, and 80 MHz. As with previous allocations using a 32-tone TAU, the TAU grid here may be consistent for 20, 40, and 80 MHz. The leftover tones may be placed either next to the DC tones, or near the band edge of the transmissions. Because each tone allocation includes an odd number of TAUs, this means that one TAU will bridge across the DC tones, with 16 tones on each side of the DC tones.

Generally, in a higher bandwidth transmission, such as an 80 MHz transmission, it may be desirable to allocate multiples of TAUs (such as allocating in multiples of two TAUs) in order to reduce the overhead needed to allocate the TAUs.

FIG. 24 illustrates interleaver parameters which may be used with a STAU of 18 tones. For example, a STAU with 18 tones may include 2 pilot tones and 16 data tones. In a particular embodiment, the interleaver depth (e.g., the number of columns (Ncol)) can be a factor of the number of data tones (Ndata). Accordingly, with a 16 data tone TAU size, a 16 data tone block can have an interleaver depth of 2, 4, or 8.

A frequency rotation can be applied to the spatial streams if there is more than one spatial stream. The frequency rotation can be based on a base subcarrier rotation (NROT) and a rotation index. The base subcarrier rotation (NROT) and the rotation index can be based on the number of data tones (Ndata) and the number of spatial streams (Nss).

For example, if the data tone block has 4 or less spatial streams (Nss), the base subcarrier rotation (NROT) can be any of 1-12. The rotation index (e.g., the $6^{th}$ column) can be a bit reversal of [0 2 1 3] in this scenario. Alternatively, if the data tone block has more than 4 spatial streams (Nss), the base subcarrier rotation (NROT) can be any of 1-12. The rotation index (e.g., the 7th column) can be a bit reversal of [0 4 2 6 1 5 3 7] in some embodiments, or the rotation index can be chosen to maximize (or increase) an average subcarrier distance of adjacent streams in other embodiments (e.g., [0 5 2 7 3 6 1 4]). Although a rotation index of [0 5 2 7 3 6 1 4] is used herein as one example of an index maximizing average subcarrier distance, any other rotation indexes that maximizes (or increases) average subcarrier distance can be used. For example, any permutation which maximizes the average subcarrier distance of adjacent streams may be used, and [0 5 2 7 3 6 1 4] is only one example.

Generally, LDPC tone mapping distance (DTM) is defined in the IEEE 802.11ac specification. The mapping distance (DTM) can be at least as large as the number of coded bits per OFDM symbol (NCBPS) divided by the LDPC codeword length (LCW) (e.g., NCBPS/LCW≤DTM) so that each LDPC codeword covers the full range of tones. Additionally, the mapping distance (DTM) can be an integer divisor of the number of subcarriers (Ndata). The mapping distance (DTM) can be constant over rates within each bandwidth to enable a tone de-mapper implemented at a Fast Fourier Transform (FFT) module of the receive circuits 1116a-1116c with fixed tone processing. In some aspects, when using a 16 data tone block, the LDPC tone mapping distance may be chosen from the following candidates: 2, 4, and 8. Further, a 16 data tone block may have six modulation and coding scheme (MCS) exclusions, at MCS9 with any of 1, 2, 4, 5, 7, and 8 spatial streams.

It may be desirable to have fewer DC tones in a particular transmission, in order to allow for more data tones, and thus, more data to be transmitted. In certain IEEE 802.11 protocols, certain tones may be reserved for DC protection. For example, at 6 GHz, with a maximum 40 parts per million (ppm) difference between a transmitter and a receiver clock, the maximum carrier frequency offset (CFO) may be 240 kHz. In a transmission with a 4× symbol duration, the tone spacing between each tone may be 78.1 kHz. Thus, it may be preferred to leave three tones on each side of the DC tone (e.g., the tone indexed as 0) for DC protection to reduce the risk of data loss, since 240 divided by 78.1 is approximately three.

Figures 25, 26A, 26B:
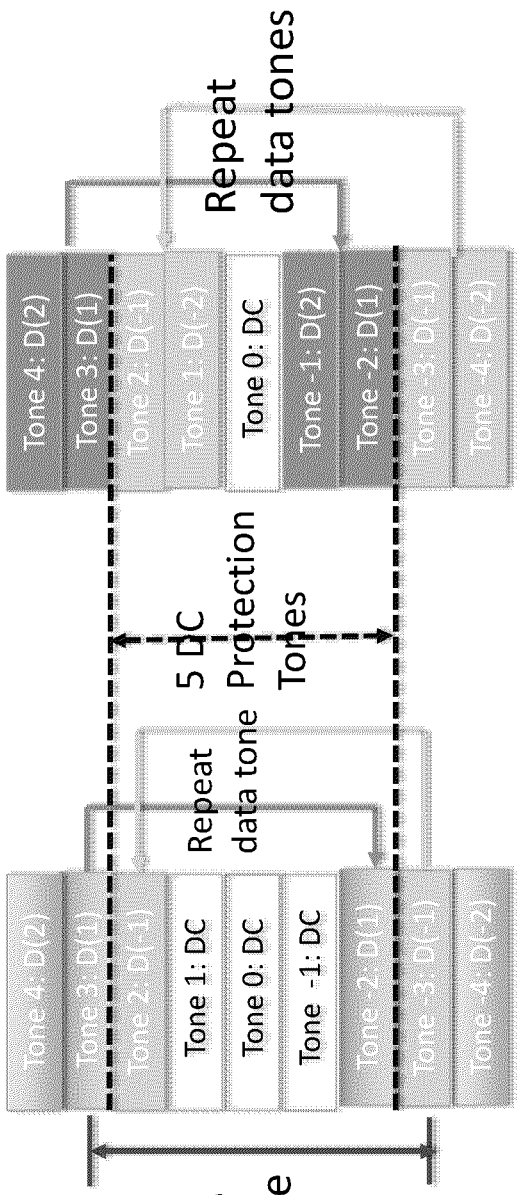
FIG. 25 is an illustration of the location of direct current tones in a tone plan which includes 7 data tones.
FIGS. 26A and 26B are two illustrations of using repeated data tones in order to allow transmissions with 5 direct current tones.

Accordingly, FIG. 25 is an illustration of the location of DC tones in a tone plan which includes seven data tones (e.g., three DC tones on each side of tone at index 0). As illustrated, a transmission may include a plurality of tones, wherein each of the plurality of tones comprise a tone index relative to the tone indexed as 0. These tone indices may be centered on the tone indexed as 0, with an approximately equal number of tones on each side of the tone indexed as 0 (since a transmission typically includes an even number of tones, there may usually be one more tone on the negative side of the tone indexed as 0 than on the positive side). Tones which have a negative index number may be said to be on the "left" side, and tones which have a positive index number may be said to be on the "right" side.

When there are seven DC tones, the DC tones may include the tones indexed as −3 through 3. As illustrated, the tone indexed as 4 may be a data tone, and may be the first data tone on the right side of the transmission. Similarly, the tone indexed as −4 may also be a data tone, and may be the first data tone on the left side of the transmission. In some aspects, it may be desirable to have fewer than seven DC tones in a particular transmission, in order to allow for even more data tones, and thus, more data to be transmitted. For example, if only three DC tones were used instead of seven, tone indices 3, 2, −2, and −3 may be used as data tones, rather than DC tones. This would allow four more data tones in each transmission that uses three DC tones. Similarly, using five DC tones rather than seven DC tones would allow for two additional data tones to be transmitted in each transmission.

FIGS. 26A and 26B are two illustrations of tone plans using repeated data tones in order to allow transmissions with five DC protection tones. A DC protection tone may refer to a tone that is used to protect data in a message that may be lost, degraded, or otherwise affected by a receiver DC notch filter. The DC protection tone may or may not carry message data. In some aspects, a DC protection tone that does not contain message data may be referred to as a traditional DC tone (e.g., a null tone). In some aspects, it may be possible to reduce the number of DC protection tones used in a transmission by repeating data tones that may be affected by a receiver DC notch filter. For example, as illustrated by the "possible DC range" (e.g., the possible swing of tones affected by a receiver DC notch filter), the actual tones affected may vary, but may ultimately only affect five tones. Therefore, duplicating one or more of the data tones within a DC protection tone may keep at least one copy of each repeated data tone intact. Accordingly, in some aspects, a method of communicating over a wireless communication network may comprise forming a message that includes a data tones and one or more DC protection tones.

Value(s) for one or more of the plurality of data tones may be set in order to carry a data portion of the message. Additionally, value(s) for one or more of the DC protection tones may be set by repeating one or more of the values from the data tones. Thereafter, the message may be transmitted to one or more wireless communication devices utilizing the data tones and the one or more DC protection tones.

For example, in FIG. 26A, one tone from each side of the DC protection tones is repeated an additional time on the other side of the DC protection tones. In other words, one or more of the values set for at least one of the DC protection tones can correspond to a value of a data tone located proximate (e.g., within three, five, or seven tones of separation) to the DC protection tones. As illustrated, the tone indexed as Tone 3 comprises a data tone proximate to the DC protection tones, which is also repeated at the tone indexed as Tone −2, which is a DC protection tone. Similarly, the tone indexed as Tone −3 comprises a data tone which is repeated at the tone indexed as Tone 2, which is also a DC protection tone. As also illustrated, the tone indexed as Tone 1, the tone indexed as Tone 0, and the tone indexed as Tone −1 may not contain any message data, and may be traditional DC tones. Stated another way, one or more DC protection tones can include five DC protection tones indexed as {−2, −1, 0, 1, 2} and a plurality of data tones can comprise data tones indexed as {−3, 3}, wherein the DC protection tone indexed as {−2} comprises the value of the data tone indexed as {3}, and the DC protection tone indexed as {2} comprises the value of the data tone indexed as {−3}. This approach may be used for both single-user and multiple-user transmissions. As a non-limiting example of a benefit of this tone plan, the impact from a receiver DC notch filter may be mitigated using repetition of data tones, as one of the two copies of the repeated data tones (e.g., either the tone indexed as Tone 3 or the tone indexed as Tone −2) should be readable. In a multiple-user (MU) transmission, the impact of transmitter DCs from other STAs in the MU transmission may be similar to the impact (e.g., interference) seen at the data tones caused by other STAs in the MU transmission. These impacts may be similar, based at least in part upon DC tone transmission power being less than or equal to a data tone transmission power.

As illustrated in FIG. 26B, two tones from each side of the DC protection tones may be repeated an additional time on the opposite side of the DC protection tone (e.g., the tone indexed as Tone 0). For example, the tones indexed as Tones 3 and 4 may be data tones which are repeated at the tones indexed as Tones −2 and −1 (DC protection tones), respectively. Similarly, the tones indexed as Tones −3 and −4 may be data tones which are repeated at the tones indexed as Tones 2 and 1 (DC protection tones), respectively. As also illustrated, the tone indexed as Tone 0 may not contain any message data, and may be a traditional DC tone. Stated another way, one or more DC protection tones may include five DC protection tones indexed as {−2, −1, 0, 1, 2} and a plurality of data tones may include data tones indexed as {−3, 3}, wherein the DC protection tone indexed as {−1} comprises the value of the data tone indexed as {4}, the DC protection tone indexed as {−2} comprises the value of the data tone indexed as {3}, the DC protection tone indexed as {1} comprises the value of the data tone indexed as {−4}, and the DC protection tone indexed as {2} comprises the value of the data tone indexed as {−3}. Similar to FIG. 26A the tones from one of the two sides of the DC protection tone may be received correctly, and thus, fewer DC protection tones may be used. It may be observed that both FIGS. 26A and 26B have, effectively, five DC protection tones, as the nine illustrated tones include four unique data tones, although some of those data tones are transmitted at two different tones at two different tone indices.

In some aspects, other alterations may also be used to include fewer DC protection tones, in addition to or instead of this repetition of tones. For example, it may be possible to use fewer DC protection tones and to encode data around the DC protection tones at a lower code rate. In other words, all of the DC protection tones, or just the one or more of the DC protection tones assigned with values, may be encoded at a lower rate than the plurality of data tones. Further, one or more of the plurality of data tones located proximate to the one or more DC protection tones, or the data tones corresponding to the data repeated in one or more of the DC protection tones, may be encoded at a lower rate than the remaining data tones from the plurality of data tones, in addition to or alternatively from one or more of the DC protection tones assigned with values from the plurality of data tones. Stated another way, the one or more of the one or more DC protection tones assigned with one or more values from one or more of the plurality of data tones, and the one or more of the plurality of data tones corresponding to the assigned one or more values, may be encoded at a lower rate than the plurality of data tones not including the one or more of the plurality of data tones corresponding to the assigned one or more values. As a non-limiting example of a benefit, these alterations may make it easier to decode the tones around the DC protection tones, while allowing fewer DC protection tones to be used and thus, allow for more data to be transmitted.

Figure 27B:
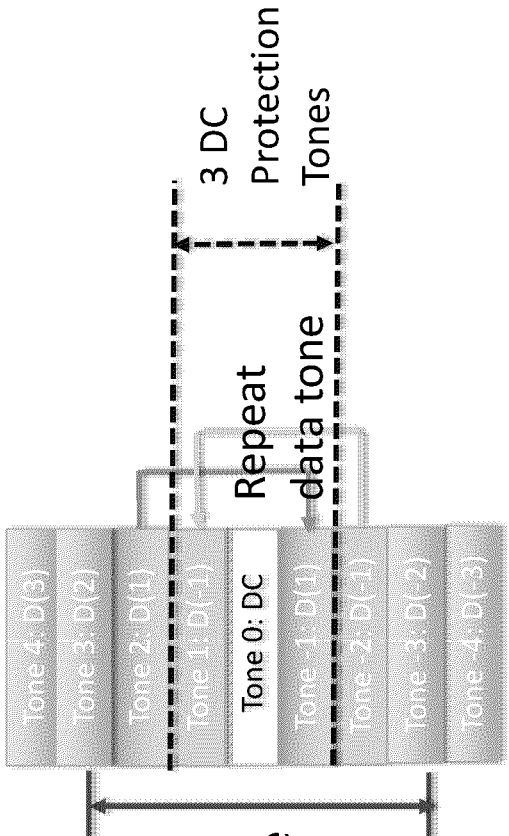
FIGS. 27A and 27B illustrate using repeated data tones to reduce the number of direct current tones in a transmission from 7 to 3.
Figure 27A:
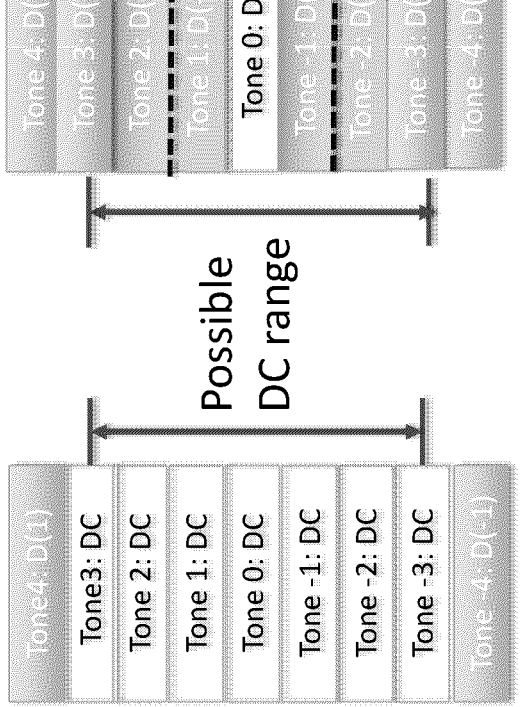

FIGS. 27A and 27B illustrate exemplary tone plans, in accordance with an embodiment. Specifically, FIG. 27A illustrates a tone plan using seven DC tones, similar to the tone plan of FIG. 25. FIG. 27B, on the other hand, illustrates a tone plan using repeated data tones to reduce the number of DC protection tones contained in a transmission from seven to three. For example, as illustrated, each of the tones indexed as Tones 2, 3, and 4 may be used as data tones, and the tones indexed as Tones −2, −3, and −4 may also be used as data tones. Further, as illustrated, the tones indexed as Tones 1, 0, and −1 may be used as DC protection tones. In some aspects, the data contained in the tone indexed as Tone 2 may be repeated on the opposite side of the DC protection tones, at the tone indexed as Tone −1, and the data contained in the tone indexed as Tone −2 may similarly be repeated at the tone indexed as Tone 1. As also illustrated, the tone indexed as Tone 0 may not contain any message data, and may be a traditional DC tone. Stated another way, one or more DC protection tones may include three DC protection tones indexed as {−1, 0, 1} and a plurality of data tones may include data tones indexed as {−2, 2}, wherein the DC protection tone indexed as {−1} comprises the value of the data tone indexed as {2}, and the DC protection tone indexed as {1} comprises the value of the data tone indexed as {−2}. As a non-limiting example of a benefit, as noted before, this repetition may help ensure that the data can be decoded successfully in one of the two tones where it is transmitted, which may in turn allow a wireless communication device to transmit or receive more data. Accordingly, this scheme may be used to transmit using three DC protection tones, rather than requiring that seven DC tones be used.

The performance impact when using five or three DC protection tones may be acceptable. For example, in a 2.4 GHz transmission, there may be no noticeable loss, and the receiver DC protection notch filter will not impact any of the data tones. In a 6 GHz transmission with up to 32.5 ppm CFO, there also may not be any noticeable loss. Further, in a 6 GHz transmission with 32.5-40 ppm CFO, there may be a very minor loss (0.5 dB) when using three DC protection tones. In some aspects, only one data tone may be affected by this loss. Accordingly, for single transmitter transmissions, such as all downlink and single-user uplink transmissions, five or three DC protection tones with repetition protection, as illustrated in FIG. 26A, 26B, or 27B, may be sufficient.

For uplink multiple-user and OFDMA transmissions, with multiple carrier leakage, performance may be highly dependent on the implementation, such as an effective carrier leakage level. While the level of degradation present when transmitting utilizing seven DC tones may generally be acceptable, the level of degradation present when transmitting data utilizing five or three DC protection tones may also be acceptable. In a multiple-user scenario in wideband transmissions (such as 80 MHz transmissions), this degradation may be minor. For example, even if a single data tone is degraded in a transmission, such a transmission may include 1024 tones with more than 900 data tones. Accordingly, one lost data tone may represent only a small portion of the total data tones. In some aspects, in an OFDMA transmission, only one STA may suffer in a high MCS scenario. For example, one STA may be assigned a small number of tones, and losing one or more data tones may represent a larger portion of the total tones assigned to that user. However, the loss to only one user may still be tolerable in order to transmit more data tones in a transmission. Accordingly, using five or three DC protection tones in a transmission may be advantageous.

In some aspects, it may be desirable for a transmission to be receivable by a device which can only receive a portion of the total transmission bandwidth. For example, it may be desirable for a 40 MHz or 80 MHz transmission to be able to transmit to a device that is capable of only receiving a transmission in a 20 MHz portion of the 40 or 80 MHz transmission. For example, this may necessitate that each 20 MHz portion (HE20) of an 80 MHz transmission include guard tones between that portion and the other portions of the transmissions (as well as edge tones at the edge of a transmission). It may also be useful if each 20 MHz portion of a 40 or 80 MHz transmission includes its own DC tones in the center of the 20 MHz portion. Accordingly, a 20 MHz portion of the 80 MHz transmission may include both its own guard tones and its own DC tones, such that a device may receive or transmit that portion. Accordingly, a 40 or an 80 MHz transmission may include two or four of these 20 MHz portions, or HE20 allocation units.

In some aspects, certain devices may need these 20 MHz portions in larger transmissions, such as if they can only receive a 20 MHz portion. However, other transmissions may not include any devices that require only a 20 MHz portion. Accordingly, it may be advantageous if, when there are no HE20 'mode' STAs participating in an OFDMA transmission, portions of the HE20 transmission may be "grabbed" to create additional allocation units. For example, in such a case, the DC tones and certain guard tones from each HE20 may not be needed to be used as DC or guard tones since no HE20-mode devices may be present. Thus, these tones could be "grabbed" and used as one or more additional units of data tones.

As with the other allocations presented herein, these tone allocations may also use a single tone allocation size. For example, this tone allocation size may be 26 tones, including 2 pilot tones and 24 data tones, as discussed above. Using a single tone allocation size may be advantageous, as it may simplify signaling allocations of tones to various devices, in addition to the benefits of providing an HE20 allocation which allows HE20 devices to receive a portion of a larger transmission.

Figure 28:
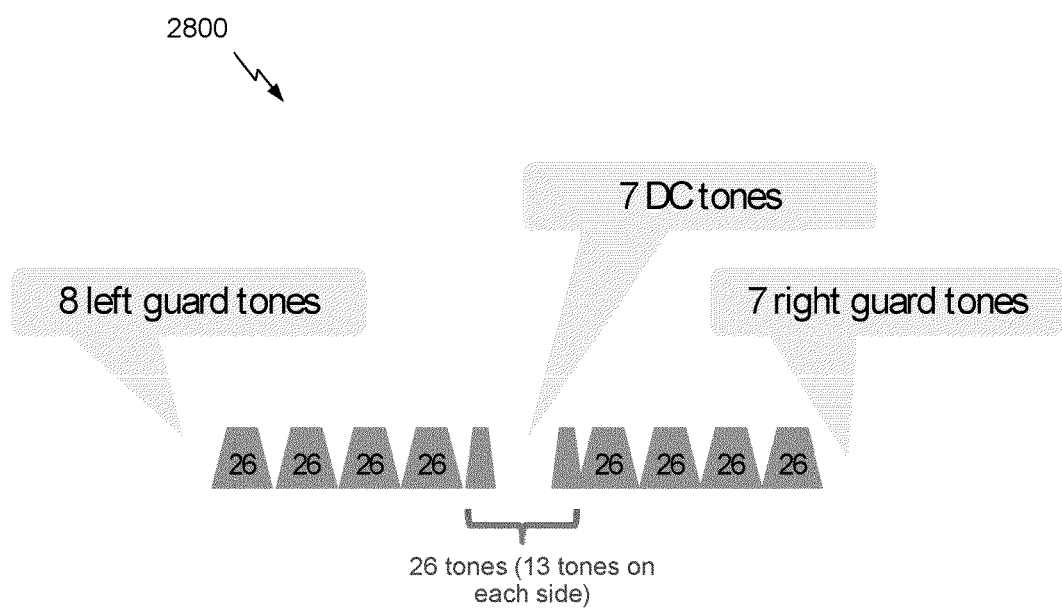
FIG. 28 is an illustration of an exemplary 20 MHz transmission.

FIG. 28 is an illustration of an exemplary 20 MHz transmission 2800. This 20 MHz transmission includes 256 tones in total. The transmission includes 8 left guard tones and 7 right guard tones. These tones may be transmitted with no data on them, in order to provide a buffer between the data tones in the transmissions and transmissions which might occur on other portions of the wireless medium. The transmission further includes 7 DC tones, which may be positioned in the center of all the tones in the transmission. For example, the transmission may include tones numbered sequentially using index numbers from −128 (on the left) to 127 (on the right). The DC tones may be in the center of the tones, and thus, 7 DC tones may include the tones from index −3 to index 3.

The transmission 2800 may include four 26-tone allocations on the left side of the DC tones, and four 26-tone allocations on the right side of the DC tones. Further, the transmission may include 13 additional data tones on each side of the DC tones. These 13 additional data tones on each side may be combined together, in order to form a $9^{th}$ 26-tone allocation. Accordingly, the transmission 2800 may include 9 26-tone allocations, each of which may include 24 data tones and 2 pilot tones.

Figures 29A, 29B:
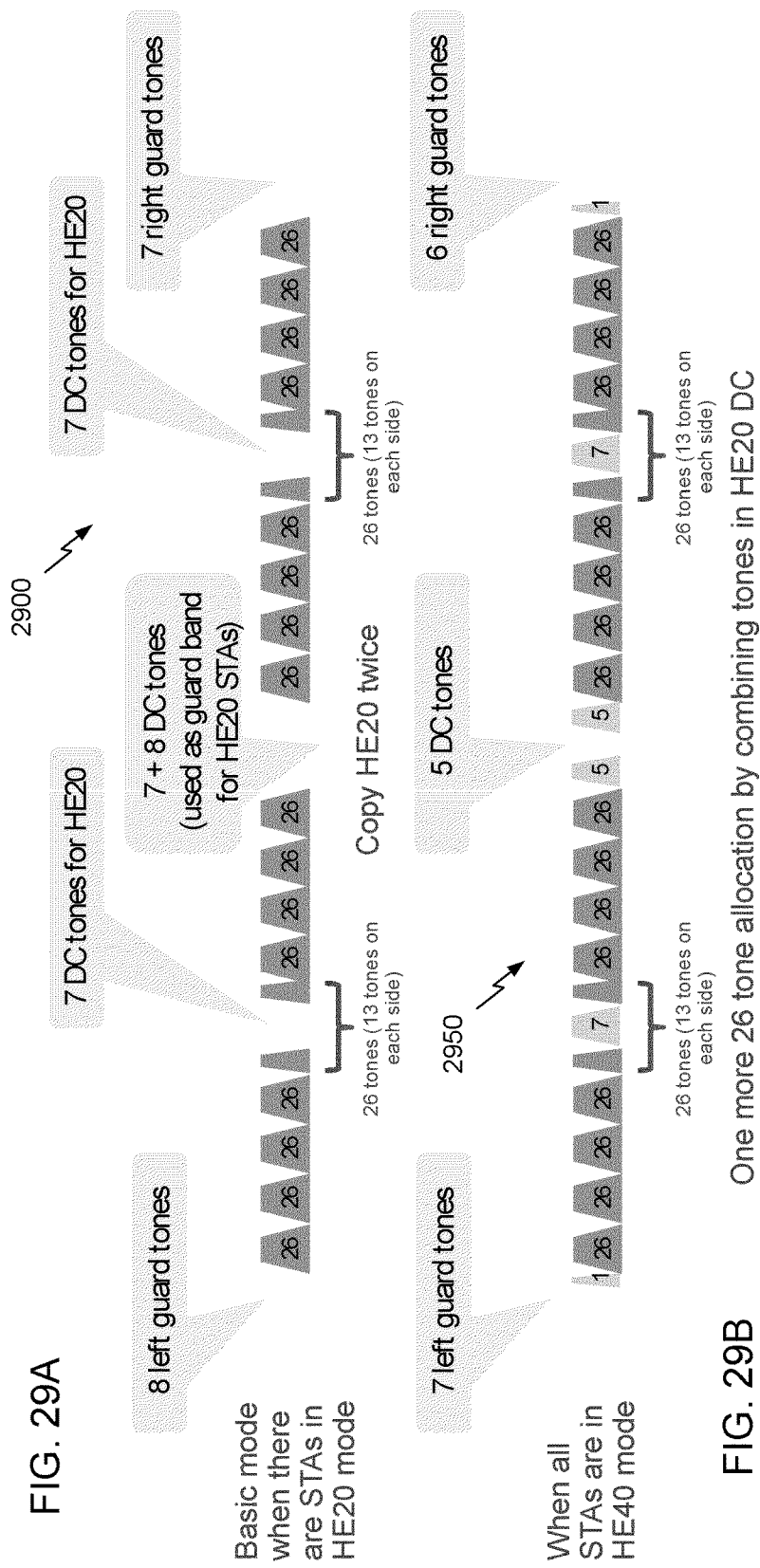
FIG. 29A is an illustration of using two 20 MHz portions to transmit a 40 MHz transmission.
FIG. 29B is an illustration of a 40 MHz transmission that uses certain tones in the 20 MHz-compatible transmission as additional useable tones.

FIG. 29A is an illustration of using two 20 MHz portions to transmit a 40 MHz transmission 2900. In this illustration, the 'HE20' transmission 2800 from FIG. 28 is duplicated in order to form a 40 MHz transmission 2900 (or a 'HE40' transmission). Accordingly, on each side of the DC tones in a 40 MHz transmission 2900, a transmission that is the same as the 20 MHz transmission 2800 is used. Further, the DC tones themselves are constructed using the right guard tones from the left-half HE20 transmission 2800, and the left guard tones from the right-half HE20 transmission 2800. Because this transmission 2900 is a mere duplication of transmission 2800, each of the values of transmission 2800 is also duplicated—this transmission 2900 includes 18 26-tone allocations, with 9 on each side of the DC tones. Transmission 2900 further includes 7 DC tones in each HE20-half of the transmission, 15 DC tones in the center of the 40 MHz transmission, 8 left guard tones, and 7 right guard tones.

It may be observed that a device which can only transmit or receive on one of the two channels in the 40 MHz transmission 2900 may be able to treat one-half of transmission 2900 as if it is a 20 MHz transmission, like transmission 2800. Accordingly, this transmission 2900 may be advantageous in that it allows transmissions to and from such HE20 devices, while also allowing more data to be transmitted than would be transmitted in a 20 MHz transmission.

FIG. 29B is an illustration of a 40 MHz transmission that uses certain tones in the 20 MHz-compatible transmission as additional useable tones. For example, in certain aspects, all the STAs that are sending or receiving data in a given transmission may be compatible with 40 MHz transmissions. That is, there may not be any STAs that need a 20 MHz portion that includes its own guard and DC tones in a given transmission. Accordingly, it may be beneficial to provide a mechanism whereby certain tones that were guard or DC tones in transmission 2900 may be "grabbed" so that they may become useable tones (pilot or data tones, which can be assigned to a device). Thus, transmission 2950 includes each of the 18 26-tone allocations of transmission 2900, in the same tone locations.

However, in addition to this, transmission 2950 includes one additional 26-tone allocation which may be assigned to a device. This additional 26-tone allocation is made up of the 14 tones (7 on each side) that were DC tones for a 20 MHz portion in transmission 2900. Since no HE20-mode devices are included in transmission 2950, these additional DC tones may not be needed. Accordingly, these 14 tones may be repurposed as usable tones. Further, 5 tones from each side (10 tones in total) of the 15 central DC tones of transmission 2900 may be repurposed as usable tones as well. This may result in transmission 2950 having only 5 DC tones, where transmission 2900 had 15 DC tones in the center of the 40 MHz transmission. Finally, transmission 2950 may also have one tone on each side repurposed from being a guard tone in transmission 2900 to being a usable tone.

Thus, transmission 2950 may contain each of the tone allocation units of transmission 2900. However, transmission 2950 may further contain one additional tone allocation unit. This additional tone allocation unit may be made up of tones which were used, in transmission 2900, as 2 guard tones, 14 'HE20' DC tones, and 10 DC tones. These 26 tones may be combined together to form one additional tone allocation unit, such that transmission 2950 may contain 19 26-tone allocations.

FIG. 30A is an illustration of an 80 MHz transmission 3000 which includes four 20 MHz portions. In this illustration, each of the four 20 MHz portions of the transmission 3000 include their own DC tones, as each 20 MHz portion of this transmission may use the same tone plan as the 20 MHz transmission illustrated in FIG. 28. Accordingly, in some aspects, this transmission may contain four HE20 tone plans. Since each HE20 tone plan (from FIG. 28) includes 9 tone allocation units, the 80 MHz transmission of FIG. 30A includes 36 tone allocation units. This transmission 3000 may include 8 left guard tones, and 7 right guard tones. This transmission may also include 15 DC tones in the center of the transmission, 15 tones between each 20 MHz portion of the transmission, and each 20 MHz portion of the transmission may itself contain 7 DC tones.

FIG. 30B is an illustration of an 80 MHz transmission 3050 that uses certain tones in the 20 MHz-compatible transmission as additional useable tones. For example, transmission 3050 is an 80 MHz transmission with a tone plan that is equivalent to duplicating the tone plan for transmission 2950 in FIG. 29B. Accordingly, transmission 3050 may include each tone allocation unit from transmission 3000, as well as two additional tone allocation units, one from the left 40 MHz, and one from the right 40 MHz. As illustrated, each additional tone allocation unit may include tones that would otherwise be used as guard tones (1 tone), DC tones for the 80 MHz transmission (1 tone), DC tones for the 40 MHz transmission (10 tones, 5 on each side), and DC tones for each 20 MHz portion (14 tones, 7 from each of the two 20 MHz portions on each side of the 80 MHz transmission). Accordingly, since transmission 3050 is a duplicated version of transmission 2950, it may contain 38 tone allocation units, which is twice as many as the 19 tone allocation units found in transmission 2950.

Therefore, transmission 3050 includes 7 left guard tones, 6 right guard tones, and 13 DC tones. Additionally, transmission 3050 includes 5 DC tones in the center of the left 40 MHz, and 5 DC tones in the center of the right 40 MHz of the 80 MHz transmission.

As illustrated, a transmission such as transmission 3000 of FIG. 30 may have a number of advantages. For example, this transmission uses 26 tone allocations, which is an allocation size that may be known and may be used elsewhere in wireless communications. Further, this transmission includes only a single size of tone allocation, which may simplify both signaling the allocations of various users to tones, and may also simplify MAC (media access control) resource allocation, TPC, and other parameters. Further, transmissions according to certain aspects above may allow for STAs to operate in HE20 or HE40 modes (such that the STA may either need independent 20 MHz portions or not), while still allowing those devices with lesser capabilities to use portions of a larger transmission, such as an 80 MHz transmission. Another advantage of the above allocations is that this may use the same tone allocation between different bandwidth modes. Further, including a mode which allows a transmission to "grab" additional allocation units by converting DC and other tones into usable tones may allow efficiency of a transmission to be maximized.

In some aspects, a single device may be assigned a 20 MHz portion (or more) of a given transmission. For example, a single device may be assigned all 20 MHz of a 20 MHz transmission, or may be assigned 20 MHz or more in a 40 MHz or 80 MHz transmission. Accordingly, a single device may be assigned to transmit in an entire 20 MHz portion of the transmission.

When a single device is assigned to transmit in an entire 20 MHz portion of a transmission, and no other devices transmit in any part of that 20 MHz portion, it may be advantageous to use a different tone plan, which may be more efficient than using smaller tone allocation units, such as TAUs of 26 tones. For example, in a 20 MHz transmission, if the transmission is being transmitted by or transmitted to a single STA, the transmission may use a tone plan which is similar to a VHT80 tone plan from IEEE 802.11ac. A VHT80 tone plan was designed for 80 MHz, but because tones here may have a symbol duration of 4× the symbol duration in IEEE 802.11ac, it may be possible to use a similar tone plan for a 20 MHz transmission. For example, these transmissions may include 242 usable tones, with 234 data tones and 8 pilot tones, as well as 11 guard tones (6 on the left and 5 on the right) and 3 DC tones. Similarly, this tone plan may also be used for one or more 20 MHz portions in a 40 MHz or 80 MHz transmission. Generally, an AP may select between a tone plan includes 26-tone tone blocks and a tone plan including a 242-tone block. This selection may be made independently for each 20 MHz portion of a transmission, such that a transmission may include both types of 20 MHz portions.

Figure 34:
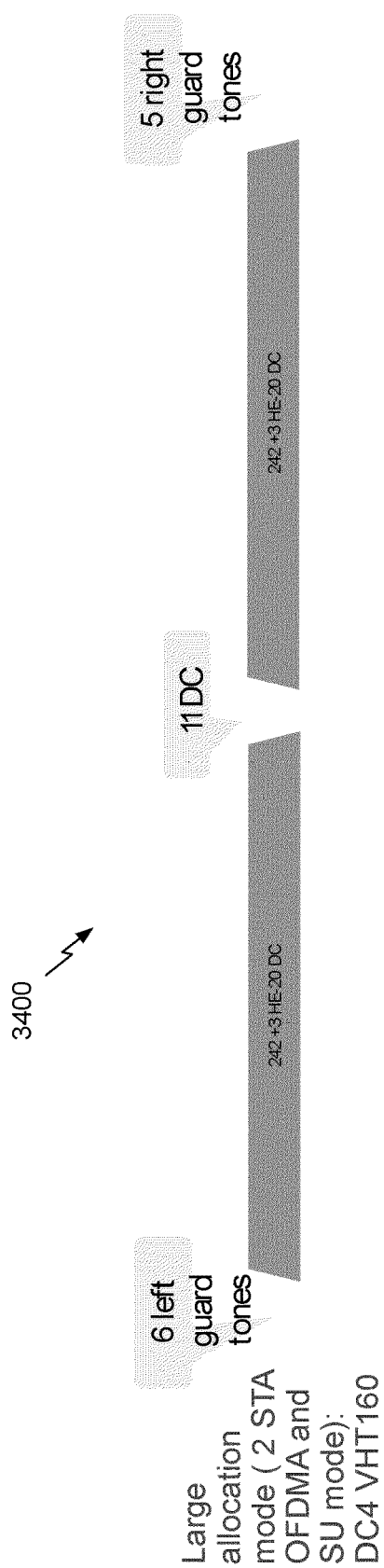
FIG. 34 is an illustration of a 40 MHz transmission according to some aspects of the present disclosure, such as using a 242 tone allocation.

FIG. 34 is an illustration of a 40 MHz transmission 3400 according to some aspects of the present disclosure, such as using a 242 tone allocation. As illustrated, a 40 MHz transmission may include two 20 MHz portions, with each portion including 242 usable tones and 3 DC tones (in the center of the 20 MHz portion). In some aspects, this transmission may include 6 left guard tones and 5 right guard tones, as well as 11 DC tones (which, it may be observed, are made up from the left and right guard tones of the two 20 MHz portions). As illustrated, this tone plan may be thought of as duplicating the VHT80 tone plan described above. In some aspects, this tone plan may be thought of as being the VHT160 tone plan from IEEE 802.11ac, since that tone plan was a duplicated copy of the VHT80 tone plan.

It may be noted that each 20 MHz portion of the transmission may use either a VHT80-like tone plan (when the 20 MHz portion is assigned to only one device) or the 9 26-tone tone groups described above, such as in FIG. 28. It may be observed that, when transmitted to a single device, transmitting using a VHT80-like tone plan may allow for 234 data tones in 20 MHz, while using a 26-tone tone group transmission may allow for only 216 data tones (9 tone groups, each with 24 data tones and 2 pilot tones). Accordingly, it may be more efficient to use the 242 usable tone VHT80-like portions when possible, in order to allow for more data tones to be transmitted in a given bandwidth. It may also be observed that the use of such a 20 MHz portion still allows for each 20 MHz portion of a transmission to includes its own guard tones and DC tones, such that the 20 MHz portion may be received by an 'HE20-mode' device which may be configured to receive only a 20 MHz transmission, and not larger transmissions.

In some aspects, certain tones from the 40 MHz transmission 3400 may be reused, as well. For example, at certain times, no HE20-mode devices may be present, and so it may not be needed to transmit DC tones in each 20 MHz portion. Thus, the 6 internal DC tones may be reused and repurposed for other uses. Similarly, the transmission 3400 includes 11 DC tones. However, in certain aspects, fewer DC tones may be needed, such as 3 DC tones. Thus, 8 DC tones may also be repurposed. Accordingly, up to 14 tones may be reused in another manner. The reuse of 14 tones may require an additional tone plan for best efficiency, since this is not enough tones to make a new 26-tone tone group. Accordingly, in some variations, fewer DC tones may be used and/or the DC tones included in each 20 MHz portion may be omitted. It may also be possible, when an entire 40 MHz portion is assigned to one device, to transmit to that device using a 496 usable tone allocation, which may include 480 data tones, 16 pilot tones, 11 guard tones, and 5 DC tones.

Figure 35:
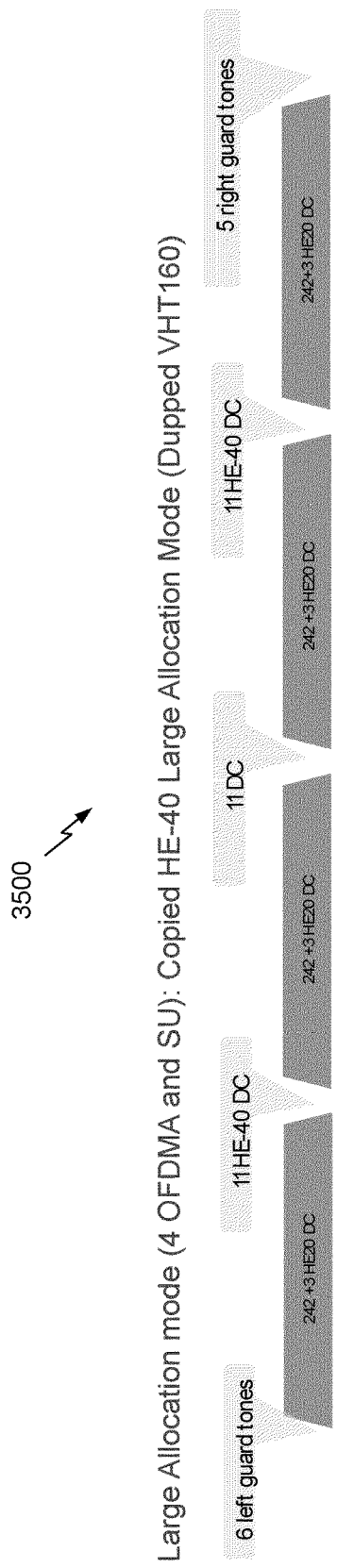
FIG. 35 is an illustration of an 80 MHz transmission according to some aspects of the present disclosure, such as using a 242 tone allocation.

FIG. 35 is an illustration of an 80 MHz transmission 3500 according to some aspects of the present disclosure, such as using a 242 tone allocation. As illustrated, this allocation may be made up of four VHT80-like tone plans, or two VHT160-like tone plans. Accordingly, this transmission may include 6 left guard tones, 5 right guard tones, 11 DC tones between each 20 MHz portion (that is, in the center of the 80 MHz transmission, and in the center of each 40 MHz half of the 80 MHz transmission). Each 20 MHz portion may include 3 DC tones in the center of the portion and 242 usable tones which includes 234 data tones and 8 pilot tones. As before, with the 40 MHz transmission, each 20 MHz portion of the 80 MHz transmission may include either the 242-usable tone configuration (VHT80-like), or the 9 26-tone tone group configuration. For example, if the 20 MHz portion is assigned to only a single device, the VHT80-like portion may allow for the use of more data tones per 20 MHz portion. However, if a 20 MHz portion is assigned to two or more devices, that portion may instead use the 26-tone tone groups, which may allow the 9 tone groups to be divided between multiple STAs. As before, using either of these two 20 MHz portion designs may allow for DC tones to be included in each 20 MHz portion, which may allow HE20-mode devices to receive the transmission or that portion of the transmission.

It may be observed that a number of tones in transmission 3500 may be reused (that is, converted from non-usable tones into usable tones—either data tones or pilot tones). Alternatively, this reuse may use the tones for other purposes, such as scheduling, as described supra. For example, up to 42 tones in transmission 3500 may be reused: 22 tones that are used as DC tones in the center of the two 40 MHz portions may be reused for other purposes, if DC tones are not needed in this purpose. Further, the number of DC tones in the transmission (the DC tones that are in the center of the 80 MHz transmission) may be reduced from 11 to 3 tones, which may allow 8 tones to be reused. Further, each of the 20 MHz portion includes 3 DC tones in the center of the portions. These tones may also be reused, such as when no HE20-mode devices are included in a particular transmission. Accordingly, these 42 tones, or any number of those tones (e.g., a subset of those tones in any combination) may be reused for another purpose. This transmission 3500 may have an efficient allocation of resources compared to other tones plans, and may include 936 data tones in a 1024 tone transmission. Further, as noted above, certain other tone allocations may be used. For example, if one device is assigned an entire 40 MHz portion of the 80 MHz transmission, that device may receive a new block size of 496 tones, with 16 pilot tones, 480 data tones, rather than two 242-tone blocks. Further, if a single device is assigned the entire 80 MHz, a new block size of 1006 tones may be used, which include 990 data tones and 16 pilot tones (with 11 guard tones and 7 DC tones).

As described above, these tone plans may also be used together. For example, a 40 MHz transmission may include one 242-tone block in one 20 MHz portion, and may include 9 26-tone tone blocks in the other 20 MHz portion. Similarly, an 80 MHz transmission may include a mix of these two types of 20 MHz portions as well. Generally, an AP may determine which of these tone plans to use for each 20 MHz portion. This determination may be made based upon the number of devices that will transmit or receive over the tones of a given 20 MHz portion, as well as based on the capabilities of the various devices (such as whether any devices require HE20-mode transmissions). These tone plans may allow for efficient allocation of tones between users, while still maintaining boundaries between each 20 MHz portion and DC tones in each 20 MHz portion. Further, more efficient tone plans may be used when a single device is assigned an entire 20 MHz portion. Additionally, when clear 20 MHz boundaries and/or DC tones for each 20 MHz portion are not needed, certain tones may also be reused to increase the efficiency of a transmission.

In some aspects, it may be desirable to provide a transmission which can be transmitted to, or received from, multiple devices. For example, a transmission of a message may occur over a total bandwidth, such as over a 20 MHz, 40 MHz, or 80 MHz bandwidth. This message may be a downlink OFDMA transmission, which may include portions of the message intended for different devices, in order to transmit information to multiple devices at once. A downlink OFDMA message may also be intended for only one recipient (a single user) in some cases. In some aspects, this message may also be an uplink OFDMA message. Such an UL OFDMA message may include a number of different portions, each transmitted on different parts of the total bandwidth by a different device, and each directed to a common recipient, such as to an AP. Accordingly, in certain OFDMA transmissions, multiple devices may transmit to the AP simultaneously, and the transmissions from each of these devices may be received at the AP simultaneously. In some cases, an UL OFDMA transmission may also be transmitted by a single user.

Generally, in either an UL or a DL OFDMA transmission, it may be desirable to allow different devices to have different amounts of the total bandwidth. For example, different devices may have different amounts of data queued for transmission to or from the AP. Accordingly, devices with more queued data may be allocated a larger portion of the total bandwidth than devices with less queued data. An AP may be configured to make decisions for resource allocation, such as allocating different portions of the bandwidth to different devices, based on each user's MAC payload information, channel reporting, MCS, and other factors.

The total bandwidth of a transmission may be composed of a number of different tones. The number of tones in a transmission may depend, at least in part, on a symbol duration of the transmission and on a total bandwidth of the transmission. For example, a 20 MHz transmission with a 4× symbol duration (that is, a symbol duration that is four times as long as the symbol duration in an IEEE 802.11ac transmission) may include 256 tones, while a 40 MHz transmission with a 4× symbol duration may include 512 tones, and an 80 MHz transmission with a 4× symbol duration may include 1024 tones. In order to provide devices with different portions of the total bandwidth, different devices may be allocated different numbers of tones.

An AP (or another device) may transmit an indication to the various devices in a wireless network which are part of an OFDMA transmission, the indication indicating which devices are part of a transmission, and the tone allocation of those devices. This indication may be included, for example, in a packet header of a DL OFDMA transmission, or may be transmitted prior to the DL OFDMA transmission. For an UL OFDMA transmission, an indication may be contained in a trigger message or another message, which may inform the various devices of their allocation, and may also inform those devices of the timing of the UL OFDMA transmission.

In some aspects, devices may also have differing capabilities, such that certain devices (such as a "HE20" device) may only be able to transmit or receive on a certain portion of the total bandwidth. For example, an HE20 device may be configured to use one 20 MHz portion of the total bandwidth, and may not be configured to use other portions of the bandwidth. Such a device may be included in a transmission with a total bandwidth of larger than 20 MHz (such as a 40 MHz or 80 MHz transmission), by allocating the device a portion of the bandwidth that the device is able to receive. For example, an HE20 device may receive a 20 MHz portion of a 40 MHz transmission.

In some aspects, in order to allow an HE20 device to receive (or send) only a 20 MHz portion of a larger transmission, it may be desirable to provide tone plans which provide each 20 MHz portion of the transmission with their own guard and direct current (DC) tones. For example, each 20 MHz portion of a transmission may include 3 or more DC tones, and may also include 11 guard tones. This may allow a device to receive a 20 MHz portion of the transmission, without receiving interference from other portions of the transmission which the device may not be configured to receive, or may not be capable of receiving. For example, an HE20 device may send or receive a 20 MHz portion of a larger transmission without having to be aware that the transmission is a larger transmission, provided that sufficient DC and guard tones are provided in the tone plan of the transmission.

In some aspects, it may be beneficial from a signaling perspective to assign each device in a transmission a single resource unit. Each resource unit may include a number of tones, which may be used by the device assigned those tones as either pilot tones or data tones. These resource units may have multiple possible sizes, each containing a different number of tones. For example, one resource unit size may include 30 tones. These 30 tones may include 28 data tones and 2 pilot tones. Multiple resource unit sizes may be used. For example, resource unit sizes may include 30 tones, 60 tones, 120 tones, 242 tones, 498 tones, and 1010 tones. Each of these various resource unit sizes may include different numbers of data and pilot tones. In some aspects, it may also be possible to assign multiple resource units to a single device.

FIG. 36 is an illustration of various resource unit sizes that may be used in each of 20 MHz, 40 MHz, and 80 MHz transmissions. These transmissions may be either UL OFDMA (transmitted by a number of different devices to a single device), or DL OFDMA (transmitted by one device to a number of different devices). Each device in the transmission may be assigned a single resource unit, but the resource unit size assigned to each device may vary between devices.

Generally, a 20 MHz transmission may include 256 tones, and at least 3 of these tones may be used as DC tones in the center of the 20 MHz transmission, and 11 of these tones may be used as guard tones at the edges of the 20 MHz transmission. This may leave 242 "useable" tones, which may consist of the tones which may be assigned to a device and used as either DC or data tones by that device. A 20 MHz transmission may allow the use of four different resource unit sizes. These sizes may include 30 tones, 60 tones, 120 tones, or 242 tones. Using each of these sizes of resource unit may result in 0 unused tones.

Figure 37:
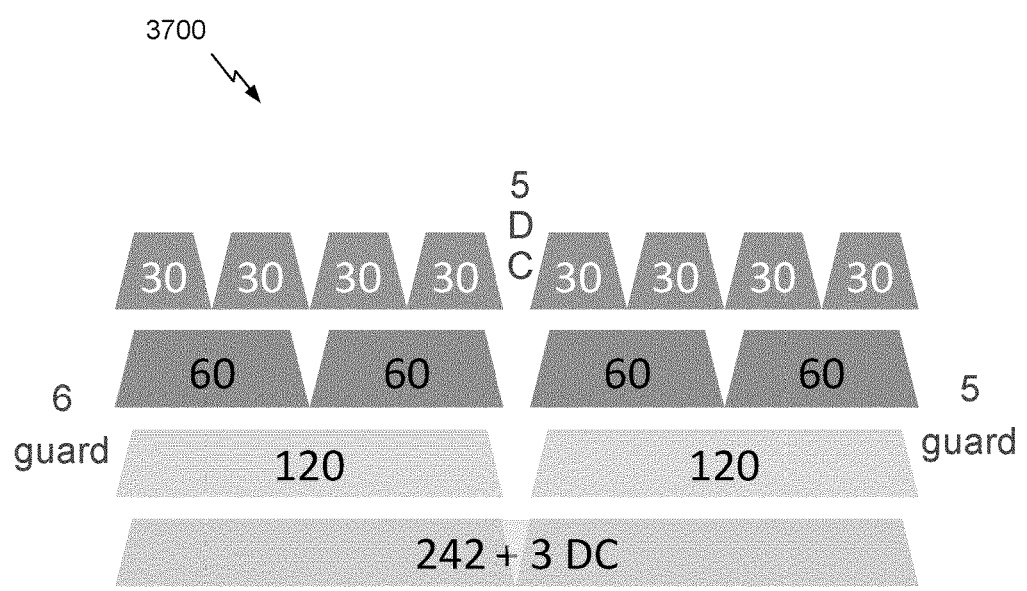
FIG. 37 is an illustration of the various sizes of resource units that may be used with a 20 MHz transmission.

FIG. 37 is an illustration 3700 of the various sizes of resource units that may be used with a 20 MHz transmission. As illustrated, a 20 MHz transmission may include up to eight resource units, when 8 30-tone resource units are used. A 20 MHz transmission may include eight 30-tone resource units with 5 DC tones. A 20 MHz transmission may also include four 60-tone resource units with 5 DC tones. A 20 MHz transmission may also include two 120-tone resource units with 5 DC tones. A 20 MHz transmission may also include one 242-tone resource unit with 3 DC tones. In each of these 20 MHz transmissions, there may be 11 guard tones, with 6 on the left edge (that is, the negative tone indices) and 5 on the right edge (the positive tone indices).

Although each of the four alternative 20 MHz transmissions in illustration 3700 are illustrated as containing a single resource unit size, these resource unit sizes may be mixed and matched. For example, a 20 MHz transmission may, in one aspect, contain two 30-tone resource units, one 60-tone resource unit, and one 120-tone resource unit. Each device that is receiving or transmitting in the OFDMA transmission may be assigned a single resource unit. The size of the resource unit assigned to a given device may be based, at least in part, on an amount of queued data that is present on that device. For example, if a device has enough queued data to transmit data across the full 20 MHz bandwidth, that device may be assigned the entire 20 MHz transmission as one 242-tone resource unit. The allocation decision may be based on other metrics as well, such as a priority user setting or other data available to the allocating device.

Referring back to FIG. 36, a 40 MHz transmission may include 512 tones. Of these tones, at least 3 tones may be used as DC tones and 11 tones may be used as guard tones. This may leave up to 498 usable tones, which can be divided into resource units of 30, 60, 120, 242, or 498 tones. This may allow for up to 16 resource units in a 40 MHz message. When using resource units of 242 or fewer tones, this may result in 14 unused tones, for a message which is 97.3% efficient.

Figure 38:
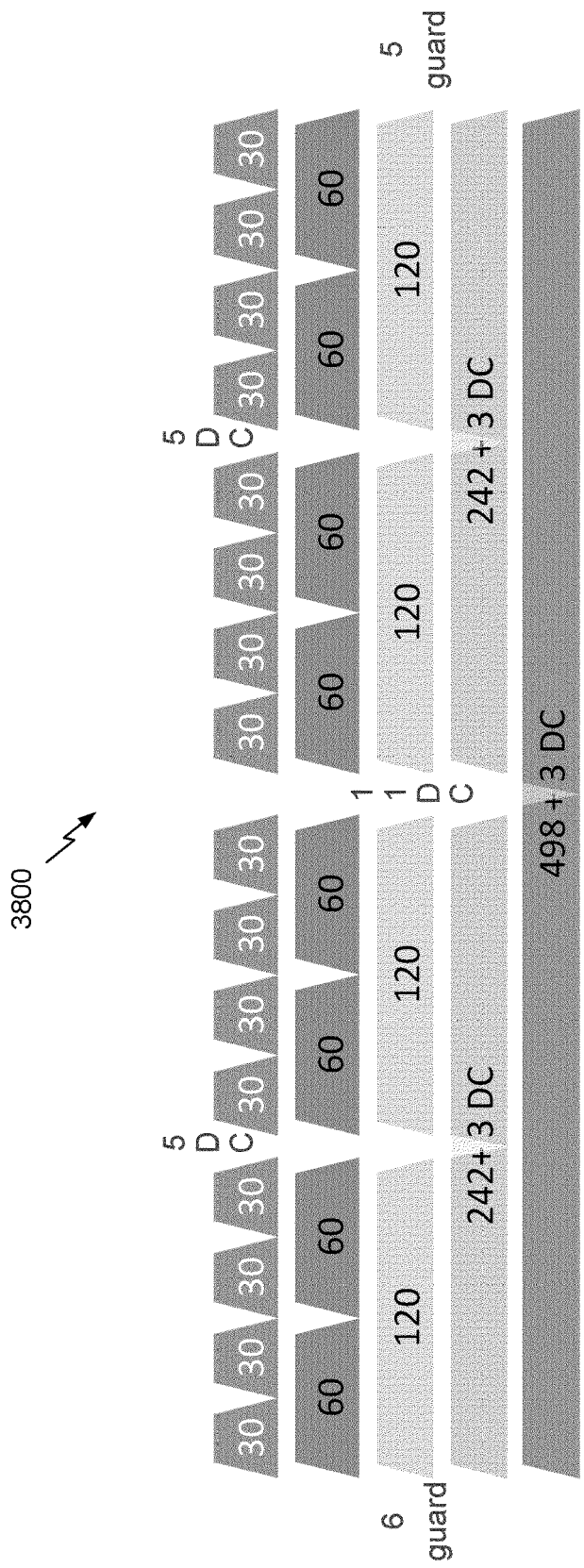
FIG. 38 is an illustration of the various sizes of resource units that may be used with a 40 MHz transmission.

FIG. 38 is an illustration 3800 of the various sizes of resource units that may be used with a 40 MHz transmission. As illustrated, a 40 MHz transmission may include up to sixteen resource units, when sixteen 30-tone resource units are used. A 40 MHz transmission may include sixteen 30-tone resource units with 11 DC tones in the center of the 40 MHz transmission and 5 DC tones on each of the two 20 MHz portions of the 40 MHz transmission. A 40 MHz transmission may also include eight 60-tone resource units with 11 DC tones in the center of the 40 MHz transmission and 5 DC tones on each of the two 20 MHz portions of the 40 MHz transmission.

A 40 MHz transmission may also include four 120-tone resource units with 11 DC tones in the center of the 40 MHz transmission and 5 DC tones on each of the two 20 MHz portions of the 40 MHz transmission. A 40 MHz transmission may also include two 242-tone resource units with 11 DC tones in the center of the 40 MHz transmission and 3 DC tones on each of the two 20 MHz portions of the 40 MHz transmission. Finally, a 40 MHz transmission may include one 498-tone resource unit, with 3 DC tones. In each of these transmissions, there may be 11 guard tones, with 6 on the left edge (that is, the negative tone indices) and 5 on the right edge (the positive tone indices).

Although each of the five alternative 40 MHz transmissions in illustration 3800 are illustrated as containing a single resource unit size, these resource unit sizes may be mixed and matched. For example, a 40 MHz transmission may, in one aspect, contain two 30-tone resource units, one 60-tone resource unit, one 120-tone resource unit, and one 242-tone resource unit. Each device that is receiving or transmitting in the OFDMA transmission may be assigned a single resource unit. The size of the resource unit assigned to a given device may be based, at least in part, on an amount of queued data that is present on that device. For example, if a device has enough queued data to transmit data across the full 40 MHz bandwidth, that device may be assigned the entire 40 MHz transmission as one 498-tone resource unit.

Referring back to FIG. 36, an 80 MHz transmission may include 1024 tones. Of these tones, at least 3 tones may be used as DC tones and 11 tones may be used as guard tones. This may leave up to 1010 usable tones, which can be divided into resource units of 30, 60, 120, 242, 498, or 1010 tones. This may allow for up to 32 resource units in an 80 MHz message. When using resource units of 242 or fewer tones, this may result in 42 unused tones, for a message which is 95.9% efficient. When using two 498-tone resource units, this may result in 14 unused tones, which is 98.6% efficient.

Figure 39:
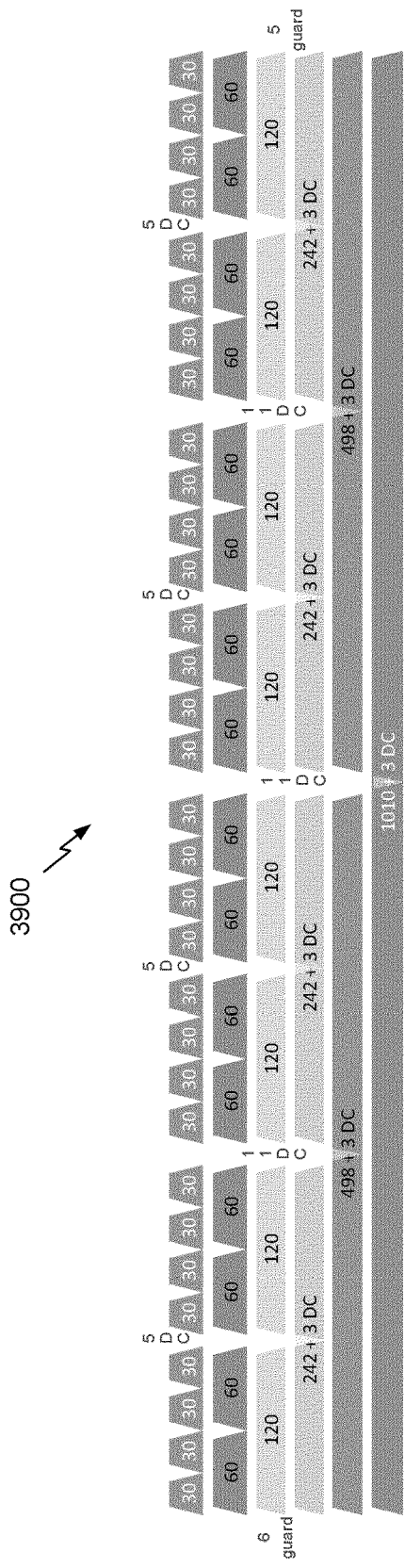
FIG. 39 is an illustration of the various sizes of resource units that may be used with an 80 MHz transmission.

FIG. 39 is an illustration 3900 of the various sizes of resource units that may be used with an 80 MHz transmission. As illustrated, an 80 MHz transmission may include up to 32 resource units, when 32 30-tone resource units are used. An 80 MHz transmission may include 32 30-tone resource units with 11 DC tones in the center of the 80 MHz transmission, 11 DC tones in the center of each 40 MHz portion of the 80 MHz transmission, and 5 DC tones on each of the four 20 MHz portions of the 80 MHz transmission.

An 80 MHz transmission may also include sixteen 60-tone resource units with 11 DC tones in the center of the 80 MHz transmission, 11 DC tones in the center of each 40 MHz portion of the 80 MHz transmission, and 5 DC tones on each of the four 20 MHz portions of the 80 MHz transmission. An 80 MHz transmission may also include eight 120-tone resource units with 11 DC tones in the center of the 80 MHz transmission, 11 DC tones in the center of each 40 MHz portion of the 80 MHz transmission, and 5 DC tones on each of the four 20 MHz portions of the 80 MHz transmission.

An 80 MHz transmission may also include four 242-tone resource units with 11 DC tones in the center of the 80 MHz transmission, 11 DC tones in the center of each 40 MHz portion of the 80 MHz transmission, and 3 DC tones on each of the four 20 MHz portions of the 80 MHz transmission. Further, an 80 MHz transmission may include two 498-tone resource units, with 11 DC tones and with 3 DC tones in each of the two 40 MHz halves of the 80 MHz transmission.

Finally, an 80 MHz transmission may include a single 1010-tone resource unit, which may have 3 DC tones. In each of these transmissions, there may be 11 guard tones, with 6 on the left edge (that is, the negative tone indices) and 5 on the right edge (the positive tone indices).

Although each of the six alternative 80 MHz transmissions in illustration 3900 are illustrated as containing a single resource unit size, these resource unit sizes may be mixed and matched. For example, an 80 MHz transmission may, in one aspect, contain two 30-tone resource units, one 60-tone resource unit, one 120-tone resource unit, one 242-tone resource unit, and one 498-tone resource unit. Each device that is receiving or transmitting in the OFDMA transmission may be assigned a single resource unit. The size of the resource unit assigned to a given device may be based, at least in part, on an amount of queued data that is present on that device. For example, if a device has enough queued data to transmit data across the full 80 MHz bandwidth, that device may be assigned the entire 80 MHz transmission as one 1010-tone resource unit.

Each of the above resource units may have differing numbers of pilot tones. Further, each of these resource units may have different placement of the pilot tones within the resource units. A 30-tone resource unit may include 28 data tones and 2 pilot tones. Generally, it may be beneficial to provide pilot tone locations that spread the pilot tones out evenly across all the tones of the transmission.

In some aspects, the pilot tones within the resource unit may be placed on the $8^{th}$ and $23^{rd}$ tones within the resource unit. This may allow for seven tones to the left of the first pilot tone, 7 tones to the right of the second pilot tone, and 14 tones between the pilot tones. Such pilot tone locations may ensure an even distribution of pilot tones when, for example, a device is assigned multiple consecutive resource units, as there may be 14 data tones between each pair of pilot tones (and 7 data tones on the sides of the first and last pilot tone).

A 60-tone and a 120-tone resource unit may, in some aspects, be thought of as two or four 30-tone resource units. For example, a 60-tone resource unit may "reuse" certain elements of the tone plans from a 30-tone resource unit. Such a 60-tone resource unit may use the same pilot tone locations and number of data and pilot tones, as if the 60-tone resource unit was composed of two 30-tone resource units. Similarly, a 120-tone resource unit may include 8 pilot tones and 112 data tones, with the pilot tones placed in the same locations as they would be for four 30-tone resource units. Accordingly, placing pilot tones on the $8^{th}$ and $23^{rd}$ tone of each 30-tone portion of these resource units may allow for pilot tones to be even spread out across resource units.

In some aspects, the pilot tones within the resource unit may be placed on the $10^{th}$ and $21^{st}$ tones within a 30-tone resource unit. In a single 30-tone resource unit, this may result in 9 data tones, followed by a pilot tone, followed by 10 data tones, followed by a pilot tone, followed by 9 data tones. Accordingly, for a single resource unit, this placement of pilot tones may allow an even distribution of the pilot tones within the tones of the 30-tone resource unit. However, this pilot tone location may be less desirable when more than one resource unit is assigned to a given user, or when these pilot tone locations are used in a 60- or 120-tone resource unit. In those situations, pilot tone spacing may alternate between having 10 data tones between pilot tones and 18 data tones between pilot tones. Accordingly, in those situations, it may be beneficial to provide pilot tones on the $8^{th}$ and $23^{rd}$ tones within the resource unit instead.

Generally, as illustrated above, single-user tone plans may be provided for each of 20 MHz, 40 MHz, and 80 MHz. For example, the single user tone plan for a 20 MHz transmission may include 242 tones. The single user tone plan for a 40 MHz transmission may include 498 tones. The single user tone plan for an 80 MHz transmission may include 1010 tones. In some aspects, other single-user tone plans may also be used.

A resource unit that includes 498 tones may include 16 pilot tones and 482 data tones. In some aspects, the 498-tone resource unit may include 12 pilot tones and 486 data tones. In some aspects, the 498-tone resource unit may include 10 pilot tones and 488 data tones. In some aspects, the 498-tone resource unit may include 8 pilot tones and 490 data tones.

A resource unit that includes 1010 tones may include 8 pilot tones and 1002 data tones. In some aspects, the 1010-tone resource unit may include 10 pilot tones and 1000 data tones. In some aspects, the 1010-tone resource unit may include 12 pilot tones and 998 data tones. In some aspects, the 1010-tone resource unit may include 14 pilot tones and 996 data tones. In some aspects, the 1010-tone resource unit may include 16 pilot tones and 994 data tones.

FIG. 40 illustrates interleaver parameters which may be used with a resource unit of 1010 tones. For example, a 1010-tone resource unit may include 1000 data tones, 1002 data tones, 1004 data tones, 1006 data tones, or 1010 data tones. In a particular embodiment, the interleaver depth (e.g., the number of columns (Ncol)) can be a factor of the number of data tones (Ndata). Accordingly, with a resource unit that includes 1000 data tones, an interleaver depth of may be selected from any of the factors of 1000, aside from 1 and 1000. So, for example, Ncol may be any of 2, 4, 5, 8, 10, 20, 25, 40, 50, 100, 125, 200, 250, or 500, when Ndata is 1000. Similarly, the values of Ncol for other values of Ndata are shown in FIG. 40 as well.

A frequency rotation can be applied to the spatial streams if there is more than one spatial stream. The frequency rotation can be based on a base subcarrier rotation (NROT) and a rotation index. The base subcarrier rotation (NROT) and the rotation index can be based on the number of data tones (Ndata) and the number of spatial streams (Nss).

For example, if the data tone block has 4 or less spatial streams (Nss), the base subcarrier rotation (NROT) can be any of 240-262. The rotation index (e.g., the 6th column) can be a bit reversal of [0 2 1 3] in this scenario. Alternatively, if the data tone block has more than 4 spatial streams (Nss), the base subcarrier rotation (NROT) can be any of 115-136. The rotation index (e.g., the 7th column) can be a bit reversal of [0 4 2 6 1 5 3 7] in some embodiments, or the rotation index can be chosen to maximize (or increase) an average subcarrier distance of adjacent streams in other embodiments (e.g., [0 5 2 7 3 6 1 4]). Although a rotation index of [0 5 2 7 3 6 1 4] is used herein as one example of an index maximizing average subcarrier distance, any other rotation indexes that maximizes (or increases) average subcarrier distance can be used. For example, any permutation which maximizes the average subcarrier distance of adjacent streams may be used, and [0 5 2 7 3 6 1 4] is only one example.

Generally, LDPC tone mapping distance (DTM) is defined in the IEEE 802.11ac specification. The mapping distance (DTM) can be at least as large as the number of coded bits per OFDM symbol (NCBPS) divided by the LDPC codeword length (LCW) (e.g., NCBPS/LCW≤DTM) so that each LDPC codeword covers the full range of tones. Additionally, the mapping distance (DTM) can be an integer divisor of the number of subcarriers (Ndata). The mapping distance (DTM) can be constant over rates within each bandwidth to enable a tone de-mapper implemented at a Fast Fourier Transform (FFT) module of the receive circuits 1116a-1116c with fixed tone processing.

FIG. 41 illustrates LDPC tone mapping distances that may be used for certain possible values of Ndata in a 1024-tone 80 MHz transmission. For example, if an Ndata value of 1000 is used, and of the factors of Ndata (aside from 1 and 1000) may be used as a mapping distance DTM. For example, any of 2, 4, 5, 8, 10, 20, 25, 40, 50, 100, 125, 200, 250, or 500 may be used as a mapping distance when Ndata is 1000. Similarly, FIG. 41 illustrates other values of DTM that may be used for other possible values of Ndata.

In some aspects, it may be desirable to provide for additional guard tones for certain transmissions. Providing more guard tones in a given tone plan may assist with spectral mask compliance. For example, it may be beneficial to provide more than 11 guard tones (6 on the left and 5 on the right) in an 80 MHz transmission, where the transmission is transmitted with a 4× symbol duration compared to IEEE 802.11ac-compliant transmissions. Accordingly, it may be desired to provide tone plans for an HE80 (high-efficiency 80 MHz) transmission which allows for additional guard tones. These transmissions may allow for 21 guard tones (with 11 guard tones on the left and 10 on the right), 23 guard tones (with 12 guard tones on the left and 11 on the right), or another number of guard tones.

Certain tone plans may be similar to the tone plans illustrated in illustration 3900 (FIG. 39), but may be modified in order to provide additional guard tones. For example, these tone plans may reduce the number of DC tones in certain portions of an HE80 transmission, in order to allow for an increased number of guard tones in the transmission, which may aid in spectral mask compliance of the transmission.

In some aspects, an 80 MHz transmission may include four 20 MHz portions. For example, illustration 3900 illustrates tone plans which, when using 240-tone or smaller tone groups, includes four distinct 20 MHz portions, each of which includes an HE20 tone plan (with the same number of guard tone, data tone, and DC tone locations). When an increased number of guard tones are used in an 80 MHz transmission, it may not be possible to use a tone plan for 80 MHz which includes four distinct HE20 portions. However, these HE20 portions are useful, as they may be used to allow a HE20-only device (which may only receive a 20 MHz transmission, for example) to receive a portion of a larger transmission. Accordingly, it may be desired for an 80 MHz transmission, even one with an increased number of guard tones, to include one or more HE20 portion.

In some aspects, an 80 MHz transmission with additional guard tones may include an HE40 portion (that is, a portion that uses a 40 MHz tone plan described above), which itself is made up of two HE20 portions. For example, this HE40 portion may be the "center" 40 MHz of an 80 MHz transmission. The 80 MHz transmission may include two other 20 MHz portions, one on each side of the central HE40 portion, and each of these two other 20 MHz portions may have tone plans which have been modified from the HE20 transmissions described above. For example, certain DC or guard tones from these two outer 20 MHz portions may be re-purposed, to allow for the 80 MHz transmission to include additional guard tones.

As described above, including such an HE40 (and thus, two HE20) portions of an 80 MHz transmission may allow for compatibility with HE20-only and HE40-only devices. Modifying the outer two 20 MHz portions to allow for increased guard tones on the 80 MHz transmission may be advantageous, as this may allow aid in spectral mask compliance.

Figure 42A:
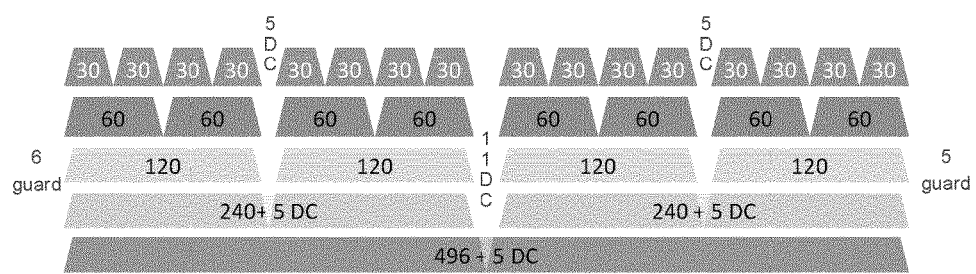
FIG. 42A is an illustration of several 40 MHz tone plans according to some aspects of the present disclosure.

FIG. 42A is an illustration of several 40 MHz tone plans according to some aspects of the present disclosure. Each line in this illustration reflects an alternative tone plan. For example, a 40 MHz transmission may include 16 30-tone tone groups, with 11 central DC tones and 5 DC tones in the center of each 20 MHz portion of the transmission. The 40 MHz transmissions may include 11 guard tones. When 40 MHz is assigned to a single user, that user may receive a 496-tone tone group, and the transmission may include only 5 DC tones. Each of the tone groups illustrated may be mixed and matched with each other, such that a 40 MHz transmission may include some number of 30-tone, 60-tone, 120-tone, and 240-tone tone groups.

Figure 42B:
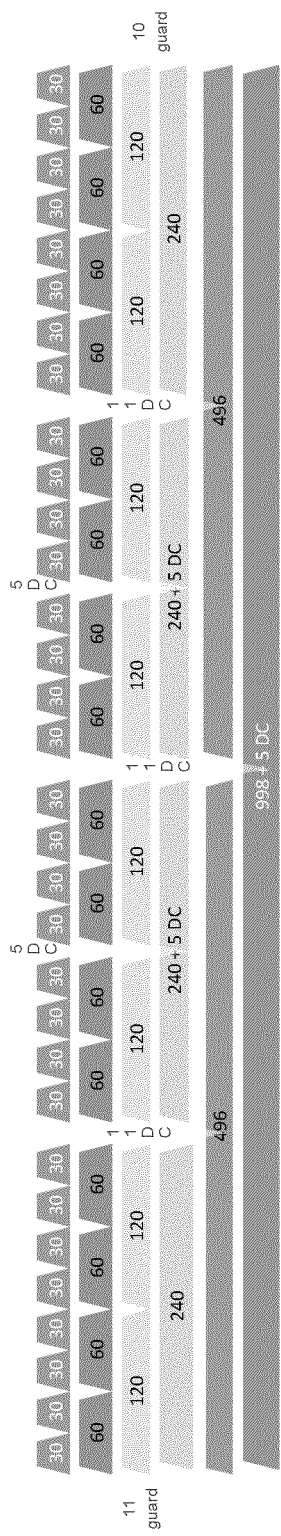
FIG. 42B is an illustration of several 80 MHz tone plans which may include 21 guard tones to aid in spectral mask compliance.

FIG. 42B is an illustration of several 80 MHz tone plans which may include 21 guard tones to aid in spectral mask compliance. As before, each of the six lines of this illustration illustrates a different tone plan for an 80 MHz transmission. Each of these transmissions includes 21 guard tones, with 11 guard tones on the left (negative tone indices) and 10 guard tones on the right (positive tone indices).

As before, portions of each of the illustrated transmissions may be mixed and matched with each other. For example, one 40 MHz portion of the transmission may include a 496-tone group, while the other 40 MHz portion may include a mix of 30-tone, 60-tone, 120-tone, and 240-tone tone groups. It may be noted from this illustration that each of the transmissions which are made up of 240-tone or smaller tone groups includes a central 40 MHz portion which has a tone plan equivalent to a 40 MHz transmission, as illustrated in FIG. 42A. For example, the central 40 MHz may include the same number of DC tones and guard tones as the stand-alone 40 MHz transmissions.

The outer two 20 MHz portions (that is, the further left and further right 20 MHz portions) of the 80 MHz transmission may have reduced numbers of DC tones. As illustrated, the outer two 20 MHz portions may not have any DC tones. By using zero DC tones in these two 20 MHz portions, these tones may be used instead to increase the number of guard tones provided in the transmission.

Accordingly, an 80 MHz transmission with 21 guard tones may include 30-tone, 60-tone, 120-tone, 240-tone, 496-tone, and/or 998-tone tone groups. When a 998-tone tone group is used, the transmission may include only 5 DC tones. When two 496-tone tone groups are used, the transmission may include 11 DC tones, with no DC tones in the center of the two 40 MHz portions. When smaller tone groups (240-tone or less) are used, the transmission may include 11 DC tones between each 20 MHz portion of the transmission, including the central DC tones. When smaller tone groups (240-tone or less) are used, the transmission may include 5 DC tones in the center two 20 MHz portions, and no DC tones in the outer two 20 MHz portions.

Figure 43:
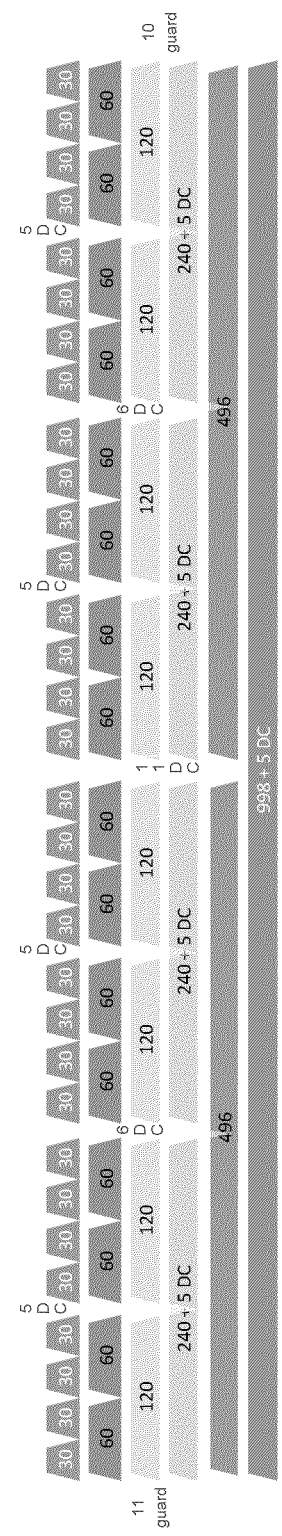
FIG. 43 is an illustration of several 80 MHz tone plans which may include 21 guard tones to aid in spectral mask compliance.

FIG. 43 is an illustration of several 80 MHz tone plans which may include 21 guard tones to aid in spectral mask compliance. As before, each of the six lines of this illustration illustrates a different tone plan for an 80 MHz transmission. Each of these transmissions includes 21 guard tones, with 11 guard tones on the left (negative tone indices) and 10 guard tones on the right (positive tone indices).

As before, portions of each of the illustrated transmissions may be mixed and matched with each other. For example, one 40 MHz portion of the transmission may include a 496-tone group, while the other 40 MHz portion may include a mix of 30-tone, 60-tone, 120-tone, and 240-tone tone groups. It may be noted from this illustration that each of the transmissions which are made up of 240-tone or smaller tone groups includes a central 40 MHz portion which has a tone plan equivalent to a 40 MHz transmission, as illustrated in FIG. 42A. For example, the central 40 MHz may include the same number of DC tones and guard tones as the stand-alone 40 MHz transmissions.

Accordingly, an 80 MHz transmission with 21 guard tones may include 30-tone, 60-tone, 120-tone, 240-tone, 496-tone, and/or 998-tone tone groups. When a 998-tone tone group is used, the transmission may include only 5 DC tones. When two 496-tone tone groups are used, the transmission may include 11 DC tones, with no DC tones in the center of the two 40 MHz portions.

In this illustration, each of the outer two 20 MHz portions may include 5 DC tones when tone groups of 240 tones or less are used. Further, each 40 MHz half of the transmission may contain 6 DC tones at the center of the two halves. This reduced number of DC tones (compared to FIG. 39) may allow for more guard tones to be used, such as 21 guard tones.

Figure 44:
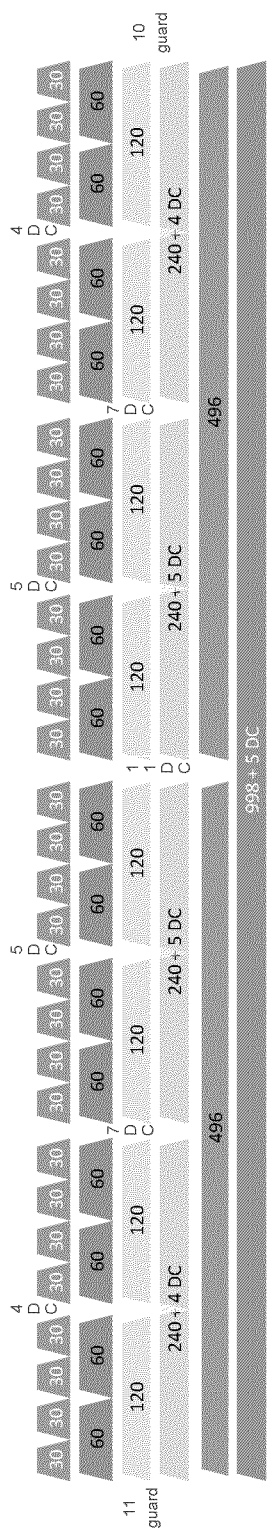
FIG. 44 is an illustration of several 80 MHz tone plans which may include 21 guard tones to aid in spectral mask compliance.

FIG. 44 is an illustration of several 80 MHz tone plans which may include 21 guard tones to aid in spectral mask compliance. As before, each of the six lines of this illustration illustrates a different tone plan for an 80 MHz transmission. Each of these transmissions includes 21 guard tones, with 11 guard tones on the left (negative tone indices) and 10 guard tones on the right (positive tone indices).

As before, portions of each of the illustrated transmissions may be mixed and matched with each other. For example, one 40 MHz portion of the transmission may include a 496-tone group, while the other 40 MHz portion may include a mix of 30-tone, 60-tone, 120-tone, and 240-tone tone groups. It may be noted from this illustration that each of the transmissions which are made up of 240-tone or smaller tone groups includes a central 40 MHz portion which has a tone plan equivalent to a 40 MHz transmission, as illustrated in FIG. 42A. For example, the central 40 MHz may include the same number of DC tones and guard tones as the stand-alone 40 MHz transmissions.

Accordingly, an 80 MHz transmission with 21 guard tones may include 30-tone, 60-tone, 120-tone, 240-tone, 496-tone, and/or 998-tone tone groups. When a 998-tone tone group is used, the transmission may include only 5 DC tones. When two 496-tone tone groups are used, the transmission may include 11 DC tones, with no DC tones in the center of the two 40 MHz portions.

In this illustration, each of the outer two 20 MHz portions may include 4 DC tones when tone groups of 240 tones or less are used. Further, each 40 MHz half of the transmission may contain 7 DC tones near the center of the two halves. Note that when fewer DC tones are used in the outer 20 MHz portions than the inner 20 MHz portions and when increased guard tones are used, this may result in HE40 DC tones which are slightly off-center from the center of each 40 MHz portion. That is, the 7 DC tones in FIG. 44 may not be centered on the true center of the first 40 MHz portion, due to the different number of DC tones in each 20 MHz portion as well as the number of guard tones present. This reduced number of DC tones (compared to FIG. 39) may allow for more guard tones to be used, such as 21 guard tones.

Figure 45:
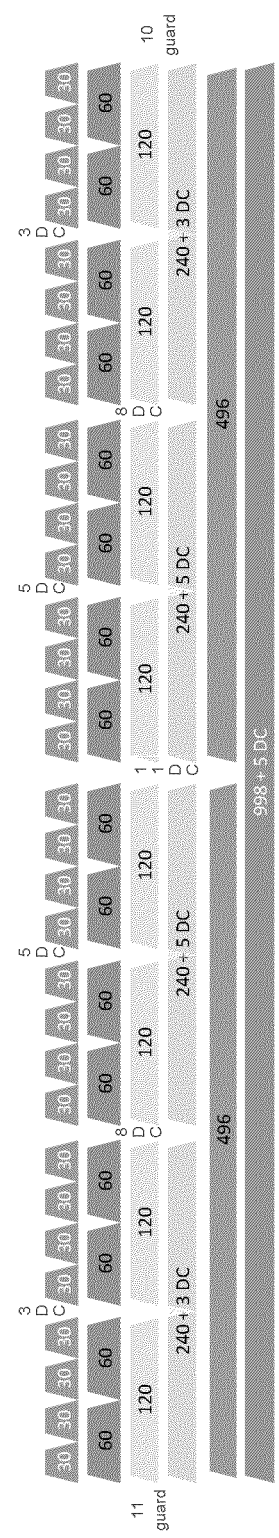
FIG. 45 is an illustration of several 80 MHz tone plans which may include 21 guard tones to aid in spectral mask compliance.

FIG. 45 is an illustration of several 80 MHz tone plans which may include 21 guard tones to aid in spectral mask compliance. As before, each of the six lines of this illustration illustrates a different tone plan for an 80 MHz transmission. Each of these transmissions includes 21 guard tones, with 11 guard tones on the left (negative tone indices) and 10 guard tones on the right (positive tone indices).

As before, portions of each of the illustrated transmissions may be mixed and matched with each other. For example, one 40 MHz portion of the transmission may include a 496-tone group, while the other 40 MHz portion may include a mix of 30-tone, 60-tone, 120-tone, and 240-tone tone groups. It may be noted from this illustration that each of the transmissions which are made up of 240-tone or smaller tone groups includes a central 40 MHz portion which has a tone plan equivalent to a 40 MHz transmission, as illustrated in FIG. 42A. For example, the central 40 MHz may include the same number of DC tones and guard tones as the stand-alone 40 MHz transmissions.

Accordingly, an 80 MHz transmission with 21 guard tones may include 30-tone, 60-tone, 120-tone, 240-tone, 496-tone, and/or 998-tone tone groups. When a 998-tone tone group is used, the transmission may include only 5 DC tones. When two 496-tone tone groups are used, the transmission may include 11 DC tones, with no DC tones in the center of the two 40 MHz portions.

In this illustration, each of the outer two 20 MHz portions may include 3 DC tones when tone groups of 240 tones or less are used. Further, each 40 MHz half of the transmission may contain 8 DC tones near the center of the two 40 MHz portions. This reduced number of DC tones (compared to FIG. 39) may allow for more guard tones to be used, such as 21 guard tones.

Figure 46:
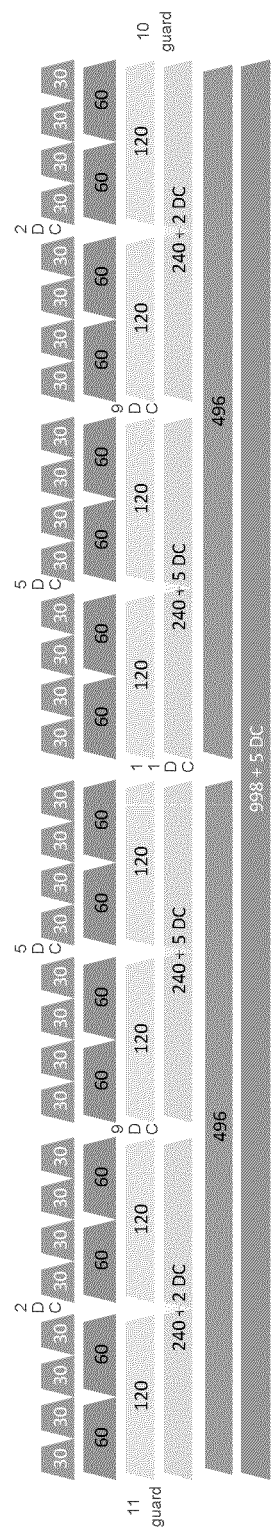
FIG. 46 is an illustration of several 80 MHz tone plans which may include 21 guard tones to aid in spectral mask compliance.

FIG. 46 is an illustration of several 80 MHz tone plans which may include 21 guard tones to aid in spectral mask compliance. As before, each of the six lines of this illustration illustrates a different tone plan for an 80 MHz transmission. Each of these transmissions includes 21 guard tones, with 11 guard tones on the left (negative tone indices) and 10 guard tones on the right (positive tone indices).

As before, portions of each of the illustrated transmissions may be mixed and matched with each other. For example, one 40 MHz portion of the transmission may include a 496-tone group, while the other 40 MHz portion may include a mix of 30-tone, 60-tone, 120-tone, and 240-tone tone groups. It may be noted from this illustration that each of the transmissions which are made up of 240-tone or smaller tone groups includes a central 40 MHz portion which has a tone plan equivalent to a 40 MHz transmission, as illustrated in FIG. 42A. For example, the central 40 MHz may include the same number of DC tones and guard tones as the stand-alone 40 MHz transmissions.

Accordingly, an 80 MHz transmission with 21 guard tones may include 30-tone, 60-tone, 120-tone, 240-tone, 496-tone, and/or 998-tone tone groups. When a 998-tone tone group is used, the transmission may include only 5 DC tones. When two 496-tone tone groups are used, the transmission may include 11 DC tones, with no DC tones in the center of the two 40 MHz portions.

In this illustration, each of the outer two 20 MHz portions may include 2 DC tones when tone groups of 240 tones or less are used. Further, each 40 MHz half of the transmission may contain 9 DC tones near the center of the two 40 MHz portions. This reduced number of DC tones (compared to FIG. 39) may allow for more guard tones to be used, such as 21 guard tones.

Figure 47:
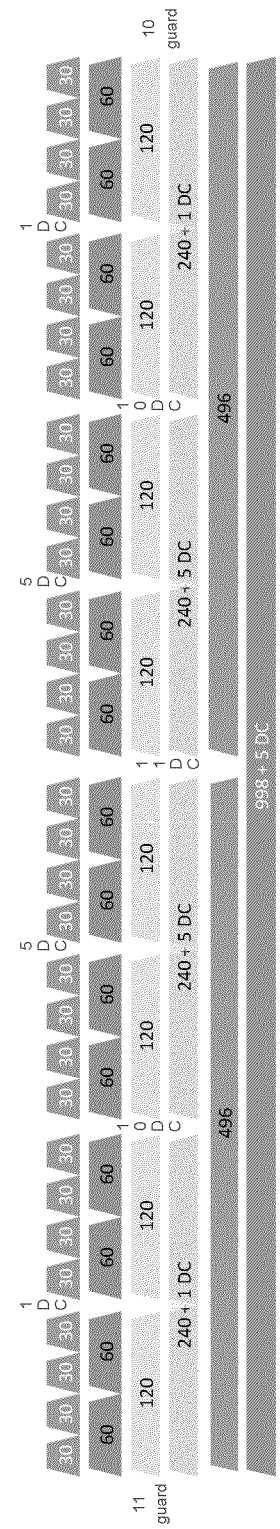
FIG. 47 is an illustration of several 80 MHz tone plans which may include 21 guard tones to aid in spectral mask compliance.

FIG. 47 is an illustration of several 80 MHz tone plans which may include 21 guard tones to aid in spectral mask compliance. As before, each of the six lines of this illustration illustrates a different tone plan for an 80 MHz transmission. Each of these transmissions includes 21 guard tones, with 11 guard tones on the left (negative tone indices) and 10 guard tones on the right (positive tone indices).

As before, portions of each of the illustrated transmissions may be mixed and matched with each other. For example, one 40 MHz portion of the transmission may include a 496-tone group, while the other 40 MHz portion may include a mix of 30-tone, 60-tone, 120-tone, and 240-tone tone groups. It may be noted from this illustration that each of the transmissions which are made up of 240-tone or smaller tone groups includes a central 40 MHz portion which has a tone plan equivalent to a 40 MHz transmission, as illustrated in FIG. 42A. For example, the central 40 MHz may include the same number of DC tones and guard tones as the stand-alone 40 MHz transmissions.

Accordingly, an 80 MHz transmission with 21 guard tones may include 30-tone, 60-tone, 120-tone, 240-tone, 496-tone, and/or 998-tone tone groups. When a 998-tone tone group is used, the transmission may include only 5 DC tones. When two 496-tone tone groups are used, the transmission may include 11 DC, with no DC tones in the center of the two 40 MHz portions.

In this illustration, each of the outer two 20 MHz portions may include 1 DC tone when tone groups of 240 tones or less are used. Further, each 40 MHz half of the transmission may contain 10 DC tones near the center of the two 40 MHz portions. This reduced number of DC tones (compared to FIG. 39) may allow for more guard tones to be used, such as 21 guard tones.

Figure 48:
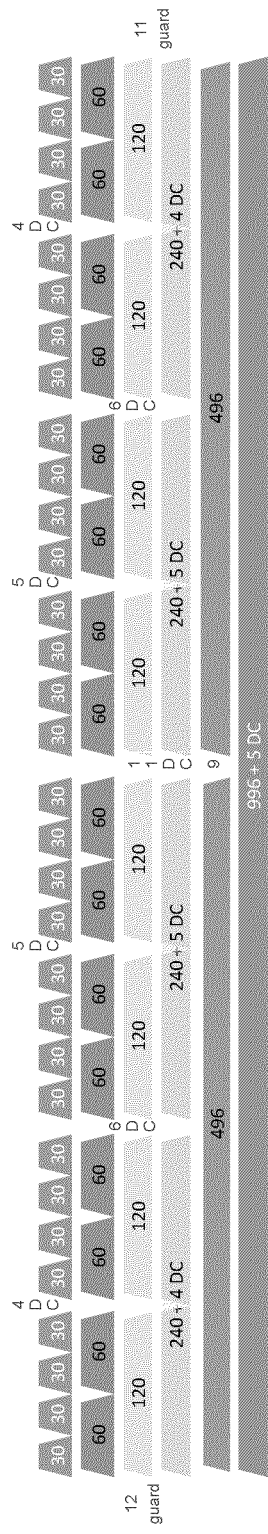
FIG. 48 is an illustration of several 80 MHz tone plans which may include 23 guard tones to aid in spectral mask compliance.

FIG. 48 is an illustration of several 80 MHz tone plans which may include 23 guard tones to aid in spectral mask compliance. As before, each of the six lines of this illustration illustrates a different tone plan for an 80 MHz transmission. Each of these transmissions includes 23 guard tones, with 12 guard tones on the left (negative tone indices) and 11 guard tones on the right (positive tone indices).

As before, portions of each of the illustrated transmissions may be mixed and matched with each other. For example, one 40 MHz portion of the transmission may include a 496-tone group, while the other 40 MHz portion may include a mix of 30-tone, 60-tone, 120-tone, and 240-tone tone groups. It may be noted from this illustration that each of the transmissions which are made up of 240-tone or smaller tone groups includes a central 40 MHz portion which has a tone plan equivalent to a 40 MHz transmission, as illustrated in FIG. 42A. For example, the central 40 MHz may include the same number of DC tones and guard tones as the stand-alone 40 MHz transmissions.

Accordingly, an 80 MHz transmission with 23 guard tones may include 30-tone, 60-tone, 120-tone, 240-tone, 496-tone, and/or 996-tone tone groups. When a 996-tone tone group is used, the transmission may include only 5 DC tones. When two 496-tone tone groups are used, the transmission may include 9 DC tones, with no DC tones in the center of the two 40 MHz portions.

In this illustration, each of the outer two 20 MHz portions may include 4 DC tones when tone groups of 240 tones or less are used. Further, each 40 MHz half of the transmission may contain 6 DC tones near the center of the two 40 MHz portions. This reduced number of DC tones (compared to FIG. 39) may allow for more guard tones to be used, such as 23 guard tones.

Figure 49:
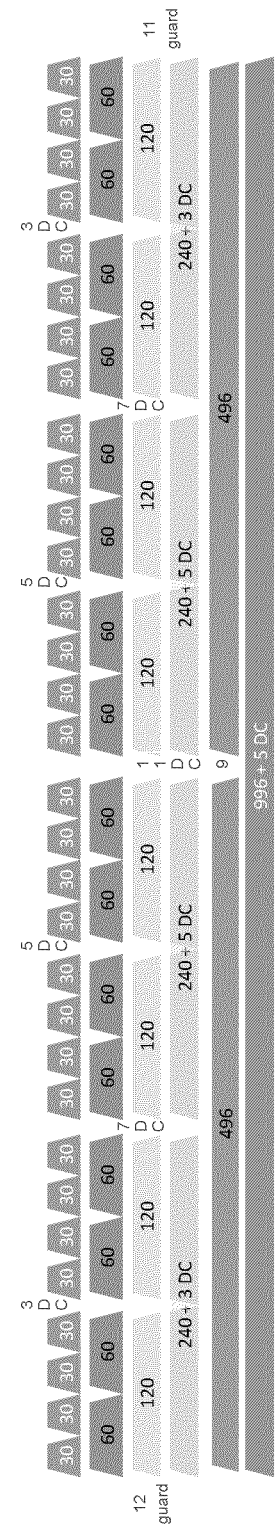
FIG. 49 is an illustration of several 80 MHz tone plans which may include 23 guard tones to aid in spectral mask compliance.

FIG. 49 is an illustration of several 80 MHz tone plans which may include 23 guard tones to aid in spectral mask compliance. As before, each of the six lines of this illustration illustrates a different tone plan for an 80 MHz transmission. Each of these transmissions includes 23 guard tones, with 12 guard tones on the left (negative tone indices) and 11 guard tones on the right (positive tone indices).

As before, portions of each of the illustrated transmissions may be mixed and matched with each other. For example, one 40 MHz portion of the transmission may include a 496-tone group, while the other 40 MHz portion may include a mix of 30-tone, 60-tone, 120-tone, and 240-tone tone groups. It may be noted from this illustration that each of the transmissions which are made up of 240-tone or smaller tone groups includes a central 40 MHz portion which has a tone plan equivalent to a 40 MHz transmission, as illustrated in FIG. 42A. For example, the central 40 MHz may include the same number of DC tones and guard tones as the stand-alone 40 MHz transmissions.

Accordingly, an 80 MHz transmission with 23 guard tones may include 30-tone, 60-tone, 120-tone, 240-tone, 496-tone, and/or 996-tone tone groups. When a 996-tone tone group is used, the transmission may include only 5 DC tones. When two 496-tone tone groups are used, the transmission may include 9 DC tones, with no DC tones in the center of the two 40 MHz portions.

In this illustration, each of the outer two 20 MHz portions may include 3 DC tones when tone groups of 240 tones or less are used. Further, each 40 MHz half of the transmission may contain 7 DC tones near the center of the two 40 MHz portions. This reduced number of DC tones (compared to FIG. 39) may allow for more guard tones to be used, such as 23 guard tones.

Figure 50:
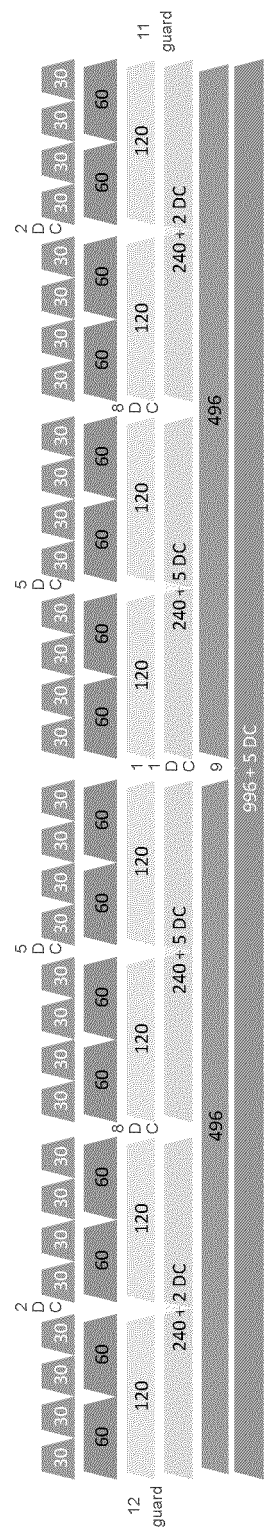
FIG. 50 is an illustration of several 80 MHz tone plans which may include 23 guard tones to aid in spectral mask compliance.

FIG. 50 is an illustration of several 80 MHz tone plans which may include 23 guard tones to aid in spectral mask compliance. As before, each of the six lines of this illustration illustrates a different tone plan for an 80 MHz transmission. Each of these transmissions includes 23 guard tones, with 12 guard tones on the left (negative tone indices) and 11 guard tones on the right (positive tone indices).

As before, portions of each of the illustrated transmissions may be mixed and matched with each other. For example, one 40 MHz portion of the transmission may include a 496-tone group, while the other 40 MHz portion may include a mix of 30-tone, 60-tone, 120-tone, and 240-tone tone groups. It may be noted from this illustration that each of the transmissions which are made up of 240-tone or smaller tone groups includes a central 40 MHz portion which has a tone plan equivalent to a 40 MHz transmission, as illustrated in FIG. 42A. For example, the central 40 MHz may include the same number of DC tones and guard tones as the stand-alone 40 MHz transmissions.

Accordingly, an 80 MHz transmission with 23 guard tones may include 30-tone, 60-tone, 120-tone, 240-tone, 496-tone, and/or 996-tone tone groups. When a 996-tone tone group is used, the transmission may include only 5 DC tones. When two 496-tone tone groups are used, the transmission may include 9 DC tones, with no DC tones in the center of the two 40 MHz portions.

In this illustration, each of the outer two 20 MHz portions may include 2 DC tones when tone groups of 240 tones or less are used. Further, each 40 MHz half of the transmission may contain 8 DC tones near the center of the two 40 MHz portions. This reduced number of DC tones (compared to FIG. 39) may allow for more guard tones to be used, such as 23 guard tones.

Figure 51:
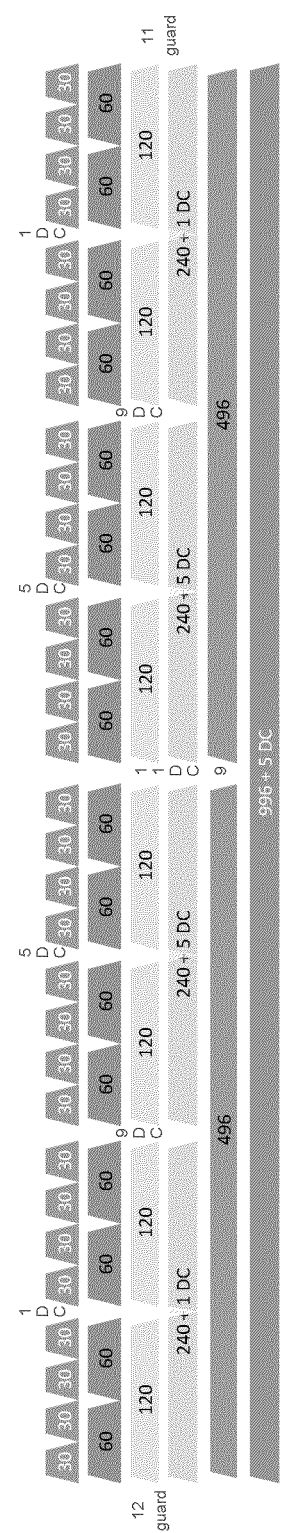
FIG. 51 is an illustration of several 80 MHz tone plans which may include 23 guard tones to aid in spectral mask compliance.

FIG. 51 is an illustration of several 80 MHz tone plans which may include 23 guard tones to aid in spectral mask compliance. As before, each of the six lines of this illustration illustrates a different tone plan for an 80 MHz transmission. Each of these transmissions includes 23 guard tones, with 12 guard tones on the left (negative tone indices) and 11 guard tones on the right (positive tone indices).

As before, portions of each of the illustrated transmissions may be mixed and matched with each other. For example, one 40 MHz portion of the transmission may include a 496-tone group, while the other 40 MHz portion may include a mix of 30-tone, 60-tone, 120-tone, and 240-tone tone groups. It may be noted from this illustration that each of the transmissions which are made up of 240-tone or smaller tone groups includes a central 40 MHz portion which has a tone plan equivalent to a 40 MHz transmission, as illustrated in FIG. 42A. For example, the central 40 MHz may include the same number of DC tones and guard tones as the stand-alone 40 MHz transmissions.

Accordingly, an 80 MHz transmission with 23 guard tones may include 30-tone, 60-tone, 120-tone, 240-tone, 496-tone, and/or 996-tone tone groups. When a 996-tone tone group is used, the transmission may include only 5 DC tones. When two 496-tone tone groups are used, the transmission may include 9 DC tones, with no DC tones in the center of the two 40 MHz portions.

In this illustration, each of the outer two 20 MHz portions may include 1 DC tone when tone groups of 240 tones or less are used. Further, each 40 MHz half of the transmission may contain 9 DC tones near the center of the two 40 MHz portions. This reduced number of DC tones (compared to FIG. 39) may allow for more guard tones to be used, such as 23 guard tones.

Figure 52:
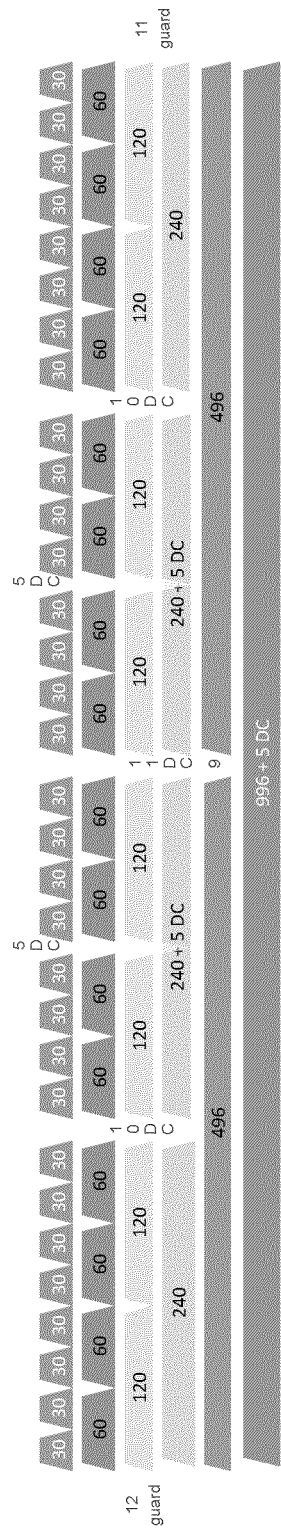
FIG. 52 is an illustration of several 80 MHz tone plans which may include 23 guard tones to aid in spectral mask compliance.

FIG. 52 is an illustration of several 80 MHz tone plans which may include 23 guard tones to aid in spectral mask compliance. As before, each of the six lines of this illustration illustrates a different tone plan for an 80 MHz transmission. Each of these transmissions includes 23 guard tones, with 12 guard tones on the left (negative tone indices) and 11 guard tones on the right (positive tone indices).

As before, portions of each of the illustrated transmissions may be mixed and matched with each other. For example, one 40 MHz portion of the transmission may include a 496-tone group, while the other 40 MHz portion may include a mix of 30-tone, 60-tone, 120-tone, and 240-tone tone groups. It may be noted from this illustration that each of the transmissions which are made up of 240-tone or smaller tone groups includes a central 40 MHz portion which has a tone plan equivalent to a 40 MHz transmission, as illustrated in FIG. 42A. For example, the central 40 MHz may include the same number of DC tones and guard tones as the stand-alone 40 MHz transmissions.

Accordingly, an 80 MHz transmission with 23 guard tones may include 30-tone, 60-tone, 120-tone, 240-tone, 496-tone, and/or 996-tone tone groups. When a 996-tone tone group is used, the transmission may include only 5 DC tones. When two 496-tone tone groups are used, the transmission may include 9 DC tones, with no DC tones in the center of the two 40 MHz portions.

In this illustration, each of the outer two 20 MHz portions may include no DC tones when tone groups of 240 tones or less are used. Further, each 40 MHz half of the transmission may contain 10 DC tones near the center of the two 40 MHz portions. This reduced number of DC tones (compared to FIG. 39) may allow for more guard tones to be used, such as 23 guard tones.

Figure 53A:
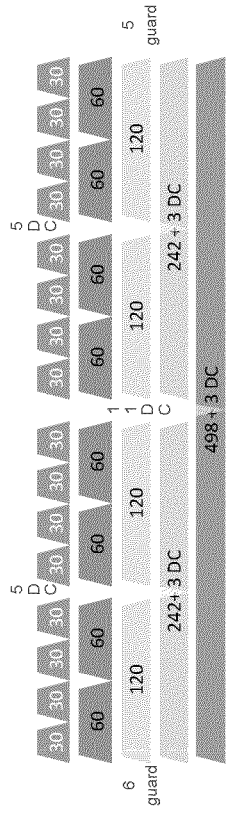
FIG. 53A is an illustration of several 20 MHz tone plans which may include a 242-tone tone group.

FIG. 53A is an illustration of several 20 MHz tone plans which may include a 242-tone tone group. For example, the 20 MHz transmission may include 11 guard tones, and may include 5 DC tones when transmitting using 30, 60, or 120-tone tone groups. The 20 MHz transmission may also include a tone group with 242 tones, which may include 3 DC tones. As before, the transmission may include tone groups of various sizes, and do not need to include only one tone group size, as illustrated.

Figure 53B:
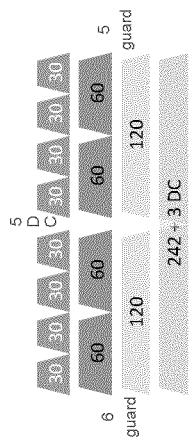
FIG. 53B is an illustration of several 40 MHz tone plans.

FIG. 53B is an illustration of several 40 MHz tone plans. For example, the 40 MHz transmission may include 11 guard tones, and may include 11 DC tones when transmitting using tone groups of 30, 60, 120, or 242 tones. Further, each 20 MHz portion of the transmission may include 5 DC tones when using tone groups of 120 tones or smaller, and may include 3 DC tones when using a tone group of 242 tones. The 40 MHz transmission may also include a single 498 tone allocation, with 3 DC tones. As before, the transmission may include tone groups of various sizes, and do not need to include only one tone group size, as illustrated.

Figure 53C:
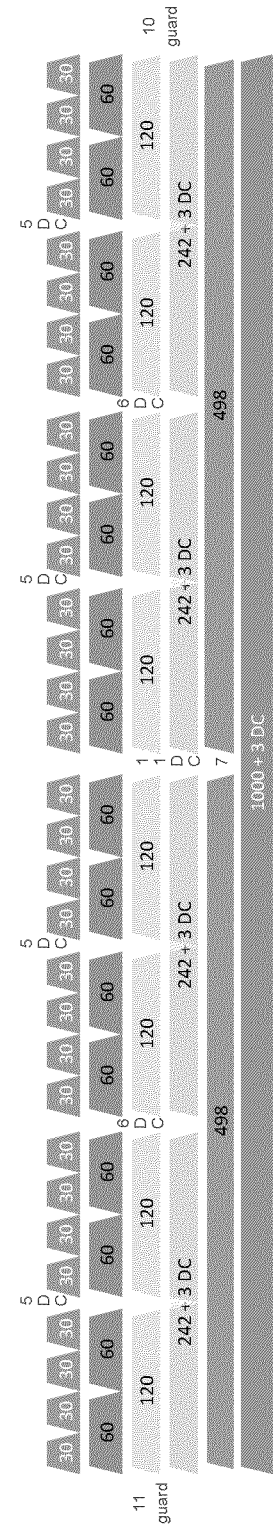
FIG. 53C is an illustration of several 80 MHz tone plans which may include 21 guard tones to aid in spectral mask compliance.

FIG. 53C is an illustration of several 80 MHz tone plans which may include 21 guard tones to aid in spectral mask compliance. These tone plans may include six sizes of tone groups, including tone groups which have 30, 60, 120, 242, 498, and 1000 tones. As before, each of the six lines of this illustration illustrates a different tone plan for an 80 MHz transmission. Each of these transmissions includes 21 guard tones, with 11 guard tones on the left (negative tone indices) and 10 guard tones on the right (positive tone indices).

As before, portions of each of the illustrated transmissions may be mixed and matched with each other. For example, one 40 MHz portion of the transmission may include a 498-tone tone group, while the other 40 MHz portion may include a mix of 30-tone, 60-tone, 120-tone, and 242-tone tone groups. It may be noted from this illustration that each of the transmissions which are made up of 242-tone or smaller tone groups includes a central 40 MHz portion which has a tone plan equivalent to a 40 MHz transmission, as illustrated in FIG. 53B. For example, the central 40 MHz may include the same number of DC tones and guard tones as the stand-alone 40 MHz transmissions.

Accordingly, an 80 MHz transmission with 21 guard tones may include 30-tone, 60-tone, 120-tone, 242-tone, 498-tone, and/or 1000-tone tone groups. When a 1000-tone tone group is used, the transmission may include only 3 DC tones. When two 498-tone tone groups are used, the transmission may include 7 DC tones, with no DC tones in the center of the two 40 MHz portions.

In this illustration, each of the outer two 20 MHz portions may include 5 DC tones when tone groups of 120 tones or less are used, and 3 DC tones when a tone group of 242 tones is used. Further, each 40 MHz half of the transmission may contain 6 DC tones near the center of the two 40 MHz portions. This reduced number of DC tones (compared to FIG. 39) may allow for more guard tones to be used, such as 21 guard tones.

Figure 54:
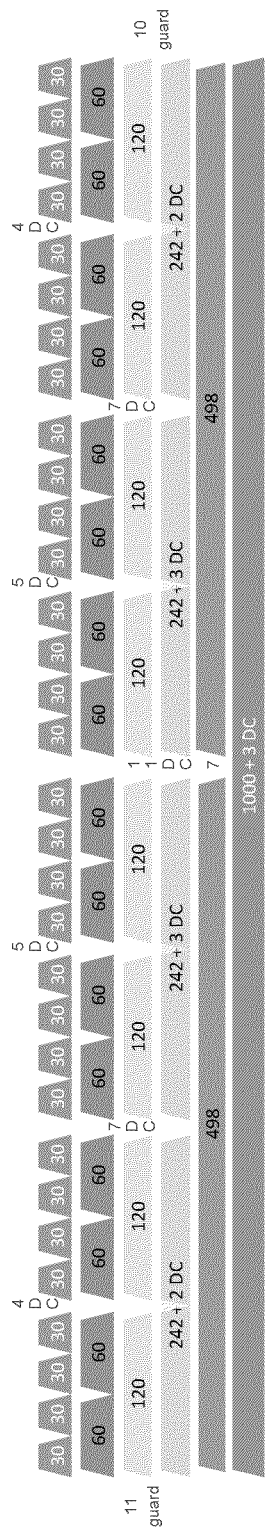
FIG. 54 is an illustration of several 80 MHz tone plans which may include 21 guard tones to aid in spectral mask compliance.

FIG. 54 is an illustration of several 80 MHz tone plans which may include 21 guard tones to aid in spectral mask compliance. These tone plans may include six sizes of tone groups, including tone groups which have 30, 60, 120, 242, 498, and 1000 tones. As before, each of the six lines of this illustration illustrates a different tone plan for an 80 MHz transmission. Each of these transmissions includes 21 guard tones, with 11 guard tones on the left (negative tone indices) and 10 guard tones on the right (positive tone indices).

As before, portions of each of the illustrated transmissions may be mixed and matched with each other. For example, one 40 MHz portion of the transmission may include a 498-tone tone group, while the other 40 MHz portion may include a mix of 30-tone, 60-tone, 120-tone, and 242-tone tone groups. It may be noted from this illustration that each of the transmissions which are made up of 242-tone or smaller tone groups includes a central 40 MHz portion which has a tone plan equivalent to a 40 MHz transmission, as illustrated in FIG. 53B. For example, the central 40 MHz may include the same number of DC tones and guard tones as the stand-alone 40 MHz transmissions.

Accordingly, an 80 MHz transmission with 21 guard tones may include 30-tone, 60-tone, 120-tone, 242-tone, 498-tone, and/or 1000-tone tone groups. When a 1000-tone tone group is used, the transmission may include only 3 DC tones. When two 498-tone tone groups are used, the transmission may include 7 DC tones, with no DC tones in the center of the two 40 MHz portions.

In this illustration, each of the outer two 20 MHz portions may include 4 DC tones when tone groups of 120 tones or less are used, and 2 DC tones when a tone group of 242 tones is used. Further, each 40 MHz half of the transmission may contain 7 DC tones near the center of the two 40 MHz portions. This reduced number of DC tones (compared to FIG. 39) may allow for more guard tones to be used, such as 21 guard tones.

Figure 55:
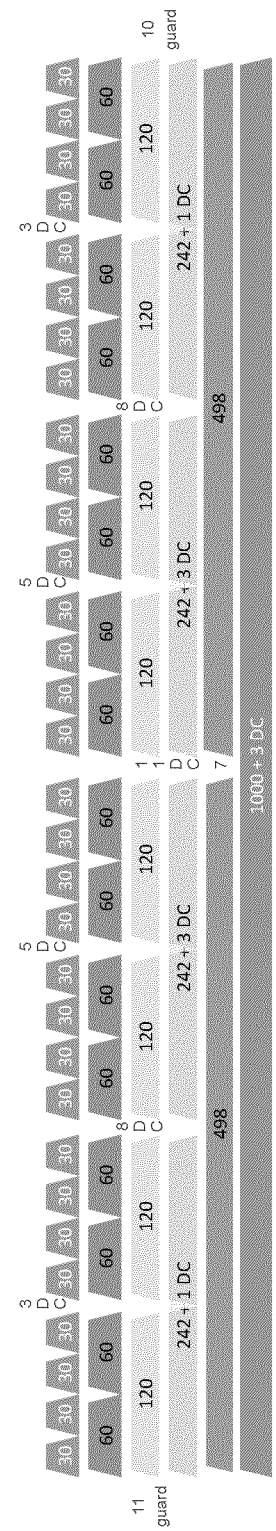
FIG. 55 is an illustration of several 80 MHz tone plans which may include 21 guard tones to aid in spectral mask compliance.

FIG. 55 is an illustration of several 80 MHz tone plans which may include 21 guard tones to aid in spectral mask compliance. These tone plans may include six sizes of tone groups, including tone groups which have 30, 60, 120, 242, 498, and 1000 tones. As before, each of the six lines of this illustration illustrates a different tone plan for an 80 MHz transmission. Each of these transmissions includes 21 guard tones, with 11 guard tones on the left (negative tone indices) and 10 guard tones on the right (positive tone indices).

As before, portions of each of the illustrated transmissions may be mixed and matched with each other. For example, one 40 MHz portion of the transmission may include a 498-tone tone group, while the other 40 MHz portion may include a mix of 30-tone, 60-tone, 120-tone, and 242-tone tone groups. It may be noted from this illustration that each of the transmissions which are made up of 242-tone or smaller tone groups includes a central 40 MHz portion which has a tone plan equivalent to a 40 MHz transmission, as illustrated in FIG. 53B. For example, the central 40 MHz may include the same number of DC tones and guard tones as the stand-alone 40 MHz transmissions.

Accordingly, an 80 MHz transmission with 21 guard tones may include 30-tone, 60-tone, 120-tone, 242-tone, 498-tone, and/or 1000-tone tone groups. When a 1000-tone tone group is used, the transmission may include only 3 DC tones. When two 498-tone tone groups are used, the transmission may include 7 DC tones, with no DC tones in the center of the two 40 MHz portions.

In this illustration, each of the outer two 20 MHz portions may include 3 DC tones when tone groups of 120 tones or less are used, and 1 DC tone when a tone group of 242 tones is used. Further, each 40 MHz half of the transmission may contain 8 DC tones near the center of the two 40 MHz portions. This reduced number of DC tones (compared to FIG. 39) may allow for more guard tones to be used, such as 21 guard tones.

Figure 56:
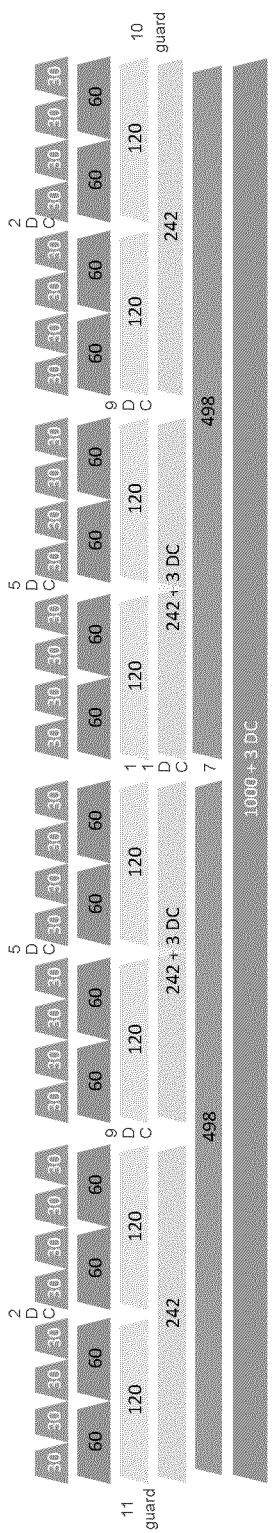
FIG. 56 is an illustration of several 80 MHz tone plans which may include 21 guard tones to aid in spectral mask compliance.

FIG. 56 is an illustration of several 80 MHz tone plans which may include 21 guard tones to aid in spectral mask compliance. These tone plans may include six sizes of tone groups, including tone groups which have 30, 60, 120, 242, 498, and 1000 tones. As before, each of the six lines of this illustration illustrates a different tone plan for an 80 MHz transmission. Each of these transmissions includes 21 guard tones, with 11 guard tones on the left (negative tone indices) and 10 guard tones on the right (positive tone indices).

As before, portions of each of the illustrated transmissions may be mixed and matched with each other. For example, one 40 MHz portion of the transmission may include a 498-tone tone group, while the other 40 MHz portion may include a mix of 30-tone, 60-tone, 120-tone, and 242-tone tone groups. It may be noted from this illustration that each of the transmissions which are made up of 242-tone or smaller tone groups includes a central 40 MHz portion which has a tone plan equivalent to a 40 MHz transmission, as illustrated in FIG. 53B. For example, the central 40 MHz may include the same number of DC tones and guard tones as the stand-alone 40 MHz transmissions.

Accordingly, an 80 MHz transmission with 21 guard tones may include 30-tone, 60-tone, 120-tone, 242-tone, 498-tone, and/or 1000-tone tone groups. When a 1000-tone tone group is used, the transmission may include only 3 DC tones. When two 498-tone tone groups are used, the transmission may include 7 DC tones, with no DC tones in the center of the two 40 MHz portions.

In this illustration, each of the outer two 20 MHz portions may include 2 DC tones when tone groups of 120 tones or less are used, and no DC tones when a tone group of 242 tones is used. Further, each 40 MHz half of the transmission may contain 9 DC tones near the center of the two 40 MHz portions. This reduced number of DC tones (compared to FIG. 39) may allow for more guard tones to be used, such as 21 guard tones.

Figure 57:
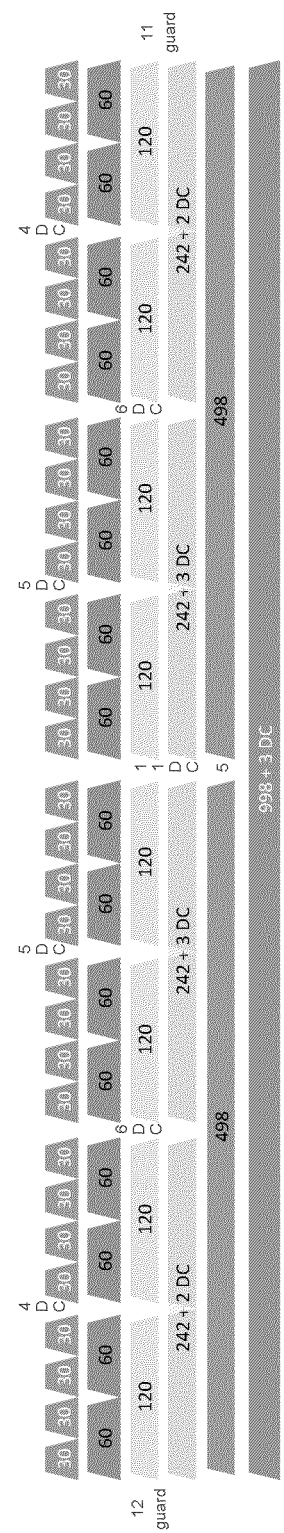
FIG. 57 is an illustration of several 80 MHz tone plans which may include 23 guard tones to aid in spectral mask compliance.

FIG. 57 is an illustration of several 80 MHz tone plans which may include 23 guard tones to aid in spectral mask compliance. These tone plans may include six sizes of tone groups, including tone groups which have 30, 60, 120, 242, 498, and 998 tones. As before, each of the six lines of this illustration illustrates a different tone plan for an 80 MHz transmission. Each of these transmissions includes 23 guard tones, with 12 guard tones on the left (negative tone indices) and 11 guard tones on the right (positive tone indices).

As before, portions of each of the illustrated transmissions may be mixed and matched with each other. For example, one 40 MHz portion of the transmission may include a 498-tone tone group, while the other 40 MHz portion may include a mix of 30-tone, 60-tone, 120-tone, and 242-tone tone groups. It may be noted from this illustration that each of the transmissions which are made up of 242-tone or smaller tone groups includes a central 40 MHz portion which has a tone plan equivalent to a 40 MHz transmission, as illustrated in FIG. 53B. For example, the central 40 MHz may include the same number of DC tones and guard tones as the stand-alone 40 MHz transmissions.

Accordingly, an 80 MHz transmission with 23 guard tones may include 30-tone, 60-tone, 120-tone, 242-tone, 498-tone, and/or 998-tone tone groups. When a 998-tone tone group is used, the transmission may include only 3 DC tones. When two 498-tone tone groups are used, the transmission may include 5 DC tones, with no DC tones in the center of the two 40 MHz portions.

In this illustration, each of the outer two 20 MHz portions may include 4 DC tones when tone groups of 120 tones or less are used, and 2 DC tones when a tone group of 242 tones is used. Further, each 40 MHz half of the transmission may contain 6 DC tones near the center of the two 40 MHz portions. This reduced number of DC tones (compared to FIG. 39) may allow for more guard tones to be used, such as 23 guard tones.

Figure 58:
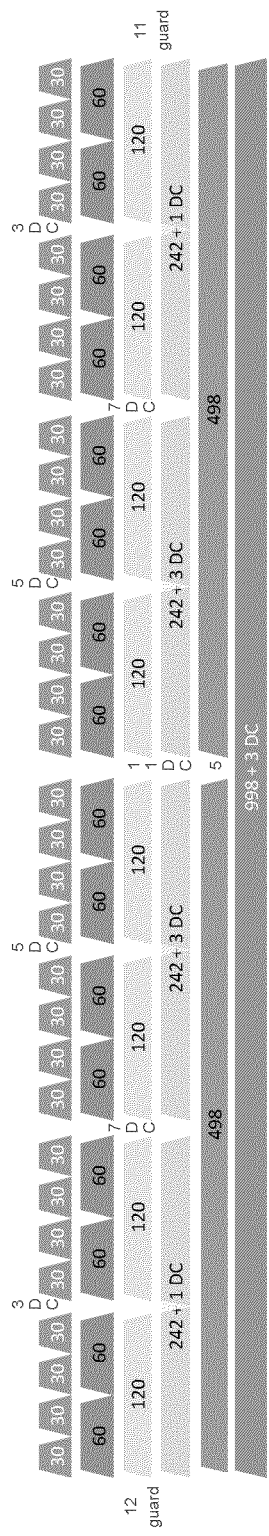
FIG. 58 is an illustration of several 80 MHz tone plans which may include 23 guard tones to aid in spectral mask compliance.

FIG. 58 is an illustration of several 80 MHz tone plans which may include 23 guard tones to aid in spectral mask compliance. These tone plans may include six sizes of tone groups, including tone groups which have 30, 60, 120, 242, 498, and 998 tones. As before, each of the six lines of this illustration illustrates a different tone plan for an 80 MHz transmission. Each of these transmissions includes 23 guard tones, with 12 guard tones on the left (negative tone indices) and 11 guard tones on the right (positive tone indices).

As before, portions of each of the illustrated transmissions may be mixed and matched with each other. For example, one 40 MHz portion of the transmission may include a 498-tone tone group, while the other 40 MHz portion may include a mix of 30-tone, 60-tone, 120-tone, and 242-tone tone groups. It may be noted from this illustration that each of the transmissions which are made up of 242-tone or smaller tone groups includes a central 40 MHz portion which has a tone plan equivalent to a 40 MHz transmission, as illustrated in FIG. 53B. For example, the central 40 MHz may include the same number of DC tones and guard tones as the stand-alone 40 MHz transmissions.

Accordingly, an 80 MHz transmission with 23 guard tones may include 30-tone, 60-tone, 120-tone, 242-tone, 498-tone, and/or 998-tone tone groups. When a 998-tone tone group is used, the transmission may include only 3 DC tones. When two 498-tone tone groups are used, the transmission may include 5 DC tones, with no DC tones in the center of the two 40 MHz portions.

In this illustration, each of the outer two 20 MHz portions may include 3 DC tones when tone groups of 120 tones or less are used, and 1 DC tone when a tone group of 242 tones is used. Further, each 40 MHz half of the transmission may contain 7 DC tones near the center of the two 40 MHz portions. This reduced number of DC tones (compared to FIG. 39) may allow for more guard tones to be used, such as 23 guard tones.

Figure 59:
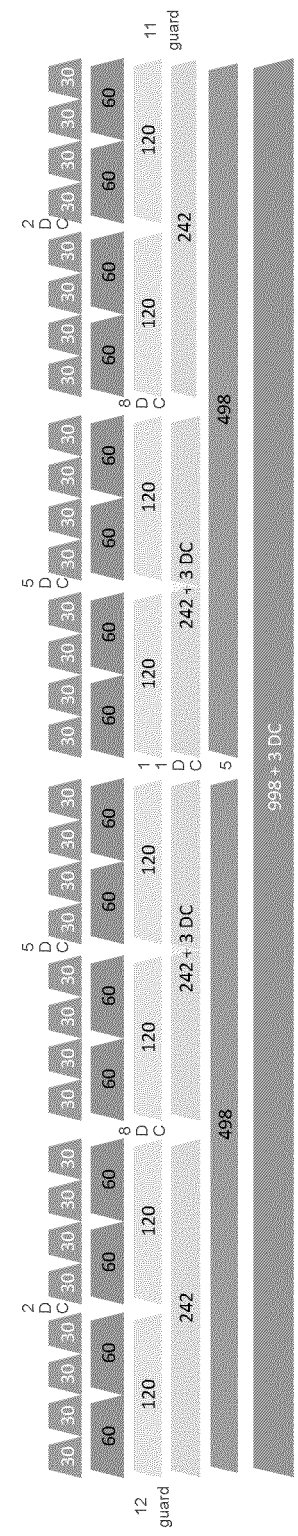
FIG. 59 is an illustration of several 80 MHz tone plans which may include 23 guard tones to aid in spectral mask compliance.

FIG. 59 is an illustration of several 80 MHz tone plans which may include 23 guard tones to aid in spectral mask compliance. These tone plans may include six sizes of tone groups, including tone groups which have 30, 60, 120, 242, 498, and 998 tones. As before, each of the six lines of this illustration illustrates a different tone plan for an 80 MHz transmission. Each of these transmissions includes 23 guard tones, with 12 guard tones on the left (negative tone indices) and 11 guard tones on the right (positive tone indices).

As before, portions of each of the illustrated transmissions may be mixed and matched with each other. For example, one 40 MHz portion of the transmission may include a 498-tone tone group, while the other 40 MHz portion may include a mix of 30-tone, 60-tone, 120-tone, and 242-tone tone groups. It may be noted from this illustration that each of the transmissions which are made up of 242-tone or smaller tone groups includes a central 40 MHz portion which has a tone plan equivalent to a 40 MHz transmission, as illustrated in FIG. 53B. For example, the central 40 MHz may include the same number of DC tones and guard tones as the stand-alone 40 MHz transmissions.

Accordingly, an 80 MHz transmission with 23 guard tones may include 30-tone, 60-tone, 120-tone, 242-tone, 498-tone, and/or 998-tone tone groups. When a 998-tone tone group is used, the transmission may include only 3 DC tones. When two 498-tone tone groups are used, the transmission may include 5 DC tones, with no DC tones in the center of the two 40 MHz portions.

In this illustration, each of the outer two 20 MHz portions may include 2 DC tones when tone groups of 120 tones or less are used, and no DC tones when a tone group of 242 tones is used. Further, each 40 MHz half of the transmission may contain 8 DC tones near the center of the two 40 MHz portions. This reduced number of DC tones (compared to FIG. 39) may allow for more guard tones to be used, such as 23 guard tones.

In some aspects, using a resource unit (tone group) of 30 tones may be advantageous. For example, this recourse unit size allows for eight tone groups to fit into each 20 MHz bandwidth. Eight is an even number, such that this means that none of the eight 30-tone resource units includes tones on both sides of the DC tones. Instead, each of the resource units is entirely on one side of the DC tones in such a 20 MHz transmission.

However, it may be desired to use a 26-tone resource unit instead. The use of such a resource unit may allow for the use of transmitter parameters that have been used in prior versions of IEEE 802.11 standards, such that these transmitter parameters (including interleaver parameters) may be known. When using a 26-tone resource unit with a 4× symbol duration, there may be nine resource units in each 20 MHz portion of the bandwidth. Because this is an odd number, one of the resource units includes tones on both sides of the central DC tones. For example, eight of the nine resource units will include tones on only one side of the DC tones, but the ninth resource unit includes 13 tones to the left of the DC tones, and 13 tones to the right of the DC tones. Each of these 13 tones may be in any location in the transmission, on their side of the DC tones. For example, these 13 tones on each side may be placed around the HE20 DC tones, such that they are adjacent to the DC tones on each side. Alternatively, these 13 tones on each side may be placed around the edge of the HE20 transmission, such that they may be adjacent to the guard tones of the 20 MHz transmission (or 20 MHz portion of a larger transmission).

Further, in some aspects, it may be desired to use 26-tone resource units while also using 21 or 23 guard tones in an 80 MHz transmission. As described above, the use of 21 or 23 guard tones may be beneficial for spectral mask compliance. Accordingly, tone plans which include any of 11, 21, or 23 guard tones in an HE80 transmission, and placement of the 13 tones on each size of the HE20 DC tones may be desired.

Figure 60:
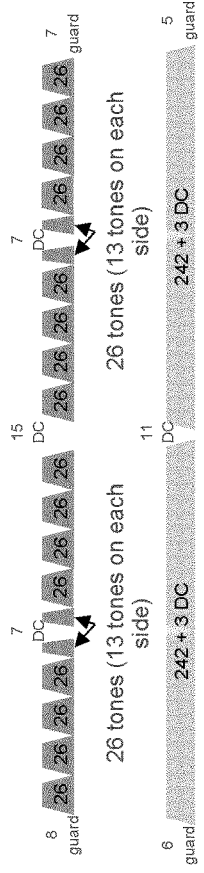
FIG. 60 is an illustration of a 20 MHz transmission which uses 26- and 242-tone resource units.

FIG. 60 is an illustration of a 20 MHz transmission which uses 26- and 242-tone resource units. Each 26-tone resource unit may include 24 data tones and 2 pilot tones. Each 242-tone resource unit may include 234 data tones and 8 pilot tones. As illustrated, when using 26-tone resource units, the transmission may include 15 guard tones (8 on the left, 7 on the right) and 7 DC tones. There may be 9 resource units, with one resource unit including tones on both sides of the DC tones. As illustrated, the resource unit which includes 13 tones on each side of the DC tones may include tones located adjacent to the DC tones. When a 242-tone resource unit is used, the 20 MHz transmission may include 11 guard tones (6 on the left, 5 on the right) and 3 DC tones.

Figure 61:
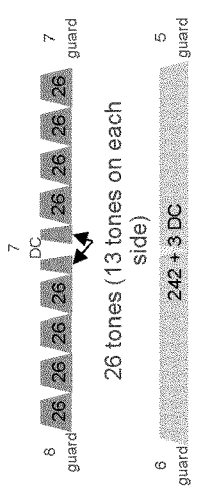
FIG. 61 is an illustration of a 40 MHz transmission which uses 26- and 242-tone resource units.

FIG. 61 is an illustration of a 40 MHz transmission which uses 26- and 242-tone resource units. Each 26-tone resource unit may include 24 data tones and 2 pilot tones. Each 242-tone resource unit may include 234 data tones and 8 pilot tones. As illustrated, when using 26-tone resource units, the transmission may include 15 guard tones (8 on the left, 7 on the right), 15 DC tones, and 7 DC tones in each 20 MHz portion of the transmission. It may be observed that this tone plan is equivalent to two 20 MHz transmissions, side-by-side. Each 20 MHz portion may include one resource unit including tones on both sides of the DC tones of that 20 MHz portion. As illustrated, the resource unit which includes 13 tones on each side of the DC tones may include tones located adjacent to the DC tones of that 20 MHz portion.

When two 242-tone resource units are used, the 40 MHz transmission may include 11 guard tones (6 on the left, 5 on the right), 11 DC tones, and 3 DC tones near the center of each 20 MHz portion. It may be noted that transmitting using two 242-tone resource units may be equivalent, in some sense, to transmitting two 20 MHz transmissions side-by-side.

Figure 62:
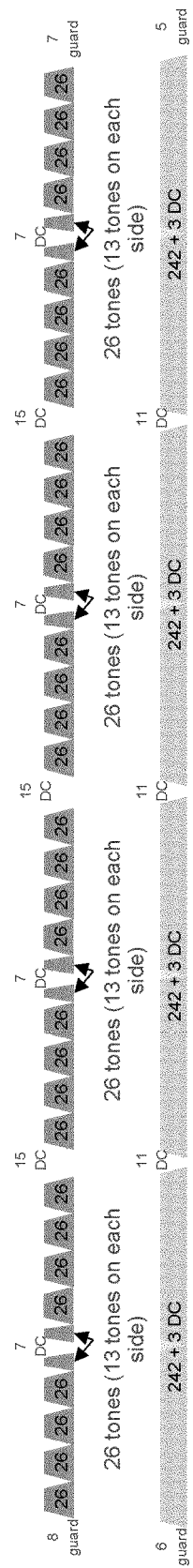
FIG. 62 is an illustration of an 80 MHz transmission which uses 26- and 242-tone resource units.

FIG. 62 is an illustration of an 80 MHz transmission which uses 26- and 242-tone resource units. Each 26-tone resource unit may include 24 data tones and 2 pilot tones. Each 242-tone resource unit may include 234 data tones and 8 pilot tones. As illustrated, when using 26-tone resource units, the transmission may include 15 guard tones (8 on the left, 7 on the right), 15 DC tones, 15 DC tones in the center of each 40 MHz portion, and 7 DC tones in the center of each 20 MHz portion of the transmission. It may be observed that this tone plan is equivalent to four 20 MHz transmissions, side-by-side. Each 20 MHz portion may include one resource unit including tones on both sides of the DC tones of that 20 MHz portion. As illustrated, the resource unit which includes 13 tones on each side of the DC tones may include tones located adjacent to the DC tones of that 20 MHz portion.

When four 242-tone resource units are used, the 80 MHz transmission may include 11 guard tones (6 on the left, 5 on the right), 11 DC tones, 11 DC tones in the center of each 40 MHz portion, and 3 DC tones near the center of each 20 MHz portion. It may be noted that transmitting using four 242-tone resource units may be equivalent, in some sense, to transmitting four 20 MHz transmissions side-by-side.

In some aspects, it may be desirable to alter the tone plan of FIG. 62 in order to provide additional guard tones. As described above, this may aid in spectral mask compliance in 80 MHz transmissions. The tone plan of FIG. 62 may be altered in a number of ways in order to add more guard tones. For example, tones which were used as DC tones in the two 40 MHz portions may be re-purposed to be guard tones. Tones which were used as DC tones in the four 20 MHz portions may also be re-purposed as guard tones. In some aspects, it may be beneficial to re-purpose tones from only the two outer 20 MHz portions are altered in order to provide more guard tones. This may allow the center 40 MHz of an 80 MHz transmission to be equivalent to a 40 MHz transmission, which may be beneficial for devices which may only support HE20 or HE40 transmissions.

Figure 63:
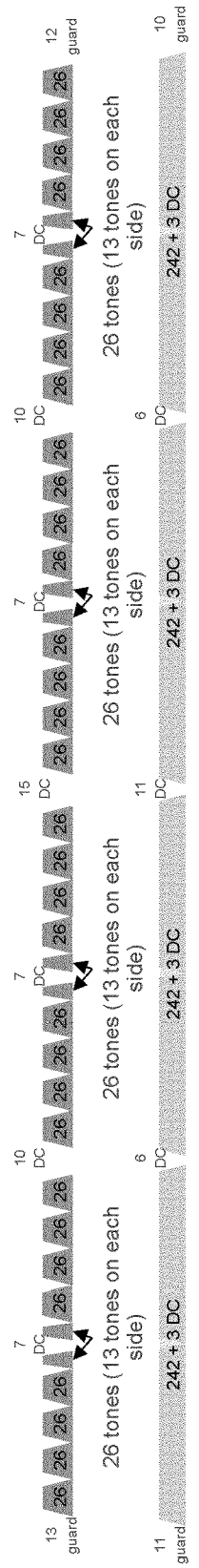
FIG. 63 is an illustration of an 80 MHz transmission with additional guard tones, using 26-tone and 242-tone resource units.

FIG. 63 is an illustration of an 80 MHz transmission with additional guard tones, using 26-tone and 242-tone resource units. Each 26-tone resource unit may include 24 data tones and 2 pilot tones. Each 242-tone resource unit may include 234 data tones and 8 pilot tones. As illustrated, when using 26-tone resource units, the transmission may include 25 guard tones (13 on the left, 12 on the right), 15 DC tones, 10 DC tones near the center of each 40 MHz portion, and 7 DC tones in the center of each 20 MHz portion of the transmission. Each 20 MHz portion may include one resource unit including tones on both sides of the DC tones of that 20 MHz portion. As illustrated, the resource unit which includes 13 tones on each side of the DC tones may include tones located adjacent to the DC tones of that 20 MHz portion.

When four 242-tone resource units are used, the 80 MHz transmission may include 21 guard tones (11 on the left, 10 on the right), 11 DC tones, 6 DC tones near the center of each 40 MHz portion, and 3 DC tones near the center of each 20 MHz portion.

Figure 64:
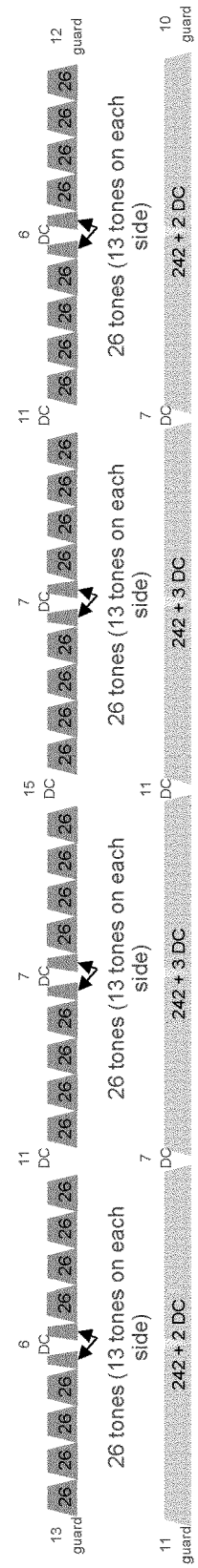
FIG. 64 is an illustration of an 80 MHz transmission with additional guard tones, using 26-tone and 242-tone resource units.

FIG. 64 is an illustration of an 80 MHz transmission with additional guard tones, using 26-tone and 242-tone resource units. Each 26-tone resource unit may include 24 data tones and 2 pilot tones. Each 242-tone resource unit may include 234 data tones and 8 pilot tones. As illustrated, when using 26-tone resource units, the transmission may include 25 guard tones (13 on the left, 12 on the right), 15 DC tones, 11 DC tones near the center of each 40 MHz portion, 7 DC tones in the center of the two central 20 MHz portions of the transmission, and 6 DC tones in the center of the two outer 20 MHz portions of the transmission. Each 20 MHz portion may include one resource unit including tones on both sides of the DC tones of that 20 MHz portion. As illustrated, the resource unit which includes 13 tones on each side of the DC tones may include tones located adjacent to the DC tones of that 20 MHz portion.

When four 242-tone resource units are used, the 80 MHz transmission may include 21 guard tones (11 on the left, 10 on the right), 11 DC tones, 7 DC tones near the center of each 40 MHz portion, 3 DC tones at the center of the two central 20 MHz portions, and 2 DC tones at the center of the two outer 20 MHz portions.

Figures 65, 66:
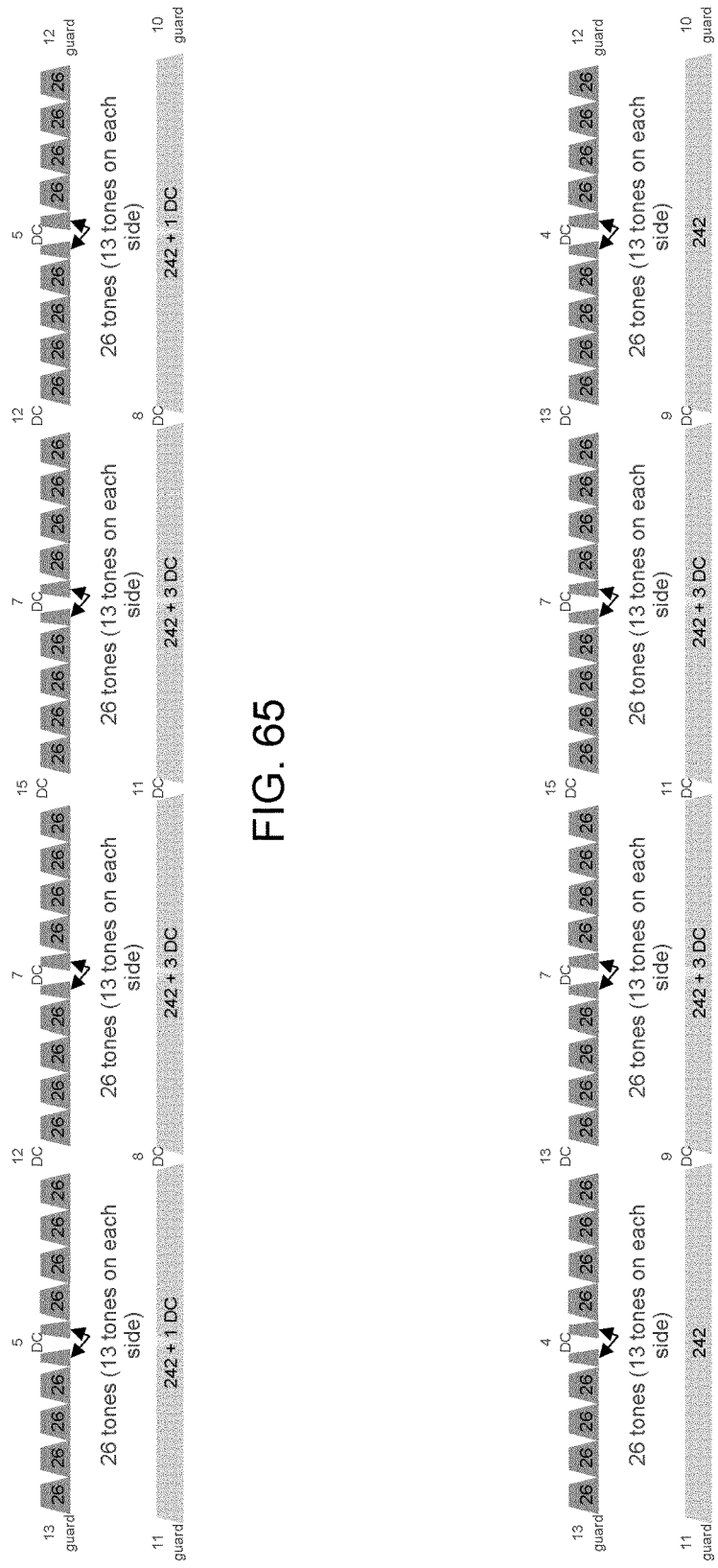
FIG. 65 is an illustration of an 80 MHz transmission with additional guard tones, using 26-tone and 242-tone resource units.
FIG. 66 is an illustration of an 80 MHz transmission with additional guard tones, using 26-tone and 242-tone resource units.

FIG. 65 is an illustration of an 80 MHz transmission with additional guard tones, using 26-tone and 242-tone resource units. Each 26-tone resource unit may include 24 data tones and 2 pilot tones. Each 242-tone resource unit may include 234 data tones and 8 pilot tones. As illustrated, when using 26-tone resource units, the transmission may include 25 guard tones (13 on the left, 12 on the right), 15 DC tones, 12 DC tones near the center of each 40 MHz portion, 7 DC tones in the center of the two central 20 MHz portions of the transmission, and 5 DC tones in the center of the two outer 20 MHz portions of the transmission. Each 20 MHz portion may include one resource unit including tones on both sides of the DC tones of that 20 MHz portion. As illustrated, the resource unit which includes 13 tones on each side of the DC tones may include tones located adjacent to the DC tones of that 20 MHz portion.

When four 242-tone resource units are used, the 80 MHz transmission may include 21 guard tones (11 on the left, 10 on the right), 11 DC tones, 8 DC tones near the center of each 40 MHz portion, 3 DC tones at the center of the two central 20 MHz portions, and 1 DC tone at the center of the two outer 20 MHz portions.

FIG. 66 is an illustration of an 80 MHz transmission with additional guard tones, using 26-tone and 242-tone resource units. Each 26-tone resource unit may include 24 data tones and 2 pilot tones. Each 242-tone resource unit may include 234 data tones and 8 pilot tones. As illustrated, when using 26-tone resource units, the transmission may include 25 guard tones (13 on the left, 12 on the right), 15 DC tones, 13 DC tones near the center of each 40 MHz portion, 7 DC tones in the center of the two central 20 MHz portions of the transmission, and 4 DC tones in the center of the two outer 20 MHz portions of the transmission. Each 20 MHz portion may include one resource unit including tones on both sides of the DC tones of that 20 MHz portion. As illustrated, the resource unit which includes 13 tones on each side of the DC tones may include tones located adjacent to the DC tones of that 20 MHz portion.

When four 242-tone resource units are used, the 80 MHz transmission may include 21 guard tones (11 on the left, 10 on the right), 11 DC tones, 9 DC tones near the center of each 40 MHz portion, 3 DC tones at the center of the two central 20 MHz portions, and no DC tones at the center of the two outer 20 MHz portions.

Figure 67:
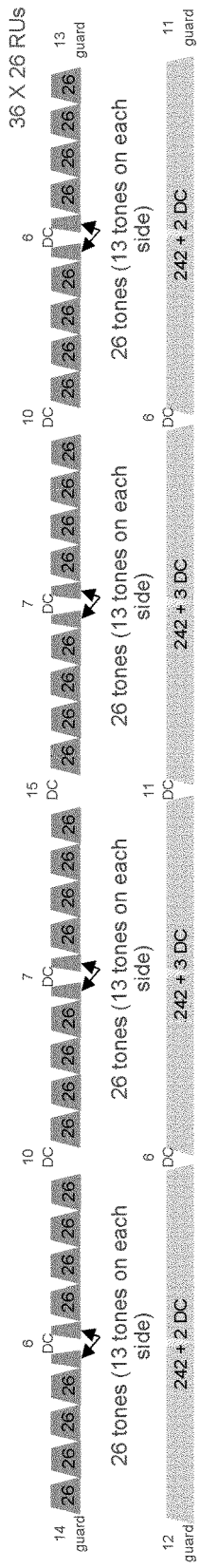
FIG. 67 is an illustration of an 80 MHz transmission with additional guard tones, using 26-tone and 242-tone resource units.

FIG. 67 is an illustration of an 80 MHz transmission with additional guard tones, using 26-tone and 242-tone resource units. Each 26-tone resource unit may include 24 data tones and 2 pilot tones. Each 242-tone resource unit may include 234 data tones and 8 pilot tones. As illustrated, when using 26-tone resource units, the transmission may include 27 guard tones (14 on the left, 13 on the right), 15 DC tones, 10 DC tones near the center of each 40 MHz portion, 7 DC tones in the center of the two central 20 MHz portions of the transmission, and 6 DC tones in the center of the two outer 20 MHz portions of the transmission. Each 20 MHz portion may include one resource unit including tones on both sides of the DC tones of that 20 MHz portion. As illustrated, the resource unit which includes 13 tones on each side of the DC tones may include tones located adjacent to the DC tones of that 20 MHz portion.

When four 242-tone resource units are used, the 80 MHz transmission may include 23 guard tones (12 on the left, 11 on the right), 11 DC tones, 6 DC tones near the center of each 40 MHz portion, 3 DC tones at the center of the two central 20 MHz portions, and 2 DC tones at the center of the two outer 20 MHz portions.

Figure 68:
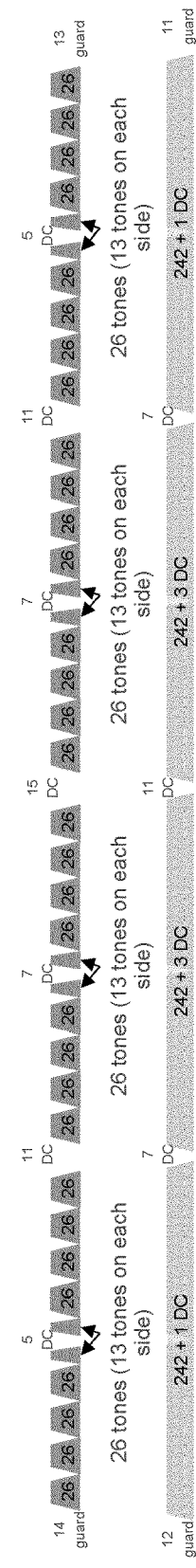
FIG. 68 is an illustration of an 80 MHz transmission with additional guard tones, using 26-tone and 242-tone resource units.

FIG. 68 is an illustration of an 80 MHz transmission with additional guard tones, using 26-tone and 242-tone resource units. Each 26-tone resource unit may include 24 data tones and 2 pilot tones. Each 242-tone resource unit may include 234 data tones and 8 pilot tones. As illustrated, when using 26-tone resource units, the transmission may include 27 guard tones (14 on the left, 13 on the right), 15 DC tones, 11 DC tones near the center of each 40 MHz portion, 7 DC tones in the center of the two central 20 MHz portions of the transmission, and 5 DC tones in the center of the two outer 20 MHz portions of the transmission. Each 20 MHz portion may include one resource unit including tones on both sides of the DC tones of that 20 MHz portion. As illustrated, the resource unit which includes 13 tones on each side of the DC tones may include tones located adjacent to the DC tones of that 20 MHz portion.

When four 242-tone resource units are used, the 80 MHz transmission may include 23 guard tones (12 on the left, 11 on the right), 11 DC tones, 7 DC tones near the center of each 40 MHz portion, 3 DC tones at the center of the two central 20 MHz portions, and 1 DC tone at the center of the two outer 20 MHz portions.

Figure 69:
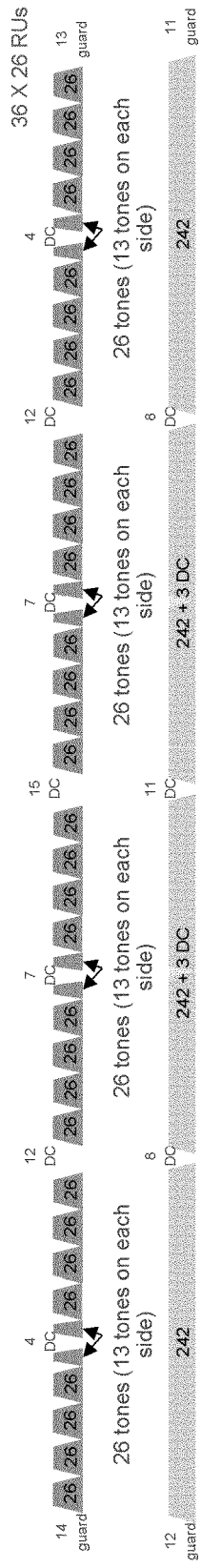
FIG. 69 is an illustration of an 80 MHz transmission with additional guard tones, using 26-tone and 242-tone resource units.

FIG. 69 is an illustration of an 80 MHz transmission with additional guard tones, using 26-tone and 242-tone resource units. Each 26-tone resource unit may include 24 data tones and 2 pilot tones. Each 242-tone resource unit may include 234 data tones and 8 pilot tones. As illustrated, when using 26-tone resource units, the transmission may include 27 guard tones (14 on the left, 13 on the right), 15 DC tones, 12 DC tones near the center of each 40 MHz portion, 7 DC tones in the center of the two central 20 MHz portions of the transmission, and 4 DC tones in the center of the two outer 20 MHz portions of the transmission. Each 20 MHz portion may include one resource unit including tones on both sides of the DC tones of that 20 MHz portion. As illustrated, the resource unit which includes 13 tones on each side of the DC tones may include tones located adjacent to the DC tones of that 20 MHz portion.

When four 242-tone resource units are used, the 80 MHz transmission may include 23 guard tones (12 on the left, 11 on the right), 11 DC tones, 8 DC tones near the center of each 40 MHz portion, 3 DC tones at the center of the two central 20 MHz portions, and no DC tones at the center of the two outer 20 MHz portions.

Figure 70:
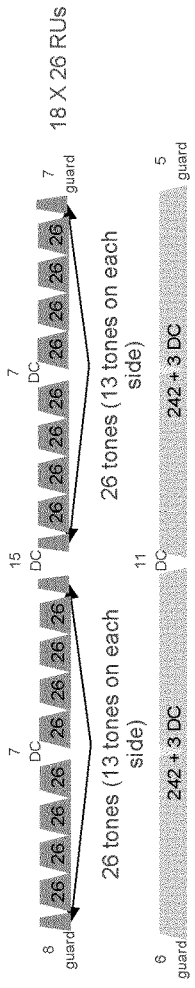
FIG. 70 is an illustration of a 20 MHz transmission using 26-tone and 242-tone resource units.
Figure 71:
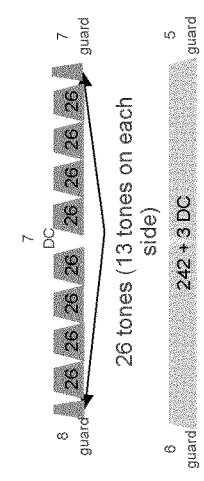
FIG. 71 is an illustration of a 40 MHz transmission which uses the same placement of the split 26-tone resource unit tones.

FIG. 70 is an illustration of a 20 MHz transmission using 26-tone and 242-tone resource units. In this illustration, it may be observed that there are 7 DC tones and 15 guard tones when using 26-tone resource units. Here, there are 9 resource units, and the ninth resource unit includes 13 tones on each side of the DC tones. These tones are placed on the furthest outside portion of the 20 MHz transmission, near the edge of the 20 MHz, adjacent to the guard tones. This transmission may also use a 242-tone resource unit instead, in which case, the transmission includes 3 DC tones and 11 guard tones. Similarly, FIG. 71 is an illustration of a 40 MHz transmission which uses the same placement of the split 26-tone resource unit tones. Here, the tones from each of the two resource units which include 13 tones on each side of the 20 MHz DC tones are placed on the furthest outside edges of the 20 MHz portions.

Figure 72:
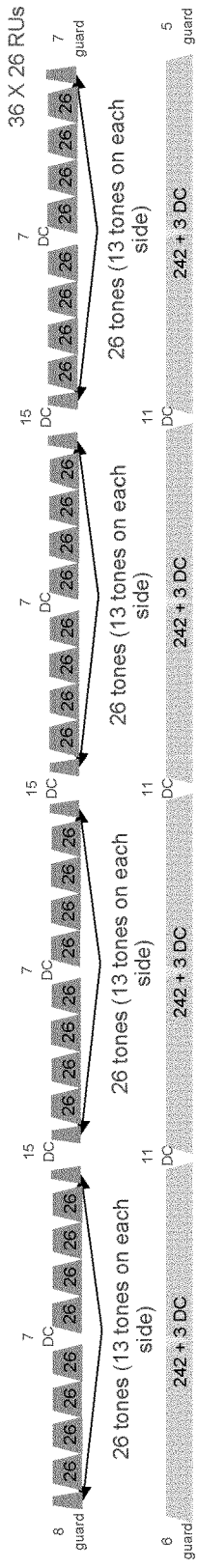
FIG. 72 is an illustration of an 80 MHz transmission, using 26-tone and 242-tone resource units.

FIG. 72 is an illustration of an 80 MHz transmission, using 26-tone and 242-tone resource units. Each 26-tone resource unit may include 24 data tones and 2 pilot tones. Each 242-tone resource unit may include 234 data tones and 8 pilot tones. As illustrated, when using 26-tone resource units, the transmission may include 15 guard tones (8 on the left, 7 on the right), 15 DC tones, 15 DC tones near the center of each 40 MHz portion, 7 DC tones in the center of the two central 20 MHz portions of the transmission, and 7 DC tones in the center of the two outer 20 MHz portions of the transmission. Each 20 MHz portion may include one resource unit including tones on both sides of the DC tones of that 20 MHz portion. As illustrated, the resource unit which includes 13 tones on each side of the DC tones may include tones located on the far edges of the 20 MHz portion, adjacent to the edge of the 20 MHz portion and the DC or guard tones at the edge.

When four 242-tone resource units are used, the 80 MHz transmission may include 11 guard tones (6 on the left, 5 on the right), 11 DC tones, 11 DC tones near the center of each 40 MHz portion, 3 DC tones at the center of the two central 20 MHz portions, and 3 DC tones at the center of the two outer 20 MHz portions.

These tone plans may be adjusted in order to accommodate additional guard tones in an 80 MHz transmission, in order to aid with spectral mask compliance.

Figure 73:
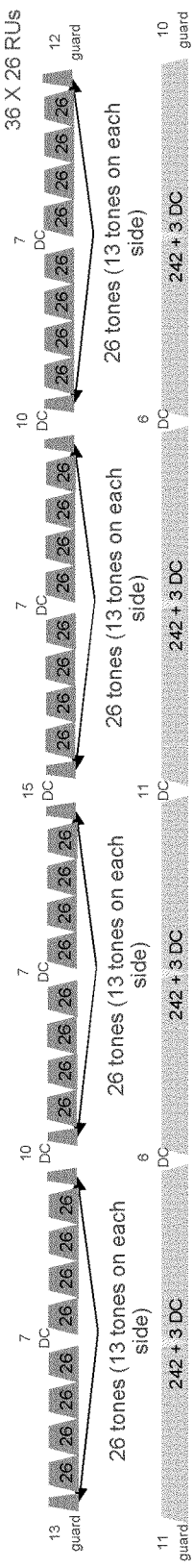
FIG. 73 is an illustration of an 80 MHz transmission with additional guard tones, using 26-tone and 242-tone resource units.

FIG. 73 is an illustration of an 80 MHz transmission with additional guard tones, using 26-tone and 242-tone resource units. Each 26-tone resource unit may include 24 data tones and 2 pilot tones. Each 242-tone resource unit may include 234 data tones and 8 pilot tones. As illustrated, when using 26-tone resource units, the transmission may include 25 guard tones (13 on the left, 12 on the right), 15 DC tones, 10 DC tones near the center of each 40 MHz portion, 7 DC tones in the center of the two central 20 MHz portions of the transmission, and 7 DC tones in the center of the two outer 20 MHz portions of the transmission. Each 20 MHz portion may include one resource unit including tones on both sides of the DC tones of that 20 MHz portion. As illustrated, the resource unit which includes 13 tones on each side of the DC tones may include tones located on the far edges of the 20 MHz portion, adjacent to the edge of the 20 MHz portion and the DC or guard tones at the edge.

When four 242-tone resource units are used, the 80 MHz transmission may include 21 guard tones (11 on the left, 10 on the right), 11 DC tones, 6 DC tones near the center of each 40 MHz portion, 3 DC tones at the center of the two central 20 MHz portions, and 3 DC tones at the center of the two outer 20 MHz portions.

Figure 74:
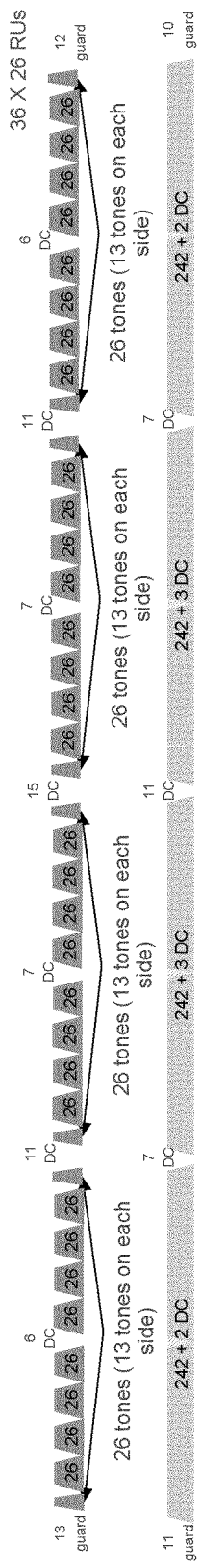
FIG. 74 is an illustration of an 80 MHz transmission with additional guard tones, using 26-tone and 242-tone resource units.

FIG. 74 is an illustration of an 80 MHz transmission with additional guard tones, using 26-tone and 242-tone resource units. Each 26-tone resource unit may include 24 data tones and 2 pilot tones. Each 242-tone resource unit may include 234 data tones and 8 pilot tones. As illustrated, when using 26-tone resource units, the transmission may include 25 guard tones (13 on the left, 12 on the right), 15 DC tones, 11 DC tones near the center of each 40 MHz portion, 7 DC tones in the center of the two central 20 MHz portions of the transmission, and 6 DC tones in the center of the two outer 20 MHz portions of the transmission. Each 20 MHz portion may include one resource unit including tones on both sides of the DC tones of that 20 MHz portion. As illustrated, the resource unit which includes 13 tones on each side of the DC tones may include tones located on the far edges of the 20 MHz portion, adjacent to the edge of the 20 MHz portion and the DC or guard tones at the edge.

When four 242-tone resource units are used, the 80 MHz transmission may include 21 guard tones (11 on the left, 10 on the right), 11 DC tones, 7 DC tones near the center of each 40 MHz portion, 3 DC tones at the center of the two central 20 MHz portions, and 2 DC tones at the center of the two outer 20 MHz portions.

Figure 75:
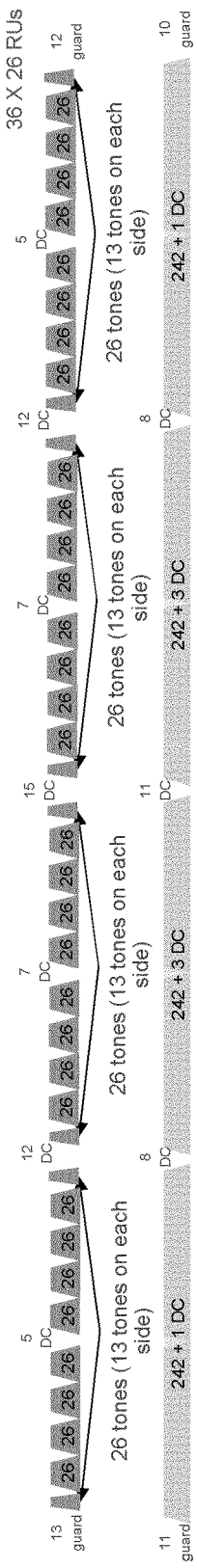
FIG. 75 is an illustration of an 80 MHz transmission with additional guard tones, using 26-tone and 242-tone resource units.

FIG. 75 is an illustration of an 80 MHz transmission with additional guard tones, using 26-tone and 242-tone resource units. Each 26-tone resource unit may include 24 data tones and 2 pilot tones. Each 242-tone resource unit may include 234 data tones and 8 pilot tones. As illustrated, when using 26-tone resource units, the transmission may include 25 guard tones (13 on the left, 12 on the right), 15 DC tones, 12 DC tones near the center of each 40 MHz portion, 7 DC tones in the center of the two central 20 MHz portions of the transmission, and 5 DC tones in the center of the two outer 20 MHz portions of the transmission. Each 20 MHz portion may include one resource unit including tones on both sides of the DC tones of that 20 MHz portion. As illustrated, the resource unit which includes 13 tones on each side of the DC tones may include tones located on the far edges of the 20 MHz portion, adjacent to the edge of the 20 MHz portion and the DC or guard tones at the edge.

When four 242-tone resource units are used, the 80 MHz transmission may include 21 guard tones (11 on the left, 10 on the right), 11 DC tones, 8 DC tones near the center of each 40 MHz portion, 3 DC tones at the center of the two central 20 MHz portions, and 1 DC tone at the center of the two outer 20 MHz portions.

Figure 76:
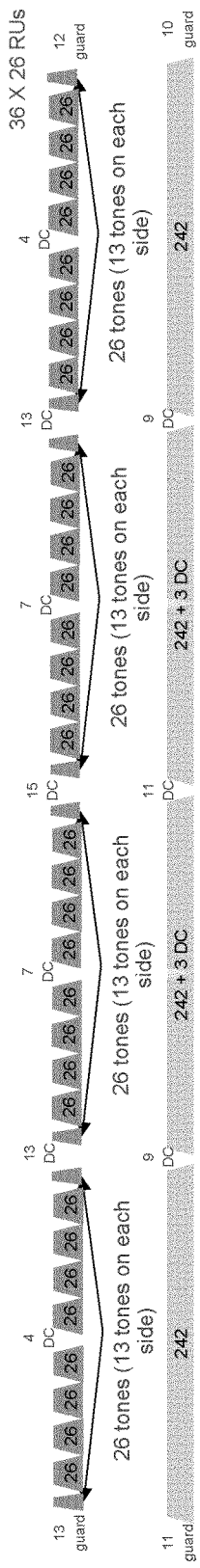
FIG. 76 is an illustration of an 80 MHz transmission with additional guard tones, using 26-tone and 242-tone resource units.

FIG. 76 is an illustration of an 80 MHz transmission with additional guard tones, using 26-tone and 242-tone resource units. Each 26-tone resource unit may include 24 data tones and 2 pilot tones. Each 242-tone resource unit may include 234 data tones and 8 pilot tones. As illustrated, when using 26-tone resource units, the transmission may include 25 guard tones (13 on the left, 12 on the right), 15 DC tones, 13 DC tones near the center of each 40 MHz portion, 7 DC tones in the center of the two central 20 MHz portions of the transmission, and 4 DC tones in the center of the two outer 20 MHz portions of the transmission. Each 20 MHz portion may include one resource unit including tones on both sides of the DC tones of that 20 MHz portion. As illustrated, the resource unit which includes 13 tones on each side of the DC tones may include tones located on the far edges of the 20 MHz portion, adjacent to the edge of the 20 MHz portion and the DC or guard tones at the edge.

When four 242-tone resource units are used, the 80 MHz transmission may include 21 guard tones (11 on the left, 10 on the right), 11 DC tones, 9 DC tones near the center of each 40 MHz portion, 3 DC tones at the center of the two central 20 MHz portions, and no DC tones at the center of the two outer 20 MHz portions.

Figure 77:
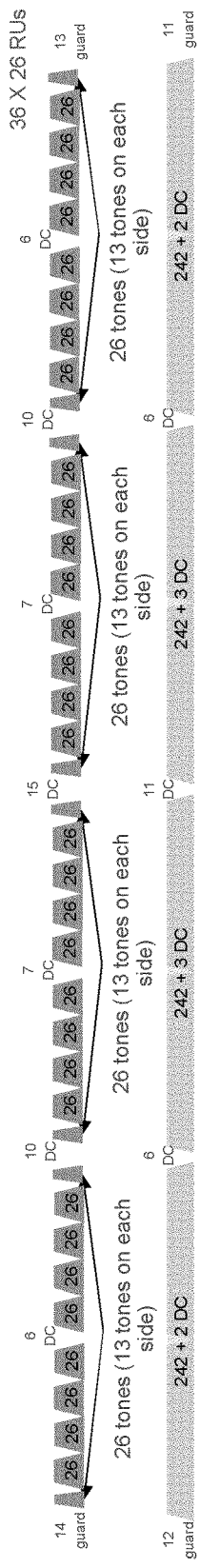
FIG. 77 is an illustration of an 80 MHz transmission with additional guard tones, using 26-tone and 242-tone resource units.

FIG. 77 is an illustration of an 80 MHz transmission with additional guard tones, using 26-tone and 242-tone resource units. Each 26-tone resource unit may include 24 data tones and 2 pilot tones. Each 242-tone resource unit may include 234 data tones and 8 pilot tones. As illustrated, when using 26-tone resource units, the transmission may include 27 guard tones (14 on the left, 13 on the right), 15 DC tones, 10 DC tones near the center of each 40 MHz portion, 7 DC tones in the center of the two central 20 MHz portions of the transmission, and 6 DC tones in the center of the two outer 20 MHz portions of the transmission. Each 20 MHz portion may include one resource unit including tones on both sides of the DC tones of that 20 MHz portion. As illustrated, the resource unit which includes 13 tones on each side of the DC tones may include tones located on the far edges of the 20 MHz portion, adjacent to the edge of the 20 MHz portion and the DC or guard tones at the edge.

When four 242-tone resource units are used, the 80 MHz transmission may include 23 guard tones (12 on the left, 11 on the right), 11 DC tones, 6 DC tones near the center of each 40 MHz portion, 3 DC tones at the center of the two central 20 MHz portions, and 2 DC tones at the center of the two outer 20 MHz portions.

Figure 78:
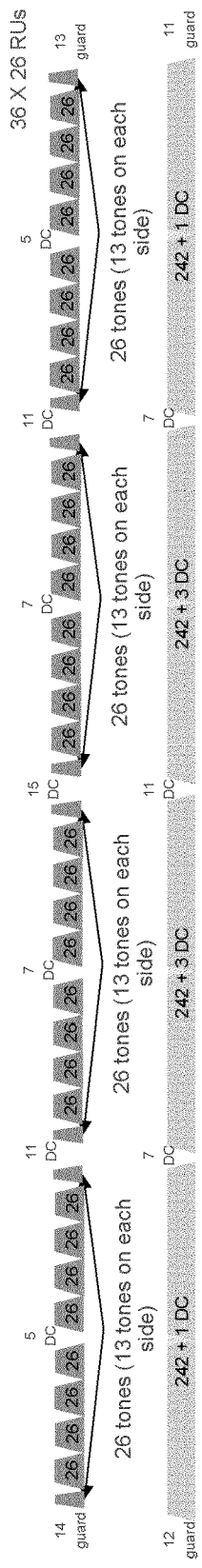
FIG. 78 is an illustration of an 80 MHz transmission with additional guard tones, using 26-tone and 242-tone resource units.

FIG. 78 is an illustration of an 80 MHz transmission with additional guard tones, using 26-tone and 242-tone resource units. Each 26-tone resource unit may include 24 data tones and 2 pilot tones. Each 242-tone resource unit may include 234 data tones and 8 pilot tones. As illustrated, when using 26-tone resource units, the transmission may include 27 guard tones (14 on the left, 13 on the right), 15 DC tones, 11 DC tones near the center of each 40 MHz portion, 7 DC tones in the center of the two central 20 MHz portions of the transmission, and 5 DC tones in the center of the two outer 20 MHz portions of the transmission. Each 20 MHz portion may include one resource unit including tones on both sides of the DC tones of that 20 MHz portion. As illustrated, the resource unit which includes 13 tones on each side of the DC tones may include tones located on the far edges of the 20 MHz portion, adjacent to the edge of the 20 MHz portion and the DC or guard tones at the edge.

When four 242-tone resource units are used, the 80 MHz transmission may include 23 guard tones (12 on the left, 11 on the right), 11 DC tones, 7 DC tones near the center of each 40 MHz portion, 3 DC tones at the center of the two central 20 MHz portions, and 1 DC tone at the center of the two outer 20 MHz portions.

Figure 79:
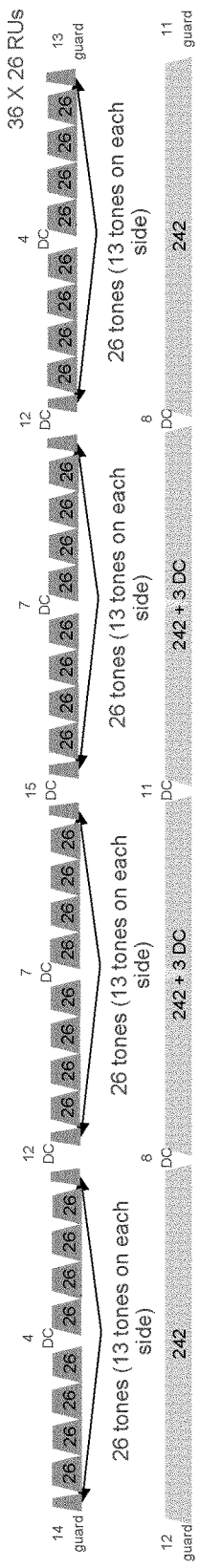
FIG. 79 is an illustration of an 80 MHz transmission with additional guard tones, using 26-tone and 242-tone resource units.

FIG. 79 is an illustration of an 80 MHz transmission with additional guard tones, using 26-tone and 242-tone resource units. Each 26-tone resource unit may include 24 data tones and 2 pilot tones. Each 242-tone resource unit may include 234 data tones and 8 pilot tones. As illustrated, when using 26-tone resource units, the transmission may include 27 guard tones (14 on the left, 13 on the right), 15 DC tones, 12 DC tones near the center of each 40 MHz portion, 7 DC tones in the center of the two central 20 MHz portions of the transmission, and 4 DC tones in the center of the two outer 20 MHz portions of the transmission. Each 20 MHz portion may include one resource unit including tones on both sides of the DC tones of that 20 MHz portion. As illustrated, the resource unit which includes 13 tones on each side of the DC tones may include tones located on the far edges of the 20 MHz portion, adjacent to the edge of the 20 MHz portion and the DC or guard tones at the edge.

When four 242-tone resource units are used, the 80 MHz transmission may include 23 guard tones (12 on the left, 11 on the right), 11 DC tones, 8 DC tones near the center of each 40 MHz portion, 3 DC tones at the center of the two central 20 MHz portions, and no DC tones at the center of the two outer 20 MHz portions.

In some aspects, when using 26-tone resource units and 242-tone resource units, the allocations which may be allocated to a device include one 26-tone unit, two 26 tone units, four 26-tone units, one 242 tone unit, two 242 tone units, three 242 tone units, and four 242 tone units.

When a device is allocated one 26-tone unit, this may include 24 data tones and 2 pilot tones. Interleaving in this case can use the existing 24-tone interleaver which is used in IEEE 802.11ah-compliant transmissions.

For an allocation of two 26-tone units, this may include 48 data tones and 4 pilot tones. When transmitting 48 data tones, the existing 48-tone interleaver may be used, as used in IEEE 802.11a. Here, Ncol may be 16, with Nrot one of [1:24], and LDPC tone mapping distance (Dtm) can be chosen from {2,3,4,6,8,12,16,24}. These settings may be the same as interleaver parameters when Ndata is 52.

For an allocation of four 26-tone units, there may be three options for interleaving. In a first option, interleaving may be done with two steps. First, frequency segment parsing over 4 blocks, then 24 tone (assuming 26 tones includes 2 pilot tones and 24 data tones) interleaving in each block. A second option include interleaving with two steps: First, frequency segment parsing over two blocks, then 48-tone interleaving with each 2×26 tone block. This may use an LDPC tone mapping distance chosen from {2,3,4,6,8,12,16, 24}.

A third option may use 104 tones, with one of 96, 98, or 100 data tones and one of 8, 6, or 4 pilot tones. Truncated interleaving may be done with the existing 108-tone interleaver (which has Ncol=18, Nrot=29 for Ncc<=4 and 13 for Nss>4), where when reading in column, the grid with no bits written in is skipped, since we have only 96/98/100 data tones rather than 108.

For allocations of 242-tones or more, interleaving may be done in two steps: First, frequency segment parsing, and then 234-tone (with 234 data tones and 8 pilot tones in each 242 tone unit) interleaving within each 242-tone resource unit. Here, the LDPC tone mapping distance (Dtm) may be chosen from {2,3,6,9,13,18,26,39,78,117}.

Figure 80:
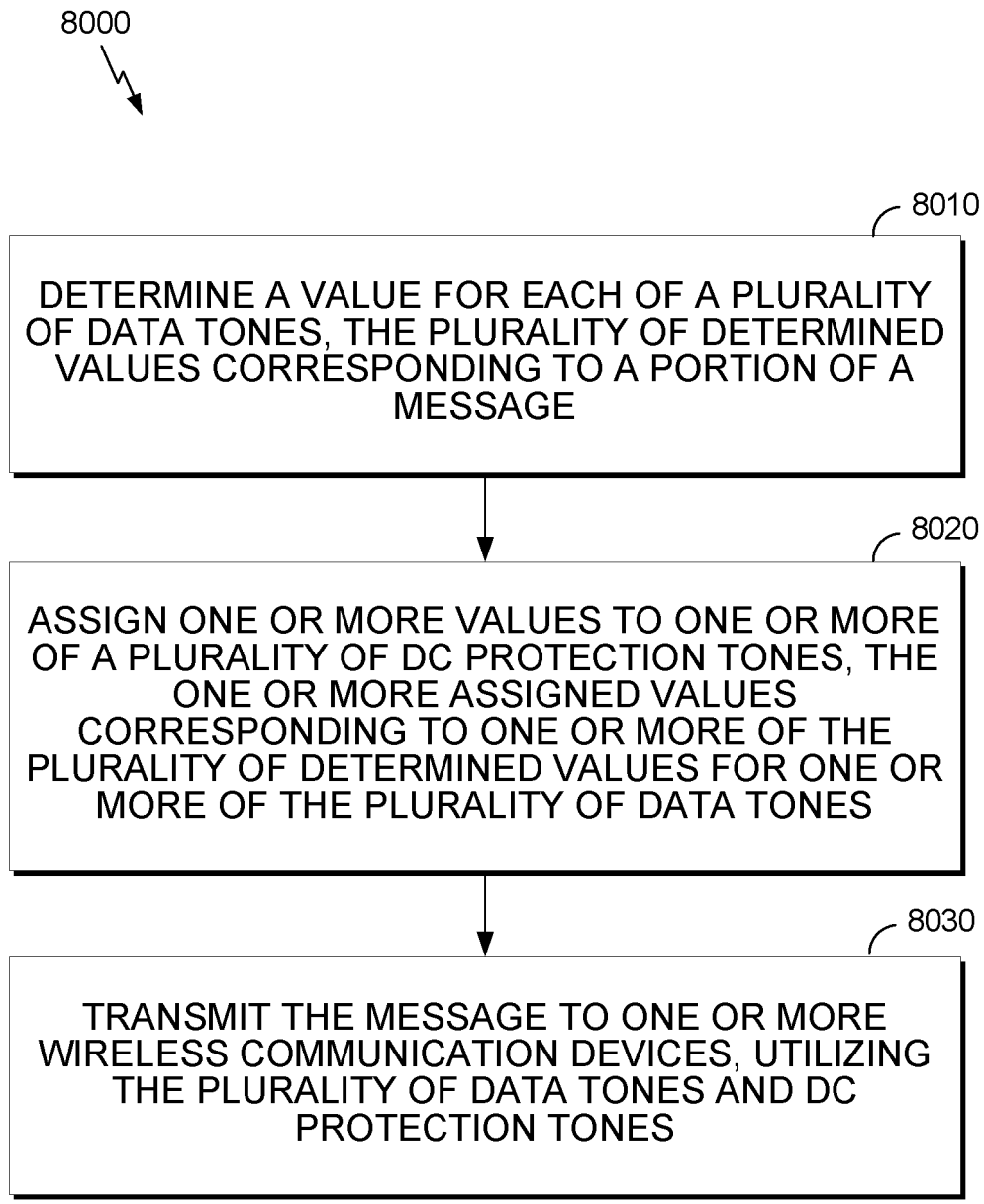
FIG. 80 shows a flowchart for an exemplary method of communicating over a wireless communication network.

FIG. 80 shows a flowchart for an exemplary method 8000 of communicating over a wireless communication network. The method 8000 may be performed by an AP or a STA, such as AP 104 or one or more of the STAs 106 of FIG. 1. The method 8000 may be used to transmit data packets to or from the AP 104 or STAs 106 utilizing a varying number of DC protection tones and/or data tones. In some aspects, the method 8000 may allow the STAs 106 to transmit or receive an uplink or a downlink OFDMA transmission.

At block 8010, the AP 104, for example, determines a value for each of a plurality of data tones, the plurality of determined values corresponding to a portion of a message. In some aspects, the plurality of DC protection tones comprise a tone indexed as {0}, and each of the plurality of data tones and DC protection tones comprise a tone index relative to the tone indexed as {0}.

At block 8020, the AP 104, for example, assigns one or more values to one or more of a plurality of DC protection tones, the one or more assigned values corresponding to one or more of the plurality of determined values for one or more of the plurality of data tones. In some aspects, the one or more assigned values corresponds to a value of a data tone of the plurality of data tones located on an opposite side of the tone indexed as {0}. In various aspects, the one or more assigned values corresponds to a value of a data tone of the plurality of data tones located proximate to the plurality of DC protection tones. In some aspects, the one or more of the plurality of DC protection tones assigned with the one or more values are encoded at a lower rate than the plurality of data tones. In some embodiments, the one or more of the plurality of DC protection tones assigned with the one or more values and the one or more of the plurality of data tones corresponding to the assigned one or more values are encoded at a lower rate than the plurality of data tones not including the one or more of the plurality of data tones corresponding to the assigned one or more values.

In an embodiment, the plurality of DC protection tones includes five DC protection tones indexed as {−2, −1, 0, 1, 2}, the plurality of data tones comprise data tones indexed as {−3, 3}, the DC protection tone indexed as {−2} comprises a value of the data tone indexed as {3}, and the DC protection tone indexed as {2} comprises a value of the data tone indexed as {−3}. In another embodiment, the plurality of DC protection tones includes five DC protection tones indexed as {−2, −1, 0, 1, 2}, the plurality of data tones comprise data tones indexed as {−3, 3}, the DC protection tone indexed as {−1} comprises a value of the data tone indexed as {4}, the DC protection tone indexed as {−2} comprises a value of the data tone indexed as {3}, the DC protection tone indexed as {1} comprises a value of the data tone indexed as {−4}, and the DC protection tone indexed as {2} comprises a value of the data tone indexed as {−3}. In another embodiment, the plurality of DC protection tones includes three DC protection tones indexed as {−1, 0, 1}, the plurality of data tones comprise data tones indexed as {−2, 2}, the DC protection tone indexed as {−1} comprises a value of the data tone indexed as {2}, and the DC protection tone indexed as {1} comprises a value of the data tone indexed as {−2}.

At block 8030, the AP 104, for example, transmits the message to one or more wireless communication devices, utilizing the plurality of data tones and DC protection tones. As a non-limiting example of a benefit of utilizing the method 8000, an AP 104 may be able to transmit more data tones by utilizing less DC protection tones.

Figure 81:
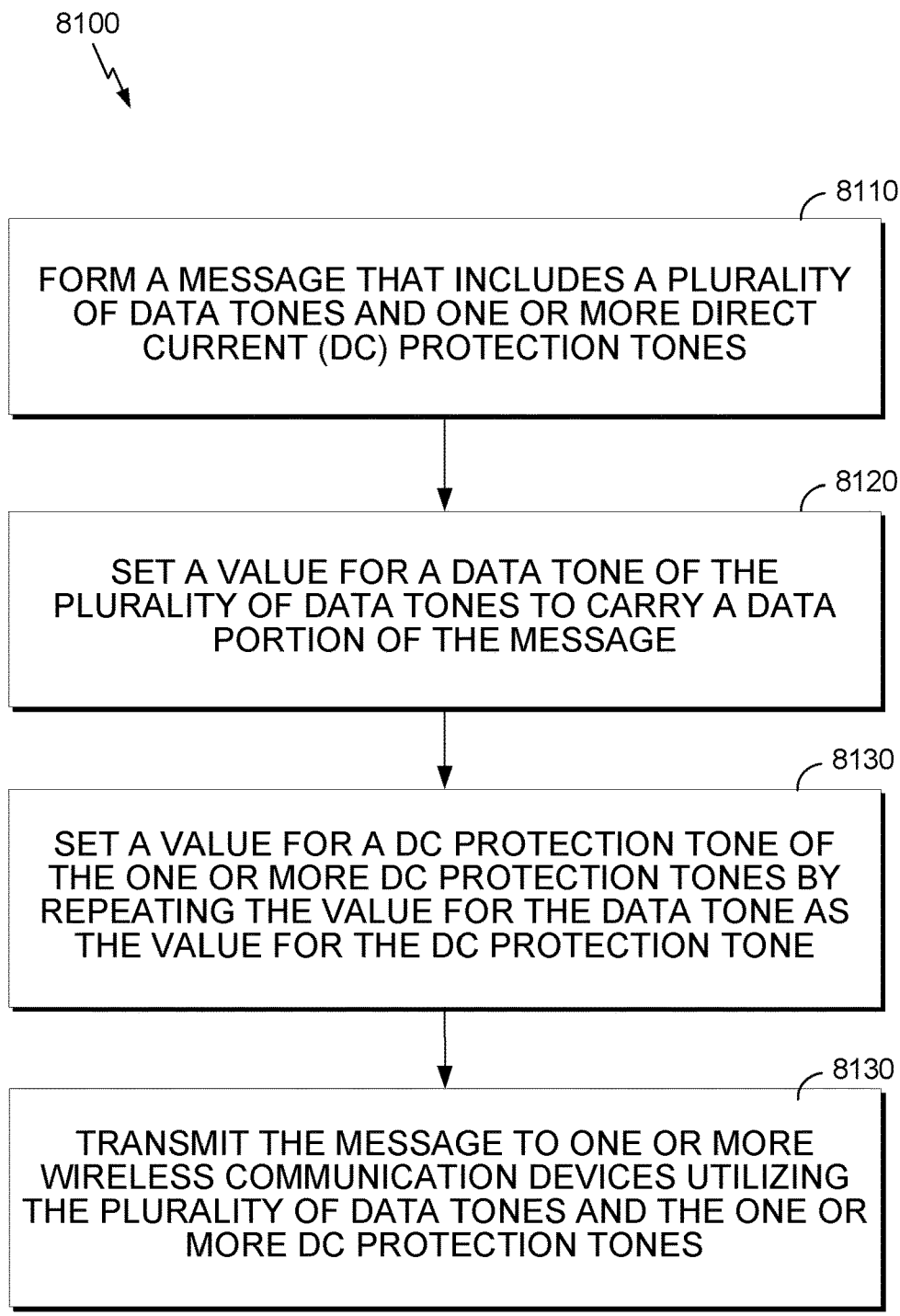
FIG. 81 shows a flowchart for another exemplary method of communicating over a wireless communication network.

FIG. 81 shows a flowchart for another exemplary method 8100 of communicating over a wireless communication network. The method 8100 may be performed by an AP or a STA, such as AP 104 or one or more of the STAs 106 of FIG. 1. The method 8100 may be used to transmit data packets to or from the AP 104 or STAs 106 utilizing a varying number of DC protection tones and/or data tones. In some aspects, the method 8100 may allow the STAs 106 to transmit or receive an uplink or a downlink OFDMA transmission.

At block 8110, the AP 104, for example, forms a message that includes a plurality of data tones and one or more direct current (DC) protection tones. In some aspects, the one or more DC protection tones comprise a tone indexed as {0}, and each of the plurality of data tones and the one or more DC protection tones comprise a tone index relative to the tone indexed as {0}.

At block 8120, the AP 104, for example, sets a value for a data tone of the plurality of data tones to carry a data portion of the message. The means for setting a value for a data tone may comprise the processor 204 of FIG. 2.

At block 8130, the AP 104, for example, sets a value for a DC protection tone of the one or more DC protection tones by repeating the value for the data tone as the value for the DC protection tone. In some aspects, the one or more DC protection tones comprise at least one DC tone that does not carry any data of the message and the DC protection tone that carries data repeated from the data tone. In various aspects, the data tone is located proximate to the one or more DC protection tones and on an opposite side of the tone indexed as {0} from the DC protection tone that carries the repeated data from the data tone. In some aspects, at least the DC protection tone that carries data repeated from the data tone is encoded at a lower rate than the plurality of data tones. In some aspects, at least the data tone and the DC protection tone that carries data repeated from the data tone are encoded at a lower rate than the plurality of data tones not including the data tone.

In an embodiment, the one or more DC protection tones includes five DC protection tones indexed as {−2, −1, 0, 1, 2}, the plurality of data tones comprise data tones indexed as {−3, 3}, the DC protection tone indexed as {−2} comprises a value repeated from the data tone indexed as {3}, and the DC protection tone indexed as {2} comprises a value repeated from the data tone indexed as {−3}. In another embodiment, the one or more DC protection tones includes five DC protection tones indexed as {−2, −1, 0, 1, 2}, the plurality of data tones comprise data tones indexed as {−3, 3}, the DC protection tone indexed as {−1} comprises a value repeated from the data tone indexed as {4}, the DC protection tone indexed as {−2} comprises a value repeated from the data tone indexed as {3}, the DC protection tone indexed as {1} comprises a value repeated from the data tone indexed as {−4}, and the DC protection tone indexed as {2} comprises a value repeated from the data tone indexed as {−3}. In another embodiment, the one or more DC protection tones includes three DC protection tones indexed as {−1, 0, 1}, the plurality of data tones comprise data tones indexed as {−2, 2}, the DC protection tone indexed as {−1} comprises a value repeated from the data tone indexed as {2}, and the DC protection tone indexed as {1} comprises a value repeated from the data tone indexed as {−2}.

At block 8140, the AP 104, for example, transmits the message to one or more wireless communication devices utilizing the plurality of data tones and the one or more DC protection tones. As a non-limiting example of a benefit of utilizing the method 8100, an AP 104 may be able to transmit more data tones by utilizing less DC protection tones.

Implementing Technology

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can comprise non-transitory computer readable medium (e.g., tangible media). In addition, in some aspects computer readable medium can comprise transitory computer readable medium (e.g., a signal). Combinations of the above should also be included within the scope of computer-readable media.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. A method of communicating over a wireless communication network comprising:
   forming a message from a plurality of tones, the plurality of tones including data tones and one or more DC protection tones, the DC protection tones comprise five DC protection tones indexed as {−2, −1, 0, 1, 2}, the plurality of data tones comprise data tones indexed as {−3, 3};
   setting a value for a data tone of the plurality of data tones to carry a data portion of the message;
   setting a value for a DC protection tone of the one or more DC protection tones by repeating the value for the data tone as the value for the DC protection tone, wherein the DC protection tone indexed as {−2} comprises a value repeated from the data tone indexed as {3}, and wherein the DC protection tone indexed as {2} comprises a value repeated from the data tone indexed as {−3}; and
   transmitting the message to one or more wireless communication devices utilizing the plurality of data tones and the one or more DC protection tones.

2. The method of claim 1, wherein the one or more DC protection tones comprise at least one DC tone that does not carry any data of the message and the DC protection tone that carries data repeated from the data tone.

3. The method of claim 1, wherein at least the DC protection tone that carries data repeated from the data tone is encoded at a lower rate than the plurality of data tones.

4. The method of claim 1, wherein at least the data tone and the DC protection tone that carries data repeated from the data tone are encoded at a lower rate than the plurality of data tones not including the data tone.

5. An apparatus for communicating over a wireless communication network comprising:
   a processor configured to:
      form a message from a plurality of tones, the plurality of tones including data tones and one or more DC protection tones, the DC protection tones comprise five DC protection tones indexed as {−2, −1, 0, 1, 2}, the plurality of data tones comprise data tones indexed as {−3, 3};

set a value for a data tone of the plurality of data tones to carry a data portion of the message; and set a value for a DC protection tone of the one or more DC protection tones by repeating the value for the data tone as the value for the DC protection tone, wherein the DC protection tone indexed as {−2} comprises a value repeated from the data tone indexed as {3}, and wherein the DC protection tone indexed as {2} comprises a value repeated from the data tone indexed as {−3}; and a transmitter coupled with the processor and configured to transmit the message to one or more wireless communication devices utilizing the plurality of data tones and the one or more DC protection tones.

6. The apparatus of claim 5, wherein the one or more DC protection tones comprise at least one DC tone that does not carry any data of the message and the DC protection tone that carries data repeated from the data tone.

7. The apparatus of claim 5, wherein at least the DC protection tone that carries data repeated from the data tone is encoded at a lower rate than the plurality of data tones.

8. The apparatus of claim 5, wherein at least the data tone and the DC protection tone that carries data repeated from the data tone are encoded at a lower rate than the plurality of data tones not including the data tone.

9. An apparatus for communicating over a wireless communication network comprising:

means for forming a message from a plurality of tones, the plurality of tones including data tones and one or more DC protection tones, the DC protection tones comprise five DC protection tones indexed as {−2, −1, 0, 1, 2}, the plurality of data tones comprise data tones indexed as {−3, 3};

means for setting a value for a data tone of the plurality of data tones and to carry a data portion of the message;

means for setting a value for a DC protection tone of the one or more DC protection tones by repeating the value for the data tone as the value for the DC protection tone, wherein the DC protection tone indexed as {−2} comprises a value repeated from the data tone indexed as {3}, and wherein the DC protection tone indexed as {2} comprises a value repeated from the data tone indexed as {−3}; and means for transmitting the message to one or more wireless communication devices utilizing the plurality of data tones and the one or more DC protection tones.

10. The apparatus of claim 9, wherein the one or more DC protection tones comprise at least one DC tone that does not carry any data of the message and the DC protection tone that carries data repeated from the data tone.

11. The apparatus of claim 9, wherein at least the DC protection tone that carries data repeated from the data tone is encoded at a lower rate than the plurality of data tones.

12. The apparatus of claim 9, wherein at least the data tone and the DC protection tone that carries data repeated from the data tone are encoded at a lower rate than the plurality of data tones not including the data tone.

13. A non-transitory computer-readable medium comprising code that, when executed, performs a method communicating over a wireless communication network, the method comprising:

forming a message from a plurality of tones, the plurality of tones including data tones and one or more DC protection tones, the DC protection tones comprise five DC protection tones indexed as {−2, −1, 0, 1, 2}, the plurality of data tones comprise data tones indexed as {−3, 3};

setting a value for a data tone of the plurality of data tones to carry a data portion of the message;

setting a value for a DC protection tone of the one or more DC protection tones by repeating the value for the data tone as the value for the DC protection tone, wherein the DC protection tone indexed as {−2} comprises a value repeated from the data tone indexed as {3}, and wherein the DC protection tone indexed as {2} comprises a value repeated from the data tone indexed as {−3}; and transmitting the message to one or more wireless communication devices utilizing the plurality of data tones and the one or more DC protection tones.

14. The computer-readable medium of claim 13, wherein the one or more DC protection tones comprise at least one DC tone that does not carry any data of the message and the DC protection tone that carries data repeated from the data tone.

15. The computer-readable medium of claim 13, wherein at least the DC protection tone that carries data repeated from the data tone is encoded at a lower rate than the plurality of data tones.

16. The computer-readable medium of claim 13, wherein at least the data tone and the DC protection tone that carries data repeated from the data tone are encoded at a lower rate than the plurality of data tones not including the data tone.

17. A method of communicating over a wireless communication network comprising:

forming a message from a plurality of tones, the plurality of tones including data tones and one or more DC protection tones, the DC protection tones comprise five DC protection tones indexed as {−2, −1, 0, 1, 2}, the plurality of data tones comprise data tones indexed as {−3, 3};

setting a value for a data tone of the plurality of data tones to carry a data portion of the message;

setting a value for a DC protection tone of the one or more DC protection tones by repeating the value for the data tone as the value for the DC protection tone, wherein the DC protection tone indexed as {−1} comprises a value repeated from the data tone indexed as {4}, wherein the DC protection tone indexed as {−2} comprises a value repeated from the data tone indexed as {3}, wherein the DC protection tone indexed as {1} comprises a value repeated from the data tone indexed as {−4}, and wherein the DC protection tone indexed as {2} comprises a value repeated from the data tone indexed as {−3}; and transmitting the message to one or more wireless communication devices utilizing the plurality of data tones and the one or more DC protection tones.

18. A method of communicating over a wireless communication network comprising:

forming a message from a plurality of tones, the plurality of tones including data tones and one or more DC protection tones, the DC protection tones comprise three DC protection tones indexed as {−1, 0, 1}, the plurality of data tones comprise data tones indexed as {−2, 2};

setting a value for a data tone of the plurality of data tones to carry a data portion of the message;

setting a value for a DC protection tone of the one or more DC protection tones by repeating the value for the data tone as the value for the DC protection tone, wherein the DC protection tone indexed as {−1} comprises a value repeated from the data tone indexed as {2}, and wherein the DC protection tone indexed as {1} comprises a value repeated from the data tone indexed as {−2}; and transmitting the message to one or more wireless communication devices utilizing the plurality of data tones and the one or more DC protection tones.

19. An apparatus for communicating over a wireless communication network comprising:
a processor configured to:
form a message from a plurality of tones, the plurality of tones including data tones and one or more DC protection tones, the DC protection tones comprise five DC protection tones indexed as {−2, −1, 0, 1, 2}, the plurality of data tones comprise data tones indexed as {−3, 3};
set a value for a data tone of the plurality of data tones to carry a data portion of the message; and
set a value for a DC protection tone of the one or more DC protection tones by repeating the value for the data tone as the value for the DC protection tone, wherein the DC protection tone indexed as {−1} comprises a value repeated from the data tone indexed as {4}, wherein the DC protection tone indexed as {−2} comprises a value repeated from the data tone indexed as {3}, wherein the DC protection tone indexed as {1} comprises a value repeated from the data tone indexed as {−4}, and wherein the DC protection tone indexed as {2} comprises a value repeated from the data tone indexed as {−3}; and
a transmitter coupled with the processor and configured to transmit the message to one or more wireless communication devices utilizing the plurality of data tones and the one or more DC protection tones.

20. An apparatus for communicating over a wireless communication network comprising:
a processor configured to:
form a message from a plurality of tones, the plurality of tones including data tones and one or more DC protection tones, the DC protection tones comprise three DC protection tones indexed as {−1, 0, 1}, the plurality of data tones comprise data tones indexed as {−2, 2};
set a value for a data tone of the plurality of data tones to carry a data portion of the message; and
set a value for a DC protection tone of the one or more DC protection tones by repeating the value for the data tone as the value for the DC protection tone, wherein the DC protection tone indexed as {−1} comprises a value repeated from the data tone indexed as {2}, and wherein the DC protection tone indexed as {1}comprises a value repeated from the data tone indexed as {−2}; and
a transmitter coupled with the processor and configured to transmit the message to one or more wireless communication devices utilizing the plurality of data tones and the one or more DC protection tones.

* * * * *